US009250113B2

(12) United States Patent
Bashir et al.

(10) Patent No.: US 9,250,113 B2
(45) Date of Patent: Feb. 2, 2016

(54) CELL MASS MEASUREMENT AND APPARATUS

(75) Inventors: Rashid Bashir, Champaign, IL (US); Kidong Park, Hwasung (KR); Larry Millet, Savoy, IL (US); K. Jimmy Hsia, Champaign, IL (US); Narayana R. Aluru, Savoy, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 61 days.

(21) Appl. No.: 13/805,623

(22) PCT Filed: Jun. 16, 2011

(86) PCT No.: PCT/US2011/040736
§ 371 (c)(1),
(2), (4) Date: Oct. 16, 2013

(87) PCT Pub. No.: WO2011/163058
PCT Pub. Date: Dec. 29, 2011

(65) Prior Publication Data
US 2014/0026686 A1    Jan. 30, 2014

Related U.S. Application Data

(60) Provisional application No. 61/356,848, filed on Jun. 21, 2010, provisional application No. 61/493,742, filed on Jun. 6, 2011.

(51) Int. Cl.
*G01G 9/00* (2006.01)
*G01G 3/00* (2006.01)
(Continued)

(52) U.S. Cl.
CPC . *G01G 19/14* (2013.01); *G01G 3/16* (2013.01)

(58) Field of Classification Search
CPC ............... B81B 2201/0214; B81B 3/0089; B82Y 30/00; B82Y 35/00; B82Y 40/00; G01L 1/10; G01N 2291/0257; G01N 2291/0427; G01N 29/036
See application file for complete search history.

(56) References Cited

U.S. PATENT DOCUMENTS 6,245,590 B1 *   6/2001   Wine et al. ............. 438/52
6,805,009 B2    10/2004   Burdess et al.
(Continued)

FOREIGN PATENT DOCUMENTS

EP        2017613          1/2009
WO     WO 00/71981        11/2000
(Continued)

OTHER PUBLICATIONS

Albrecht et al. (2004) "Geometric and Material Determinants of Patterning Efficiency by Dielectrophoresis," *Biophys. J.* 87(4): 2131-2147.
(Continued)

*Primary Examiner* — Eric S McCall
*Assistant Examiner* — Anthony W Megna Fuentes
(74) *Attorney, Agent, or Firm* — Lathrop & Gage LLP

(57) ABSTRACT

Provided herein are sensors and methods for determining properties of single cells, such as cell mass. Sensors disclosed herein include resonant sensors having a suspended platform designed to exhibit a uniform vibration amplitude. Methods are also disclosed for measuring changes in cell mass, changes in cell number, changes in cell viscosity and changes in cell elasticity.

31 Claims, 52 Drawing Sheets

(51) Int. Cl.
 G01G 3/16 (2006.01)
 G01G 19/14 (2006.01)

(56) References Cited

U.S. PATENT DOCUMENTS

| | | | |
|---|---|---|---|
| 7,091,715 | B2 | 8/2006 | Nemirovsky et al. |
| 7,489,433 | B2 * | 2/2009 | Urey et al. ............ 359/280 |
| 7,648,844 | B2 | 1/2010 | Srivastava et al. |
| 2002/0050167 | A1 | 5/2002 | Foote |
| 2002/0127760 | A1 | 9/2002 | Yeh et al. |
| 2005/0082944 | A1 | 4/2005 | Thompson et al. |
| 2005/0111787 | A1 * | 5/2005 | Miyajima et al. ............ 385/18 |
| 2005/0134141 | A1 * | 6/2005 | Savic et al. ............ 310/309 |
| 2005/0269655 | A1 * | 12/2005 | Fu ............ 257/415 |
| 2006/0196253 | A1 | 9/2006 | Crawley et al. |
| 2007/0089519 | A1 * | 4/2007 | Hao et al. ............ 73/649 |
| 2007/0222011 | A1 | 9/2007 | Robert et al. |
| 2008/0130090 | A1 * | 6/2008 | Aubuchon ............ 359/291 |
| 2008/0164541 | A1 | 7/2008 | Segal et al. |
| 2008/0245135 | A1 * | 10/2008 | Aubin et al. ............ 73/61.49 |
| 2008/0280776 | A1 | 11/2008 | Bashir et al. |
| 2009/0061416 | A1 | 3/2009 | Fang et al. |
| 2009/0139340 | A1 | 6/2009 | King et al. |
| 2009/0142790 | A1 | 6/2009 | Fang et al. |
| 2009/0199639 | A1 * | 8/2009 | Konno et al. ............ 73/580 |
| 2009/0288963 | A1 | 11/2009 | Guerrieri et al. |
| 2009/0323151 | A1 * | 12/2009 | Tani et al. ............ 359/221.2 |
| 2010/0026136 | A1 | 2/2010 | Gaidarzhy et al. |
| 2010/0068697 | A1 | 3/2010 | Shih et al. |
| 2011/0086352 | A1 | 4/2011 | Bashir et al. |
| 2012/0021918 | A1 | 1/2012 | Bashir et al. |
| 2014/0054651 | A1 | 2/2014 | Bashir et al. |
| 2014/0139204 | A1 | 5/2014 | Bashir et al. |
| 2014/0174927 | A1 | 6/2014 | Bashir et al. |
| 2014/0363821 | A1 | 12/2014 | Bashir et al. |

FOREIGN PATENT DOCUMENTS

| | | |
|---|---|---|
| WO | WO 2005/031300 | 7/2006 |
| WO | WO 2008/060713 | 4/2009 |
| WO | WO 2010/022285 | 2/2010 |

OTHER PUBLICATIONS

Anderson et al. (1969) "Cell Growth and Division. IV. Determination of Volume Growth Rate and Division Probability," *Biophys. J.* 9(2):246-263.
Anderson et al. (1970). "Density Invariance of Cultured Chinese Hamster Cells with Stage of the Mitotic Cycle," *Biophys. J.* 10(7):630-45.
Antonik et al. (1997). "A Biosensor Based on Micromechanical Interrogation of Living Cells," *IEEE Engineering in Medicine and Biology Magazine* 16(2):66-72.
Bertrand et al. (1994) "Induction of a Common Pathway of Apoptosis by Staurosporine," *Exp. Cell Res.* 211(2):314-321.
Bhattacharya et al. (2008) "PCR-Based Detection in a Micro-Fabricated Platform," *Lab Chip.* 8(7):1130-1136.
Bilbo et al. (2009) "Early-Life Programming of Later-Life Brain and Behavior: A Critical Role for the Immune System," *Front. Behav. Neurosci.* 3:14.
Blatt et al. (2001) "Signaling Pathways and Effector Mechanisms Pre-Programmed Cell Death," *Bioorg. Med. Chem.* 9(6):1371-1384.
Braun et al. (2005) "Micromechanical Mass Sensors for Biomolecular Detection in a Physiological Environment." *Physical Review E* 72(3):031907.
Brooks et al. (1985) "Cell Growth, Cell Division and Cell Size Homeostasis in Swiss 3T3 Cells," *Exp. Cell Res.* 156:1-6.
Bryan et al. (2010) "Measurements of Mass, Density, and Volume During the Cell Cycle of Yeast," *Proc. Nat. Acad. Sci. U.S.A.* 107(3):999-1004.
Burg et al. (2003) "Suspended Microchannel Resonators for Biomolecular Detection," *Appl. Phys. Lett.* 83(13):2698-2700.
Burg et al. (2006) "Vacuum-Packaged Suspended Microchannel Resonant Mass Sensor for Biomolecular Setection," *J. of Microelectromech. S.* 15(6):1466-1476.
Burg et al. (2007) "Weighing of Biomolecules, Single Cells and Single Nanoparticles in Fluid," *Nature.* 446(7139):1066-1069.
Burg et al. (2009) "Nonmonotonic Energy Dissipation in Microfluidic Resonators," *Phys. Rev. Lett.* 102(22):228103.
Chaput et al. (2002) "Effects of Commonly Used Fixatives on Size Parameters of Freshwater Planktonic Protists," *Arch. Hydrobiol.* 155:517-526.
Circu et al. (2009) "The Role of GSH Efflux in Staurosporine-Induced Apoptosis in Colonic Epithelial Cells," *Biochem. Pharmacol.* 77(1):76-85.
Conlon et al. (2001) "Extracellular Control of Cell Size," *Nat. Cell Biol.* 3(10):918-921.
Conlon et al. (2003) "Differences in the Way a Mammalian Cell and Yeast Cells Coordinate Cell Growth and Cell-Cycle Progression," *J. of Biol.* 2:7.
Cooper et al. (2006) "Distinguishing Between Linear and Exponential Cell Growth During the Division Cycle: Single-Cell Studies, Cell-Culture Studies, and the Object of Cell-Cycle Research," *Theor. Biol. Med. Model.* 3:10.
Crooke et al. (2009) "PLC-Gammal Regulates Fibronectin Assembly and Cell Aggregation," *Exp. Cell Res.* 315(13):2207-2214.
Das et al. (2006) "A Defined System to Allow Skeletal Muscle Differentiation and Subsequent Integration with Silicon Microstructures," *Biomaterials.* 27(24):4374-4380.
Das et al. (2007) "Differentiation of Skeletal Muscle and Integration of Myotubes with Silicon Microstructures Using Serum-Free Medium and a Synthetic Silane Substrate," *Nat. Protoc.* 2(7):1795-1801.
Davila et al. (2007) "Microresonator Mass Sensors for Detection of Bacillus Anthracis Sterne Spores in Air and Water," *Biosens. Bioelectron.* 22(12):3028-3035.
De Caterina et al. (2002) "Effect of Paraformaldehyde on Platelet Size and on Measurement of Surface IgG," *Platelets.* 13(4):207-212.
De Vries et al. (2007) "Direct Observation of Nanomechanical Properties of Chromatin in Living Cells," *Nano Lett.* 7(5):1424-1427.
Dohn et al. (2005) "Enhanced Functionality of Cantilever Based Mass Sensors Using Higher Modes," *Appl. Phys. Lett.* 86:233501.
Dohn et al. (2007) "Mass and Position Determination of Attached Particles on Cantilevers Based Mass Sensors," *Rev. Sci. Instrum.* 78:103303.
Echave et al. (2007) "Cell Size Regulation in Mammalian Cells," *Cell Cycle.* 6(2):218-224.
Ekinci et al. (2004) "Ultimate Limits to Inertial Mass Sensing Based upon Nanoelectromechanical Systems," *J. of Appl. Phys.* 95(5): 2682-2689.
Elliot et al. (1978) "Rate of Macromolecular Synthesis Through the Cell Cycle of the Yeast *Saccharomyces cerevisiae*," *Proc. Nat. Acad. Sci. U.S.A.* 75(9):4384-4388.
Fischer et al. (2003) "Many Cuts to Ruin: A Comprehensive Update of Caspase Substrates," *Cell Death Differ.* 10(1):76-100.
Fox et al. (1985) "Formaldehyde Fixation," *J. Histochem. Cytochem.* 33:845-853.
Gfeller et al. (2005) "Micromechanical Oscillators as Rapid Biosensor for the Detection of Active Growth of *Escherichia coli,*" *Biosens. Bioelectron.* 21(3): 528-533.
Godin et al. (2010) "Using Buoyant Mass to Measure the Growth of Single Cells," *Nat. Methods.* 7(5):387-390.
Gomez et al. (2007) "Immobilized Nerve Growth Factor and Microtopography Have Distinct Effects on Polarization Versus Axon Elongation in Hippocampal Cells in Culture," *Biomaterials.* 28(2): 271-284.
Groisman et al. (2005) "A Microfluidic Chemostat for Experiments with Bacterial and Yeast Cells," *Nat. Methods.* 2(9): 685-689.
Gupta et al. (2003) "Novel Fabrication Method for Surface Micromachined Thin Single-Crystal Silicon Cantilever Beams," *J. of Microelectromech. S.* 12(2):185-192.
Gupta et al. (2004) "Detection of Bacterial Cells and Antibodies Using Surface Micromachined Thin Silicon Cantilever Resonators," *J. of Vac. Sci. Technol. B.* 22(6):2785-2791.

(56) References Cited

OTHER PUBLICATIONS

Gupta et al. (2004) "Single Virus Particle Mass Detection Using Microresonators with Nanoscale Thickness," *Appl. Phys. Lett.* 84(11):1976-1978.
Gupta et al. (2006) "Anomalous Resonance in a Nanomechanical Biosensor," *Proc. Nat. Acad. Sci. U.S.A.* 103(36):13362-13367.
Hou et al. (2008) "Energy Uptake and Allocation During Ontogeny," 322:736-739.
Hu et al. (2009) "Novel Mechanisms of Fibroblast Growth Factor Receptor 1 Regulation by Extracellular Matrix Protein Anosmin-1," *J. Biol. Chem.* 284(43):29905-29920.
Iborra et al. (2008) "Wide Confocal Cytometry: A New Approach to Study Proteomic and Structural Changes in the Cell Nucleus During the Cell Cycle," *Histochem. Cell Biol.* 129(1):45-53.
International Search Report with Written Opinion corresponding to International Patent Application No. PCT/US2011/040736, mailed Dec. 12, 2011.
International Preliminary Report on Patentability corresponding to International Patent Application No. PCT/US2011/040736, mailed Jan. 10, 2013.
Ilic et al. (2000) "Topographical Patterning of Chemically Sensitive Biological Materials Using a Polymer-Based Dry Lift Off," *Biomed. Microdevices.* 2(4):317-322.
Ilic et al. (2001) "Single Cell Detection with Micromechanical Oscillators," *J. Vac. Sci. Technol. B* 19:2825.
Johnson et al. (2006) "Characterization of Vaccinia Virus Particles Using Microscale Silicon Cantilever Resonators and Atomic Force Microscopy," *Sensors and Actuators B-Chemical.* 115(1): 189-197.
Jorgensen et al. (2004) "How Cells Coordinate Growth and Division," *Curr. Biol.* 14(23):R1014-R1027.
Kane et al. (2006) "Liver-Specific Functional Studies in a Microfluidic Array of Primary Mammalian Hepatocytes," *Anal. Chem.* 78(13):4291-4298.
Khademhosseini et al. (2005) "Cell Docking Inside Microwells Within Reversibly Sealed Microfluidic Channels for Fabricating Multiphenotype Cell Arrays," *Lab Chip.* 5(12):1380-1386.
Kikuchi et al. (1992) "Effects of Chronic Administration of Noradrenaline and Glucagon on In Vitro Brown Adipose Tissue Thermogenesis," *Jpn. J. Physiol.* 42(1):165-170.
Killander et al. (1965) "Quantitative Cytochemical Studies on Interphase Growth. I. Determination of DNA, RNA and Mass Content of Age Determined Mouse Fibroblasts In Vitro and of Intercellular Variation in Generation Time," *Exp. Cell Res.* 38:272-286.
Kim et al. (2006) "Live Lymphocyte Arrays for Biosensing," *Advanced Functional Materials.* 16(10):1313-1323.
Kim et al. (2006) "Microfluidic Arrays for Logarithmically Perfused Embryonic Stem Cell Culture," *Lab Chip.* 6(3):394-406.
King, K. R., S. Wang, et al. (2006). "A high-throughput microfluidic real-time gene expression living cell array," submitted.
Kubitschek (1970) "Evidence for the Generality of Linear Cell Growth," *J. of Theor. Biol.* 28(1):15-29.
Lee et al. (1979) "The Effects of Fixation, Dehydration and Critical Point Drying on the Size of Cultured Smooth Muscle Cells," *Scan. Electron Microsc.* 3:439-448.
Lee et al. (2006) "Nanoliter Scale Microbioreactor Array for Quantitative Cell Biology," *Biotechnol. Bioeng.* 94(1):5-14.
Leporatti et al. (2009) "Cytomechanical and Topological Investigation of MCF-7 Cells by Scanning Force Microscopy," *Nanotechnology.* 20(5):055103.
Li et al. (2007) "Ultra-Sensitive Nems-Based Cantilevers for Sensing, Scanned Probe and Very High-Frequency Applications," *Nat. Nanotechnol.* 2(2):114-20.
Loken et al. (1984) "Constancy of Cell Buoyant Density for Cultured Murine Cells," *J. Cell Physiol.* 118(1):22-26.
Luthi et al. (2007) "The CASBAH: A Searchable Database of Caspase Substrates," *Cell Death Differ.* 14(4):641-650.
Merryman et al. (2009) "Biaxial Compliance Changes of Mitral Valve Leaflets Following Radiofrequency Ablation," In; *Journal of Biomechanical Engineering-Transactions of the ASME 131,* Lake Tahoe, California.
Mitchison (2003) "Growth During the Cell Cycle," *Int. Rev. Cytol.* 226:165-258.
Mitchison (2005) "Single Cell Studies of the Cell Cycle and Some Models," *Theor. Biol. Med. Model* 2:4.
Nie et al. (2007) "On-Chip Cell Migration Assay Using Microfluidic Channels," *Biomaterials.* 28(27):4017-4022.
Nugaeva et al. (2005) "Micromechanical Cantilever Array Sensors for Selective Fungal Immobilization and Fast Growth Detection," *Biosens. Bioelectron.* 21(6):849-856.
Olie et al. (1998) "Apparent Caspase Independence of Programmed Cell Death in Dictyostelium," *Curr. Biol.* 8(17):955-958.
Omura et al. (1977) "A New Alkaloid AM-2282 OF Streptomyces Origin. Taxonomy, Fermentation, Isolation and Preliminary Characterization," *J. Antibiot.* 30(4):275-82.
Park et al. (2007) "Electrical Capture and Lysis of Vaccinia Virus Particles Using Silicon Nano-Scale Probe Array," *Biomed. Microdevices.* 9(6):877-883.
Park et al. (2008) "'Living Cantilever Arrays' for Characterization of Mass of Single Live Cells in Fluids." *Lab Chip.* 8(7):1034-1041.
Park et al. (2010) "Measurement of Adherent Cell Mass and Growth," *Proc. Nat. Acad. Sci. U.S.A.* 107(48):20691-20696.
Park et al. (Jun. 21-25, 2009) "MEMS-based Resonant Sensor with Uniform Mass Sensitivity," In; TRANSDUCERS 2009, Solid State Sensors, Actuators and Microsystems Conference, Denver, Colorado.
Park et al. (Jun. 5-9, 2011) "MEMS Mass Sensors with Uniform Sensitivity for Monitoring Cellular Apoptosis," In; TRANSDUCERS 2011—16th International Solid-State Sensors, Actuators and Microsystems Conference, Beijing, China. pp. 759-762.
Peterson et al. (2009) "PAC-1 Activates Procaspase-3 In Vitro Through Relief of Zinc-Mediated Inhibition," *J. Mol. Biol.* 388(1):144-158.
Popescu et al. (2008) "Optical Imaging of Cell Mass and Growth Dynamics," *Am. J. Physiol. Cell Physiol.* 295:C538.
Prescesky et al. (1992) "Silicon Micromachining Technology for Subnanogram Discrete Mass Resonant Biosensors," *Canadian Journal of Physics.* 70(10-11):1178-1183.
Sader (1998) "Frequency Response of Cantilever Beams Immersed in Viscous Fluids with Applications to the Atomic Force Microscope," *J. of Appl. Phys.* 84(1):64-76.
Scherer et al. (2009) "Poly-N-Acetyl Glucosamine Nanofibers: A New Bioactive Material to Enhance Diabetic Wound Healing by Cell Migration and Angiogenesis," *Ann. Surg.* 250(2):322-330.
Shi et al. (1993) "Rheological Properties of Mammalian Cell Culture Suspensions: Hybridoma and HeLa Cell Lines," *Biotechnol. Bioeng.* 41(7):745-754.
Shroff et al. (1995) "Dynamic Micro-mechanical Properties of Cultured Rat Atrial Myocytes Measured by Atomic Force Microscopy," *Am. J. Physiol.* 269:C286-C292.
Taff et al. (2005) "A Scalable Addressable Positive-Dielectrophoretic Cell-Sorting Array," *Anal. Chem.* 77(24):7976-7983.
Thompson et al. (2004) "Dynamic Gene Expression Profiling Using a Microfabricated Living Cell Array," *Anal. Chem.* 76(14):4098-4103.
Thundat et al. (1995) "Detection of Mercury Vapor Using Resonating Microcantilevers," *Appl. Phys. Lett.* 66:1695.
Timmer et al. (2007) "Caspase Substrates," *Cell Death Differ.* 14(1): 66-72.
Tsuda et al. (2007) "Cellular Control of Tissue Architectures Using a Three-Dimensional Tissue Fabrication Technique," *Biomaterials.* 28(33):4939-4946.
Tzur et al. (2009) "Cell Growth and Size Homeostasis in Proliferating Animal Cells," *Science.* 325(5937):167-171.
Voinova et al. (2002) "Missing Mass Effect in Biosensor's QCM Applications," *Biosens. Bioelectron.* 17(10):835-841.
Waggoner et al. (2007) "Micro-and Nanomechanical Sensors for Environmental, Chemical, and Biological Detection," *Lab Chip.* 7(10):1238-1255.
Wells (2002) "Does Size Matter?" *J. Cell Biol.* 158(7):1156-1159.
Wilson et al. (2007) "Integration of Functional Myotubes with a Bio-MEMS Device for Non-Invasive Interrogation," *Lab Chip.* 7(7):920-922.

(56) References Cited

OTHER PUBLICATIONS

Wolff et al. (1972) "Changes in Density of Hela-Cells During Various Phases of Growth Cycle," *In Vitro-Journal of the Tissue Culture Association.* 7(4):268.

Yang et al. (2006) "Zeptogram-Scale Nanomechanical Mass Sensing," *Nano Lett.* 6(4):583-586.

Zetterberg et al. (1965) "Quantitative Cytochemical Studies on Interphase Growth. II. Derivation of Synthesis Curves from the Distribution of DNA, RNA, and Mass Values of Individual Mouse Fibroblasts In Vitro," *Exp. Cell. Res.* 29:22-32.

Zhang et al. (2009) "RIP3, An Energy Metabolism Regulator that Switches TNF-Induced Cell Death from Apoptosis to Necrosis," *Science.* 325(5938):332-336.

* cited by examiner

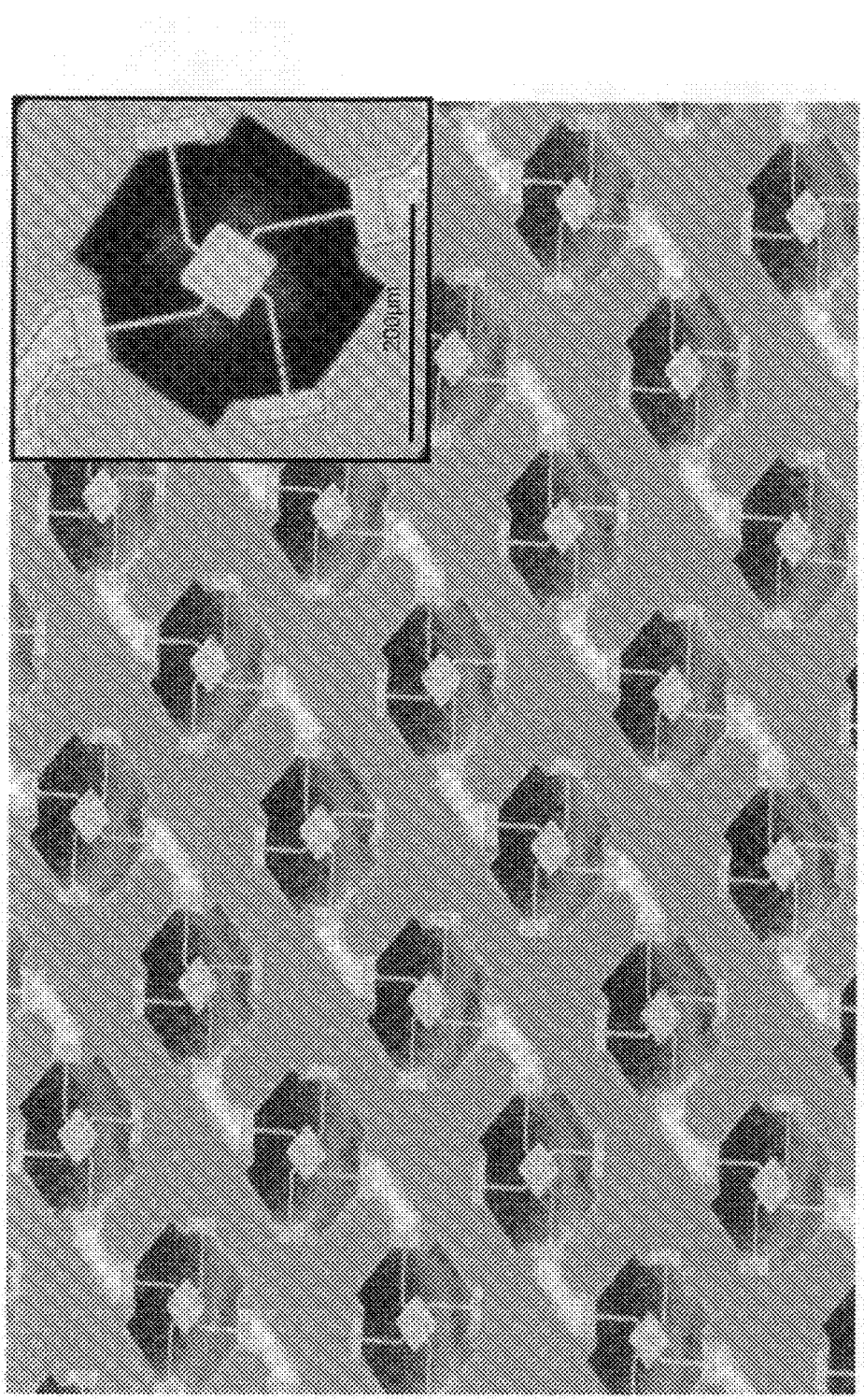

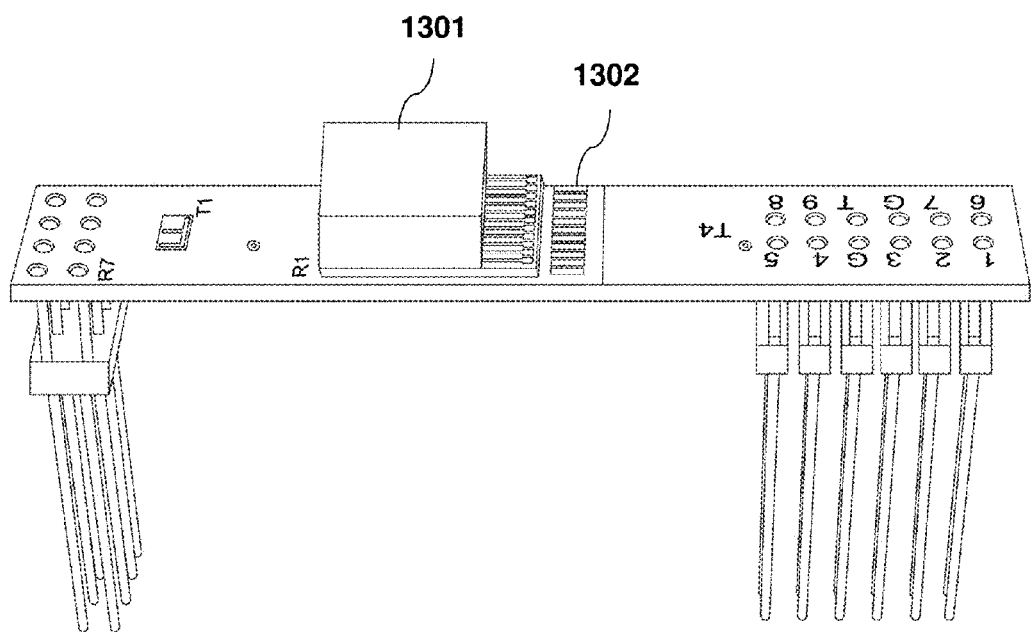
Figure 13M
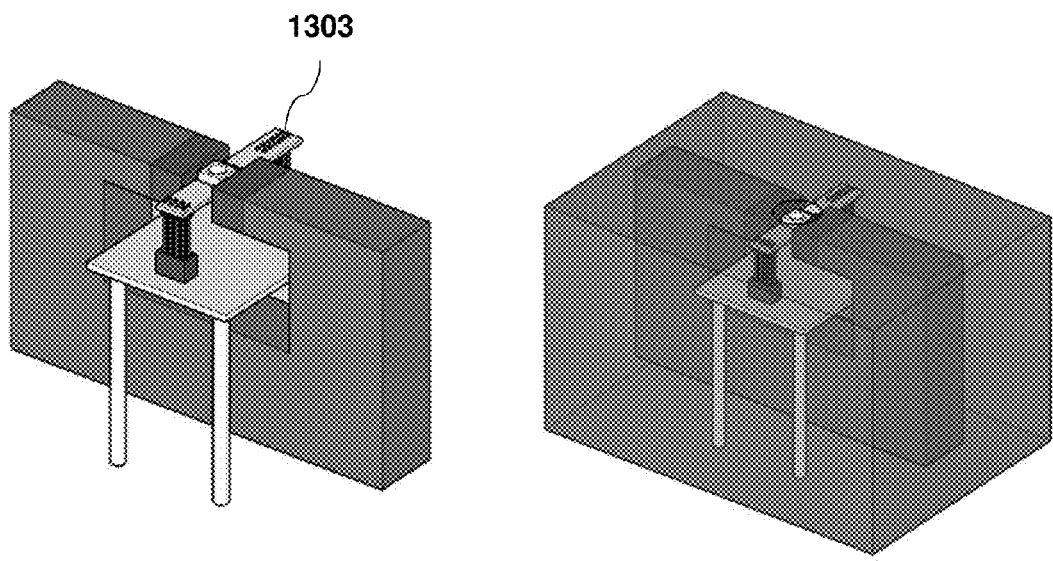
Figure 13N                    Figure 13O

CELL MASS MEASUREMENT AND APPARATUS

CROSS REFERENCE TO RELATED APPLICATION

This application is a U.S. National Stage Application under 35 U.S.C. §371 of International Application No. PCT/US11/40736, filed Jun. 16, 2011, which claims the benefit of and priority to U.S. Provisional Application 61/356,848 filed Jun. 21, 2010, and U.S. Provisional Application 61/493,742 filed Jun. 6, 2011, all of which are hereby incorporated by reference in their entireties.

STATEMENT REGARDING FEDERALLY SPONSORED RESEARCH OR DEVELOPMENT

This invention was made with United States governmental support under Award No. EEC-0425626 awarded by the National Science Foundation. The U.S. government has certain rights in the invention.

BACKGROUND

This invention is in the field of microfabricated devices. This invention relates generally to the use of microfabricated resonant sensors for measuring cell properties.

The direct dependence of growth rate on cell mass for individual adherent human cells is not understood. Cells undergo multiplication and differentiation within multi-cellular organisms. Understanding how these events are orchestrated by individual cells and cell populations has been of great interest for nearly 50 years. Direct measurements of changes in mammalian cell mass versus growth rate have been among this quest. Such measurements have the potential of elucidating the intrinsic mechanism for coordination between cell cycle and cell growth, and determining whether the growth rate is proportional to the cell size or whether the growth rate is constant over cell size and cell cycle. The linear growth model is based on the assumption that the rate of biosynthesis is limited by the 'gene dosage' or the amount of DNA that can initiate the transcription process. On the other hand, the exponential growth model is based on the assumption that the increase of cell mass depends on the amount of ribosomal machinery and cytoplasm. Therefore, as a cell grows larger (or heavier), it has a greater capacity to produce more mass and increase the growth rate. Theoretically, the linear growth can maintain cell size-homeostasis without a size-dependent mechanism, whereas the exponential growth requires a size-dependent mechanism for size-homeostasis.

Recently, great strides have been made towards this goal by interferometric measurements of dry cell mass, population measurements of buoyant mass (analogous to dry cell mass) of suspended cells, and volume measurements of gently synchronized sub-populations of suspended mammalian cells. However, the long-term dependence of growth rate versus mass for individual adherent mammalian cells is unknown. While cell volume can be measured through optical methods, determining cell mass is more complicated based on irregularities of cell shape. Because density and volume can have a disproportionate variance with cell mass and cell-type, determining the true mass of a cell can be influenced by these variations. Irrespective of the cell property being reported (dry mass, buoyant mass, etc.), the methods used to obtain these measures report on a fraction of the whole cells true mass.

MEMS-based resonant mass sensors have been extensively studied as biological and chemical sensors. These sensors measure a shift in the resonance frequency of the structure before and after the target attachment, where the shift can be used to calculate the mass of the target entity. Most of these sensors have utilized a miniaturized cantilever beam structure. The cantilever beam structure is useful for extreme miniaturization due to its simple geometry, and therefore higher mass sensitivity can be achieved. However, as is commonly known, these cantilever beam resonant mass sensors have a spatially non-uniform mass sensitivity. The mass sensitivity is at its maximum when the added mass is placed at the free end of the cantilever and the sensitivity decreases to zero as the added mass gets to the fixed end of the cantilever. If the target entities are much smaller than the sensor and a large number of the target entities are to be attached, then one can assume a uniform mass distribution and use an average mass sensitivity, which can be easily obtained with an analytical solution. However, if only a few or a single target entity is to be attached to the sensor, one cannot assume the uniform distribution of the target mass and one needs to adjust the extracted mass with the mass distribution from optical images of cantilevers, or limit the attachment site to the end of the cantilever. However, these approaches reduce the actual mass sensitivity and make the mass sensor less practical to use.

SUMMARY

Provided herein are sensors and methods for determining properties of single cells, such as cell mass. Sensors disclosed herein include resonant sensors having a suspended platform designed to exhibit a uniform vibration amplitude. Methods are also disclosed for measuring changes in cell mass, changes in cell number, changes in cell viscosity and changes in cell elasticity. Also provided are sensor arrays including a plurality of sensors.

In a first aspect, provided herein are resonant sensors. In some embodiments, the sensors are mass sensors. Sensors of this aspect comprise a microfabricated suspended platform having a measuring surface, the suspended platform supported by three or more tethers. In exemplary embodiments, resonant oscillations of the suspended platform exhibit a uniform vibration amplitude across the measuring surface.

In one embodiment, the suspended platform has a greater stiffness than the tethers. For example, useful suspended platforms include those having a stiffness selected over the over the range of 5 to 1000 N/m and useful tethers include those having a stiffness selected over the range of 0.5 N/m to 10 N/m. Useful tethers also include those having a folded geometry, such as tethers comprising a flexural portion and a torsional portion. In an exemplary embodiment, a sensor of this aspect comprises four tethers. In an embodiment, the measuring surface comprises a plane and a resonant oscillation of the suspended platform is perpendicular the plane of the measuring surface.

Materials useful for the suspended platform and tethers include materials common to the art of microfabrication. In embodiments, the suspended platform and/or tethers each independently comprise a material including, but not limited to, semiconductors, such as elemental semiconductors (e.g., silicon and germanium), compound semiconductors (e.g., SiC, SiGe, GaAs or other group II, III, IV, V or VI compound semiconductors) and doped semiconductors, including both single and polycrystalline semiconductors; diamond; metals, such as nickel, gold, chromium, platinum, copper, aluminum and titanium; metal alloys; insulators such as $SiO_2$ and $Si_3N_4$; ALD deposited materials; CVD deposited materials; and any combination thereof.

In one embodiment a metal layer is deposited over at least a portion of the suspended platform and two of the tethers. Useful metals include, but are not limited to, nickel, gold, chromium, platinum, copper, aluminum, titanium or any combination of these. In embodiments, the metal layer has a thickness selected over the range of 50 nm to 300 nm.

In embodiments, a resonant sensor further comprises one or more magnets positioned such that a magnetic field is oriented parallel to the measuring surface of the sensor, for example, one or more permanent magnets. In an embodiment, the suspended platform is induced to oscillate by passing a current across the suspended platform. Optionally, the suspended platform comprises a magnetic or ferromagnetic material. In certain embodiments, the suspended platform is induced to oscillate by applying a time varying magnetic field to the suspended platform. Optionally, the suspended platform is induced to oscillate by applying a time varying electric potential between the suspended platform and a substrate or electrode positioned in electrostatic communication with the suspended platform.

Optionally, the one or more tethers comprise a piezoelectric material. In certain embodiments, the suspended platform is induced to oscillate by applying a time varying voltage to the piezoelectric material. Optionally, the sensor further comprises a piezoelectric actuator, such as a piezoelectric film, positioned in mechanical communication with the suspended platform and/or tethers. For example, in one embodiment a piezoelectric film is positioned external to a sensor or sensor chip, such that mechanical contact is provided between the piezoelectric film and the sensor in such a way that expansions/contractions of the piezoelectric film induce vibrations of the suspended platform of the sensor. In another embodiment, a piezoelectric film is positioned directly on or fabricated within the suspended platform and/or one or more of the tethers. In embodiments, the suspended platform is induced to oscillate by applying a time varying voltage to the piezoelectric actuator or piezoelectric film.

In some embodiments, the measuring surface of the sensor has a circular, rectangular or square shape. In other embodiments, the measuring surface of the sensor has a triangular or hexagonal shape. In some embodiments, the suspended platform has a measuring surface area selected over the range of 100 $\mu m^2$ to 10000 $\mu m^2$. In some embodiments, the suspended platform has a cross sectional dimension, for example, a length, width and/or diameter, selected over the range of 10 $\mu m$ to 100 $\mu m$. In some embodiments, the suspended platform has a thickness selected over the range of 0.5 $\mu m$ to 5 $\mu m$. In some embodiments, the suspended platform has a mass selected over the range of 1 ng to 100 ng.

In some embodiments, each tether has a cross sectional dimension, such as a width, selected over the range of 1 $\mu m$ to 10 $\mu m$. In some embodiments, each tether has a cross sectional dimension, such as a length, selected over the range of 30 $\mu m$ to 200 $\mu m$. In some embodiments, each tether has a cross sectional dimension, such as a thickness, selected over the range of 0.5 $\mu m$ to 5 $\mu m$. In some embodiments, the sensor has a resonant frequency selected over the range of 10 to 500 kHz. In some embodiments, the sensor has a resonant frequency in water selected over the range of 10 to 300 kHz. In some embodiments, the sensor has a resonant frequency in air selected over the range of 50 to 500 kHz.

In some embodiments, the suspended platform is suspended over a closed recessed region in a microfabricated device. In other embodiments, the suspended platform is suspended over an open recessed region in a microfabricated device. As used herein, an open recessed region in a microfabricated device includes regions which are entirely removed or etched, for example, a region which permits fluid to flow from one side of a device to another side of the device. Entirely etched regions may also be referred to as holes or apertures. Example images of microfabricated suspended platforms suspended over an open recessed region/entirely etched region are shown in FIG. 26A and FIG. 26B. Optionally, the suspended platform can include one or more apertures. A suspended platform having one or more apertures is useful, for some embodiments, as such a platform can enhance the ability of the platform to capture and retain cells on the surface of the platform. Useful apertures in suspended platforms include those having dimensions, such as lengths, widths or diameters, selected over the range of 0.5 $\mu m$ to 100 $\mu m$, optionally selected over the range of 0.5 $\mu m$ to 15 $\mu m$, over the range of 0.5 $\mu m$ to 5 $\mu m$ or over the range of 0.5 $\mu m$ to 1 $\mu m$.

In embodiments, a vibration of the suspended platform is detected using methods known in the field of microcantilevers. Optionally, a velocity of the suspended platform is measured, sensed and or detected to determine a frequency of the suspended platform vibration. In embodiments, a vibration of the suspended platform is detected using an optical sensing method, a piezoelectric sensing method, a piezoresistive sensing method, an electrical sensing method or any combination of these. In embodiments, one or more of the tethers comprises a piezoelectric material and/or a piezoresistive material and a vibration of the suspended platform is detected by monitoring a change in the resistance of the piezoelectric and/or piezoresistive material. In embodiments, vibration of the suspended platform is detected by monitoring a capacitance between the suspended platform and a substrate or electrode positioned in electrostatic communication with the suspended platform.

In an exemplary embodiment, provided is a system for measuring the mass of an object comprising a resonant mass sensor comprising a microfabricated suspended platform having a measuring surface, the suspended platform supported by three or more tethers; and a metal layer deposited over at least a portion of the suspended platform and tethers and wherein a resonant oscillation of the suspended platform exhibits a uniform vibration amplitude across the measuring surface; one or more permanent magnets positioned such that a magnetic field passes parallel to the measuring surface; a current source in electrical communication with the metal layer; and an optical source and sensor located for sensing a vibration of the suspended platform.

Suspended platform embodiments described herein include those whose vibration amplitude exhibits variations of between 0% and 3% across the measuring surface of the suspended platform, for example, amplitude variations of less than 2% across the surface of the suspended platform. Suspended platform embodiments described herein include those having a mass sensitivity which is relatively insensitive to the position of an object on the measuring surface of the sensor. For example, sensor embodiments include those having a mass sensitivity which varies between 0% and 5% across the measuring surface of the suspended platform, for example, a mass sensitivity of less than 4.1% across the surface of the suspended platform. Sensor embodiments also include those having a mass resolution selected over the range of 0.1 pg to 100 pg.

In embodiments, a functional layer is deposited on the measuring surface of the suspended platform. Useful functional layers include those comprising one or more targeting compounds, one or more biological compositions, one or more pharmaceutical compositions or any combination of these. In embodiments, the functional layer comprises poly-L-lysine, fibronectin, collagen, an antibody, a protein or any combination of these or other biological compositions. Useful functional layers also include those which: enhance attachment of one or more adherent cell types to the measuring surface; inhibit attachment of one or more adherent cell types to the measuring surface; stimulate growth of one or more adherent cell types; inhibit growth of one or more adherent cell types; stimulate division of one or more adherent cell types; inhibit division of one or more adherent cell types; or any combination of these.

In some embodiments, the sensor is present in an aqueous environment. For example, an aqueous environment which supports cell growth or an aqueous environment which inhibits cell growth. Useful aqueous environments include those comprising one or more targeting compounds, one or more biological compositions, one or more pharmaceutical compositions or any combination of these. In embodiments, the aqueous environment comprises a growth factor, an anticancer drug, mitogen, a carcinogen, etoposide or any combination of these. In embodiments, the aqueous environment comprises an abundance of one or more nutrients essential for cell growth. In embodiments, the aqueous environment comprises an insufficiency of one or more nutrients essential for cell growth. These and other embodiments are useful for determining the effect of the composition of the aqueous environment on cell growth rate, cell division rate or cell death rate.

In some embodiments, the sensor is present in an environment other than an aqueous environment. For example, the sensor can be present in a gaseous environment. In one embodiment, the sensor is initially present in an aqueous environment and one or more cells are attached to or positioned on a measuring surface of the sensor; subsequently, the aqueous environment is removed. In a specific embodiment, the aqueous environment is partially removed, such that one or more cells attached to or positioned on the measuring surface of the sensor remain present in the aqueous environment while portions of the sensor do not remain in the aqueous environment. Optionally, an additional liquid environment is provided to the sensor, such that the one or more cells and the remaining aqueous environment surrounding the cells are engulfed in the additional liquid environment. In a specific embodiment, an oil droplet is provided to the sensor, where the oil droplet engulfs one or more cells positioned on or attached to the surface of the sensor and the aqueous media is removed. In certain embodiments where the sensor is present in an environment other than an aqueous environment, the mass sensitivity of the sensor is increased, for example, when compared to sensors present in an aqueous environment. In certain embodiments where the sensor is present in an environment other than an aqueous environment, the Q of the sensor is increased, for example, when compared to sensors present in an aqueous environment.

In another aspect, described are methods for measuring cell properties. One embodiment of this aspect comprises providing a resonant sensor, such as described herein; providing a cell on a measuring surface of the suspended platform of the sensor; inducing an oscillation of the suspended platform and the cell; determining a change in resonant frequency of the suspended platform and cell as a function of time; and determining a change in a property of the cell as a function of time from the change in resonant frequency. In a specific method of this aspect, the cell is an adherent cell.

In another aspect, described are methods for measuring an effect of a composition on a cell property. One embodiment of this aspect comprises providing a resonant sensor, such as described herein; providing a cell on a measuring surface of the suspended platform of the sensor; contacting the cell with the composition; inducing an oscillation of the suspended platform and the cell; determining a change in resonant frequency of the suspended platform and cell as a function of time; and determining a change in a property of the cell as a function of time from the change in resonant frequency. In a specific method of this aspect, the cell is an adherent cell. In certain embodiments of this aspect, the properties of the cell are determined as a function of a concentration of the composition or a contact amount of the composition.

In specific embodiments, useful properties measured by the methods described herein include a mass of the cell, an apparent mass of the cell, a contact area between the cell and the suspended platform measuring surface, an elasticity of the cell, a viscosity of the cell, a density of the cell, a number density of cells on the measuring surface, a growth rate of the cell, a stiffness or the cell and any combination of these.

In another aspect, provided are methods for determining the effect of a plurality of compositions, such as biological compositions, pharmaceutical compositions and/or targeting compositions, on a property of an adherent cell. A method of this aspect comprises providing an array of sensors, such as described herein; providing an adherent cell on one more of the measuring surfaces of the sensors in the array; contacting each cell with one of a plurality of compositions; inducing an oscillation of each suspended platform and cell in the sensor array; determining a change in resonant frequency of each suspended platform and cell in the sensor array as a function of time; and determining a change in a property of each cell as a function of time from each change in resonant frequency. In one embodiment, the composition is provided on the measuring surface of the suspended platform and the step of providing the cell on the measuring surface of the platform places the cell in contact with the composition.

In another aspect, provided are methods of capturing cells. A specific method of this aspect comprises the steps of providing a microfabricated suspended platform, the suspended platform supported by three or more tethers; and flowing a fluid containing one or more cells past the suspended platform, thereby capturing one or more cells on a surface of the suspended platform. In certain embodiments, the suspended platform and the three or more tethers are components of a mass sensor, such as described above. For example, in one embodiment, the suspended platform comprises a measuring surface and a resonant oscillation of the suspended platform exhibits a uniform vibration amplitude across the measuring surface. In certain embodiments, the suspended platform is suspended over a recessed region of a microfabricated sensor, and optionally a region which is entirely etched, such that fluid can flow through the microfabricated sensor. Microfabricated sensors having completely etched regions beneath a suspended platform are shown, for example, in FIG. 26A and FIG. 26B.

In a specific embodiment, the suspended platform comprises one or more apertures. A suspended platform having one or more apertures is useful, for some embodiments, as such a platform can enhance the ability of the platform to capture and retain cells on the surface of the platform. Optionally, at least one of the one or more apertures has a cross-sectional dimension less than a cross-sectional dimension of at least one of the one or more cells. In embodiments where one or more cells are captured on the surface of the suspended platform, one or more of the cells overlap at least one of the one or more apertures.

Optionally, the fluid permitted to flow past the suspended platform is a biological fluid, for example, blood. Optionally, the fluid permitted to flow past the suspended platform is a non-biological fluid, for an aqueous solution.

In a specific embodiment, a functional layer is provided on the suspended platform. Functional layers are useful, in some embodiments, as they can enhance the ability of a suspended platform to capture and retain cells. Optional functional layers include those comprising one or more targeting compounds, one or more biological compositions, one or more pharmaceutical compositions or any combination of these. Specific functional layers include, but are not limited to, those comprising: poly-L-lysine, fibronectin, collagen, an antibody, a protein or any combination of these. In embodiments, the one or more cells include, but are not limited to, cells selected from the group consisting of: an adherent cell, a HeLa cell, an HT29 cell, a fibroblast cell, a U2OS cell, a soft cell, a cancer cell, a tumor cell, a blood cell, a white blood cell and any combination of these.

Upon capture of one or more cells on the surface of a suspended platform, embodiments are contemplated which further comprise the steps of: inducing an oscillation of the suspended platform and the one or more cells captured on the surface of the suspended platform; determining a resonant frequency of the suspended platform and the one or more cells captured on the surface of the suspended platform; and determining a property of the one more cells captured on the surface of the suspended platform from the resonant frequency. Optionally, a first oscillation of the suspended platform and the one or more cells captured on the surface of the suspended platform is induced, followed by the inducing of a second oscillation of the suspended platform and the one or more cells captured on the surface of the suspended platform. From these oscillations, in embodiments, a change in resonant frequency between the first oscillation and the second oscillation is determined; and a change in a property of the one or more cells captured on the surface of the suspended platform is determined from the change in resonant frequency.

Useful properties of the of the one more cells captured on the surface of the suspended platform determined in this way include, but are not limited to, a mass of the one more cells captured on the surface of the suspended platform, an apparent mass of the one more cells captured on the surface of the suspended platform, a contact area between the one more cells captured on the surface of the suspended platform and the suspended platform, an elasticity of the one more cells captured on the surface of the suspended platform, a viscosity of the one more cells captured on the surface of the suspended platform, a density of the one more cells captured on the surface of the suspended platform, a number density of one more cells captured on the surface of the suspended platform, a growth rate of the one more cells captured on the surface of the suspended platform, changes in any of these and any combination of these.

Also provided are methods for determining the mass of an object. A method of this aspect comprises the steps of providing a resonant mass sensor comprising a microfabricated suspended platform having a measuring surface, the suspended platform supported by three or more tethers, and wherein a resonant oscillation of the suspended platform exhibits a uniform vibration amplitude across the measuring surface; providing the object on the measuring surface; inducing an oscillation of the suspended platform and the object; determining a resonant frequency of the suspended platform and object; and determining the mass of the object from the resonant frequency.

Also provided are methods of determining a change in mass of an object. An embodiment of this aspect comprises the steps of providing a mass sensor comprising a microfabricated suspended platform having a measuring surface, the suspended platform supported by three or more tethers, and wherein a resonant oscillation of the suspended platform exhibits a uniform vibration amplitude across the measuring surface; providing the object on the measuring surface; inducing a first oscillation of the suspended platform and the object; inducing a second oscillation of the suspended platform and the object; determining a change in resonant frequency between the first oscillation and the second oscillation; and determining a change in mass of the object from the change in resonant frequency.

Another embodiment is a method of determining a change in a contact area between an object and a sensor, the method comprising the steps of providing a sensor comprising a microfabricated suspended platform having a measuring surface, the suspended platform supported by three or more tethers, and wherein a resonant oscillation of the suspended platform exhibits a uniform vibration amplitude across the measuring surface; providing the object on the suspended platform; inducing a first oscillation of the suspended platform and the object; inducing a second oscillation of the suspended platform and the object; determining a change in resonant frequency between the first oscillation and the second oscillation; and determining a change in contact area between the object and the measuring surface from the change in resonant frequency. In embodiments, the object is a cell. In embodiments, the object is a soft cell.

Another embodiment is a method of determining a change in elasticity of an object, the method comprising the steps of providing a sensor comprising a microfabricated suspended platform having a measuring surface, the suspended platform supported by three or more tethers, and wherein a resonant oscillation of the suspended platform exhibits a uniform vibration amplitude across the measuring surface; providing the object on the suspended platform; inducing a first oscillation of the suspended platform and the object; inducing a second oscillation of the suspended platform and the object; determining a change in resonant frequency between the first oscillation and the second oscillation; and determining a change in elasticity of the object from the change in resonant frequency.

Another embodiment is a method of determining a change in viscosity of an object, the method comprising the steps of providing a sensor comprising a microfabricated suspended platform having a measuring surface, the suspended platform supported by three or more tethers, and wherein a resonant oscillation of the suspended platform exhibits a uniform vibration amplitude across the measuring surface; providing the object on the suspended platform; inducing a first oscillation of the suspended platform and the object; inducing a second oscillation of the suspended platform and the object; determining a change in resonant frequency between the first oscillation and the second oscillation; and determining a change in viscosity of the object from the change in resonant frequency.

Another embodiment is a method of determining a stiffness of an object, the method comprising the steps of providing a sensor comprising a microfabricated suspended platform having a measuring surface, the suspended platform supported by three or more tethers, and wherein a resonant oscillation of the suspended platform exhibits a uniform vibration amplitude across the measuring surface; providing the object on the suspended platform; providing a reflective element on the object; inducing a first oscillation of the suspended platform, the object and the reflective element; determining the resonant frequency of the suspended platform; determining the resonant frequency of the reflective element; and determining the stiffness of the object from the resonant frequency of the suspended platform and the resonant frequency of the reflective element. In an embodiment, a second oscillation of the suspended platform, the object and the reflective element is induced and a change in the stiffness of the object is determined from the first and second resonant frequencies of the suspended platform and the first and second resonant frequencies of the reflective element. One specific embodiment comprises determining the resonant frequencies of the suspended platform and the reflective element as a function of time and determining a change in the stiffness of the object as a function of time from the resonant frequencies of the suspended platform and the reflective element. In a specific embodiment, the reflective element comprises a metal, for example, a piece of gold, silver, copper, aluminum or other metals.

For certain of the above embodiments, the object undergoing the first oscillation is a single cell and the object undergoing the second oscillation is two cells formed by division of the single cell into two cells. For certain of the above embodiments, the object is a single cell. In a specific embodiment, the single cell is an adherent cell. Useful adherent cells include, but are not limited to, a HeLa cell, an HT29 cell, a fibroblast cell and a U2OS cell. In embodiments, the object is a soft cell. In some embodiments, the object is a cancer cell, a tumor cell or a blood cell, such as a white blood cell. In some embodiments, the single cell is provided on the measuring surface using a method including, but not limited to, random seeding, dielectrophoretic direction, pick and place, cell printing, selectively coating adherent cell targeting molecules on the measuring surface and any combination of these.

Optionally, methods described herein further comprise a step of obtaining one or more optical images of the object on the suspended platform. Optical images are useful for determining a volume of the object and multiple optical images are useful for determining a change in the volume of the object.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

BRIEF DESCRIPTION OF THE DRAWINGS

FIG. 15C provides data showing the comparison of calculated non-dimensional mass versus fixed mass.

DETAILED DESCRIPTION

Figure 1A:
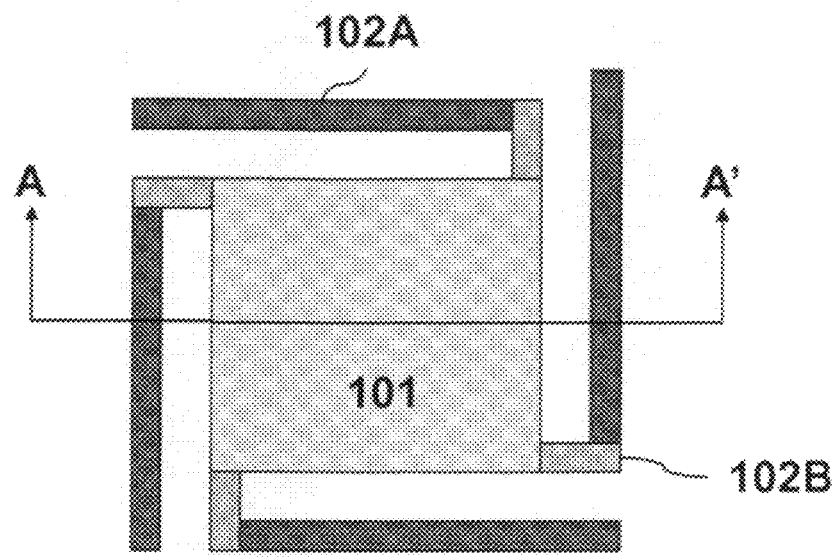
FIGS. 1A and 1B illustrate an exemplary mass sensor embodiment.

In general the terms and phrases used herein have their art-recognized meaning, which can be found by reference to standard texts, journal references and contexts known to those skilled in the art. The following definitions are provided to clarify their specific use in the context of the invention.

"Resonant oscillation" refers to the naturally occurring periodic motions or vibrations of a system which tend to store more energy, become more excited and/or undergo larger amplitudes than other oscillations of the system. "Resonant frequency" refers to the frequency of a resonant oscillation, usually indicated in number of oscillations per second or Hz.

"Vibration amplitude" refers to a measure of the maximum displacement of an oscillating object. "Uniform vibration amplitude" refers to the specific configuration where all points over a specified surface of an oscillating object have identical vibration amplitudes or substantially identical vibration amplitudes, such as vibration amplitudes which vary less than 1%, less than 2% or less than 3% in magnitude across the specified surface.

"Suspended platform" refers to a structure which is attached to one or more supports such that the structure is elevated over an opening or recessed region. A suspended structure may also refer to a structure which is held in place over an opening or a recessed region by one or more supports such that the structure partially covers the opening or recessed region. "Measuring surface" refers to a surface of a suspended platform on which objects are placed for subsequent analysis. In some embodiments, a measuring surface of a suspended platform is the exposed surface of the platform, such as a surface of the platform which does not face a recessed region which the platform is suspended over. In specific embodiments, a measuring surface refers to a surface of a suspended structure having a planar or substantially planar surface, such as a surface having an average divergence from planarity of less than 1 µm.

"Tether" refers to a support member for holding a structure in place, such as a suspended structure. In some embodiments, tethers undergo spring-like or cantilever-like oscillations when the structure they are supporting vibrates.

"Folded spring" or "Folded tether" refers to a specific tether configuration, where the tether includes two portions which convert between flexural motion and torsional motion. "Flexural portion" refers to the portion of a folded tether which has a tendency to bend in a vertical direction as a regular thin cantilever structure during a vibration. "Torsional portion" refers to the portion of a folded tether which has a tendency to twist about its axis during a vibration.

"Spring constant" refers to a measure of the force required to change the original or natural shape of an object, such as a spring or a tether, a specified distance. In certain embodiments, the spring constant of a material or object is a measure of the stiffness.

"Mass sensitivity" as used herein refers to the ratio of a sensor output or shift in resonant frequency to the mass of an object at a specified location on a measuring surface. In one embodiment, uniformity of the mass sensitivity of a sensor refers to the percentage variation of the sensor output or shift in resonant frequency of an identical object over a specified surface of the sensor.

"Functional layer" refers to a composition deposited onto a surface which interacts with objects placed on the surface. In some embodiments, a functional layer attracts or retains objects. In some embodiments, a functional layer repels objects. In some embodiments, a functional layer includes a composition, such as a biological composition or a pharmaceutical composition, for screening the activity of the composition on a cell.

"Mass resolution" refers to refers to the ability of a sensor to precisely measure the mass of an object or distinguish between masses of objects to a specific precision.

"Aqueous environment" refers to a water solution. In certain embodiments, an aqueous environment supports cell growth; that is, the solution comprises nutrients and molecules necessary for the growth and/or replication of a cell. In other embodiments, an aqueous environment inhibits cell growth; that is, the solution does not include sufficient nutrients and molecules necessary for the growth and/or replication of a cell and/or the solution comprises a biological or pharmaceutical composition that inhibits cell growth.

"Actuate" and "actuation" as used herein refers to a process by which a resonator is induced to vibrate. The term "actuator" as used herein refers to a device or element used to induce a vibration.

"Adherent cell" refers to a cell which attaches to and/or grows on a surface. Adherent cells useful with the devices and methods described herein include, but are not limited to, HeLa cells, HT29 cells, fibroblast cells and U2OS cells. In certain embodiments, adherent cells are characterized by various properties including, but not limited to, the contact area between the cell and a surface, the mass of the cell, the apparent mass of the cell, the growth rate of the cell, the elasticity of the cell, the viscosity of the cell, the density of the cell, the volume of the cell and any combination of these.

"Contact area" refers to the area over which two surfaces touch one another.

"Apparent mass" refers to the observed or measured mass of an object. In some embodiments, an apparent mass is identical to the true mass. In some embodiments, a correction factor is applied to an apparent mass to approximate the true mass.

"Elasticity" refers to a property of a material or object indicating the magnitude of stress to strain in the material or object. In some embodiments, the terms "Young's Modulus" and "elasticity" are interchangeable.

"Young's modulus" refers to a mechanical property of a material or object which refers to the ratio of stress to strain for a given substance. Young's modulus may be provided by the expression;

$$E = \frac{(\text{stress})}{(\text{strain})} = \left(\frac{L_0}{\Delta L} \times \frac{F}{A}\right)$$

where E is Young's modulus, $L_0$ is the equilibrium length, $\Delta L$ is the length change under the applied stress, F is the force applied and A is the area over which the force is applied. Young's modulus may also be expressed in terms of Lame constants via the equation:

$$E = \frac{\mu(3\lambda + 2\mu)}{\lambda + \mu}$$

where $\mu$ and $\lambda$ are Lame constants. High Young's modulus (or "high modulus") and low Young's modulus (or "low modulus") are relative descriptors of the magnitude of Young's modulus in a given material, layer or device. In the present description, a High Young's modulus is larger than a low Young's modulus, about 10 times larger for some applications, more preferably about 100 times larger for other applications and even more preferably about 1000 times larger for yet other applications.

"Viscosity" refers to a measure of a fluid's resistance to flow. In some embodiments, viscosity relates to a shear stress in a flowing fluid. As used herein, the term viscosity is intended to be consistent with use of the term in the field of fluid mechanics and fluid dynamics.

"Mechanical communication" refers to the arrangement of two or more objects such that a force applied to one object induces motion of a second object.

"Electrostatic communication" refers to the arrangement of two or more objects such that an electric field present on or emanating from one object induces a force which is capable of moving a second object.

"Microfabricated" refers to an object or device of micrometer scale dimensions or smaller, manufactured using techniques known in the art of microfabrication, for example having one or more dimensions of 500 μm or less.

"Semiconductor" refers to any material that is an insulator at very low temperatures, but which has an appreciable electrical conductivity at temperatures of about 300 Kelvin. In the present description, use of the term semiconductor is intended to be consistent with use of this term in the art of microelectronics and electrical devices. Useful semiconductors include element semiconductors, such as silicon, germanium and diamond, and compound semiconductors, such as group IV compound semiconductors such as SiC and SiGe, group III-V semiconductors such as AlSb, AlAs, Aln, AlP, BN, GaSb, GaAs, GaN, GaP, InSb, InAs, InN, and InP, group III-V ternary semiconductors alloys such as $Al_xGa_{1-x}As$, group II-VI semiconductors such as CsSe, CdS, CdTe, ZnO, ZnSe, ZnS, and ZnTe, group I-VII semiconductors CuCl, group IV-VI semiconductors such as PbS, PbTe and SnS, layer semiconductors such as $PbI_2$, $MoS_2$ and GaSe, oxide semiconductors such as CuO and $Cu_2O$.

The term semiconductor includes intrinsic semiconductors and extrinsic semiconductors that are doped with one or more selected materials, including semiconductor having p-type doping materials (also known as P-type or p-doped semiconductor) and n-type doping materials (also known as N-type or n-doped semiconductor), to provide beneficial electrical properties useful for a given application or device. The term semiconductor includes composite materials comprising a mixture of semiconductors and/or dopants. Useful specific semiconductor materials include, but are not limited to, Si, Ge, SiC, AlP, AlAs, AlSb, GaN, GaP, GaAs, GaSb, InP, InAs, GaSb, InP, InAs, InSb, ZnO, ZnSe, ZnTe, CdS, CdSe, ZnSe, ZnTe, CdS, CdSe, CdTe, HgS, PbS, PbSe, PbTe, AlGaAs, AlInAs, AlInP, GaAsP, GaInAs, GaInP, AlGaAsSb, AlGaInP, and GaInAsP. Porous silicon semiconductor materials are useful in the field of sensors and light emitting materials, such as light emitting diodes (LEDs) and solid state lasers. Impurities of semiconductor materials are atoms, elements, ions and/or molecules other than the semiconductor material(s) themselves or any dopants provided to the semiconductor material. Impurities are undesirable materials present in semiconductor materials which may negatively impact the electrical properties of semiconductor materials, and include, but are not limited to, oxygen, carbon, and metals including heavy metals. Heavy metal impurities include, but are not limited to, the group of elements between copper and lead on the periodic table, calcium, sodium, and all ions, compounds and/or complexes thereof.

Figure 1B:
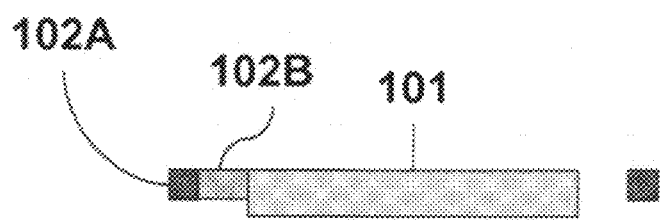

FIG. 1A illustrates an overhead view of an exemplary microfabricated mass sensor embodiment; FIG. 1B illustrates a cross sectional view along the A-A' direction of FIG. 1A. A suspended platform 101 is held in place and attached to another structure (not shown) by four tethers 102. Tethers 102 are configured so that vibrations of platform 101 primarily undergo motion along a vertical direction of FIG. 1B. In the embodiment shown, each tether is folded, composed of a flexural portion 102A and a torsional portion 102B. A metal layer (not shown) is deposited onto the platform and two of the tethers. A permanent magnet (not shown) is oriented relative to the platform and tethers such that a magnetic field is oriented parallel to the surface of the platform. To actuate a vertical vibration of the platform, a time varying electric current is passed along the metal layer.

Figure 2:
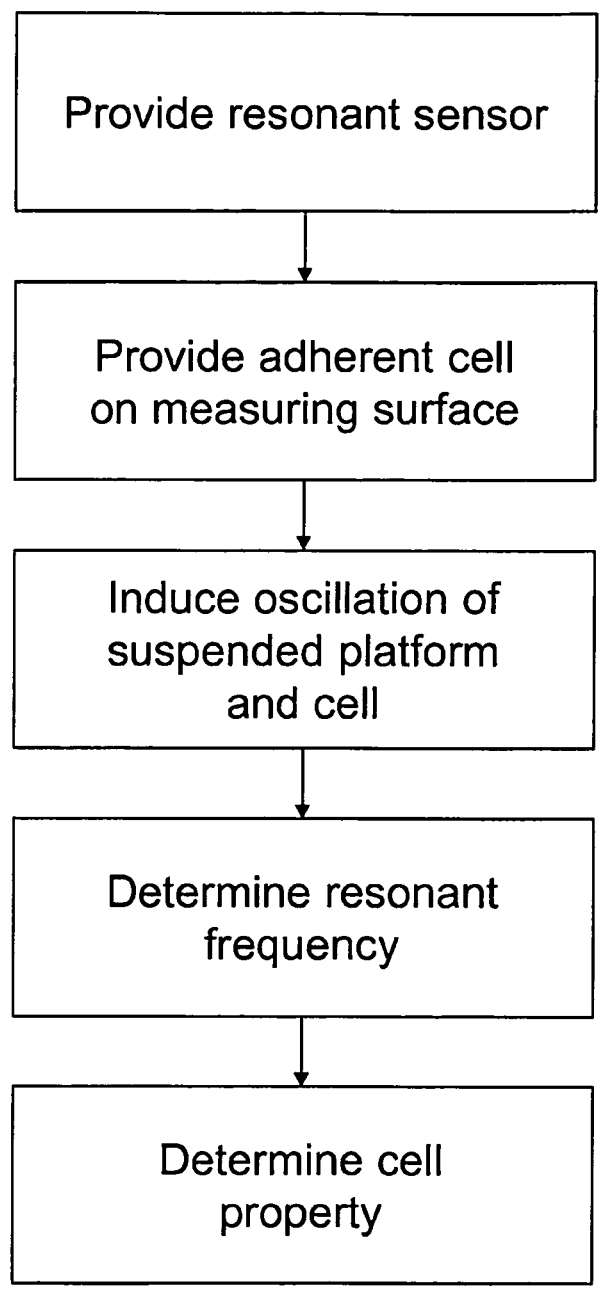
FIG. 2 shows an overview of an exemplary method for measuring a property of a single adherent cell.
Figure 3A:
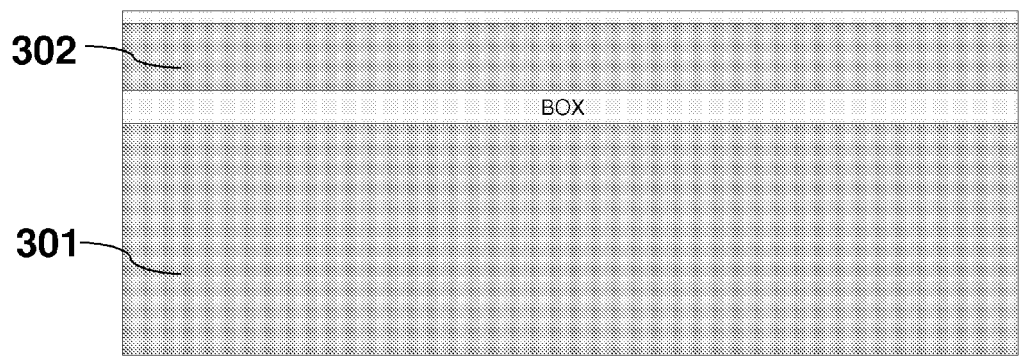
FIGS. 3a-3j show an overview of an exemplary method for making a resonant mass sensor.
Figure 3B:
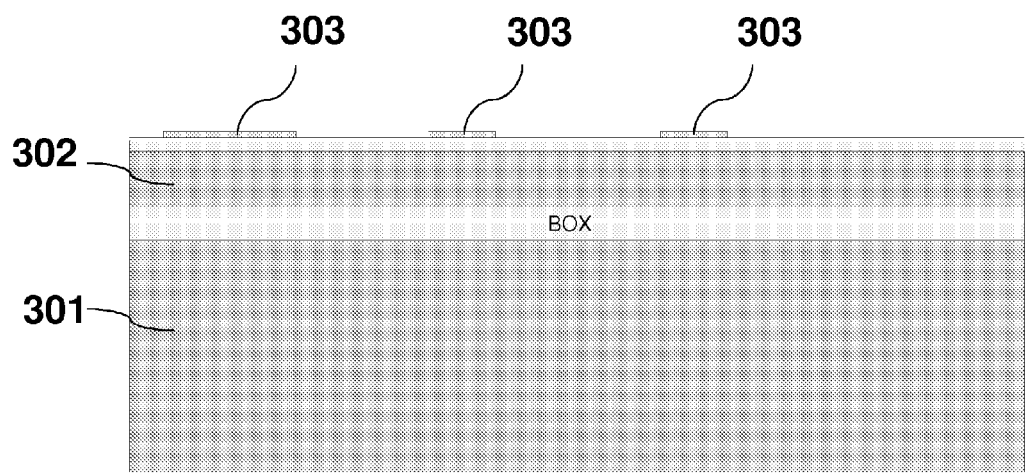
Figure 3C:
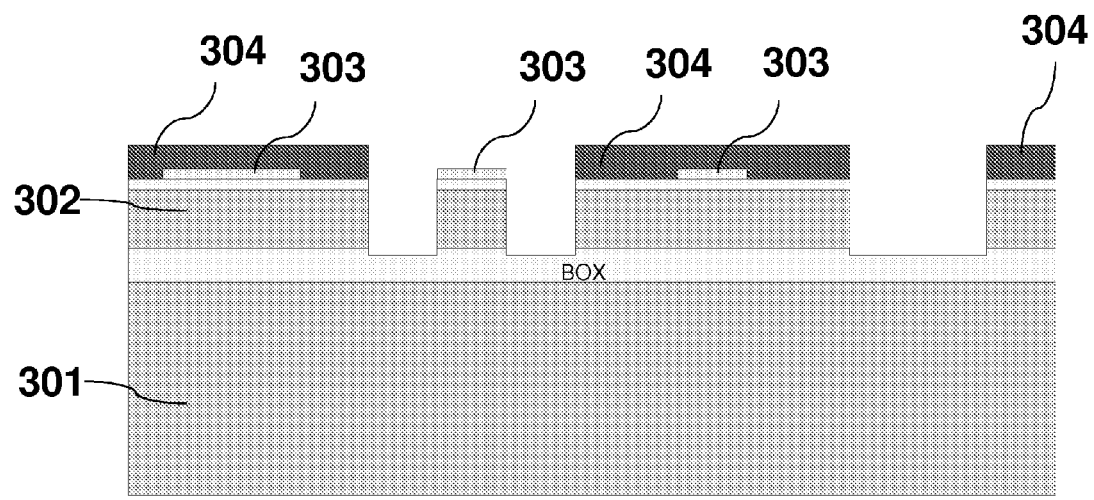
Figure 3D:
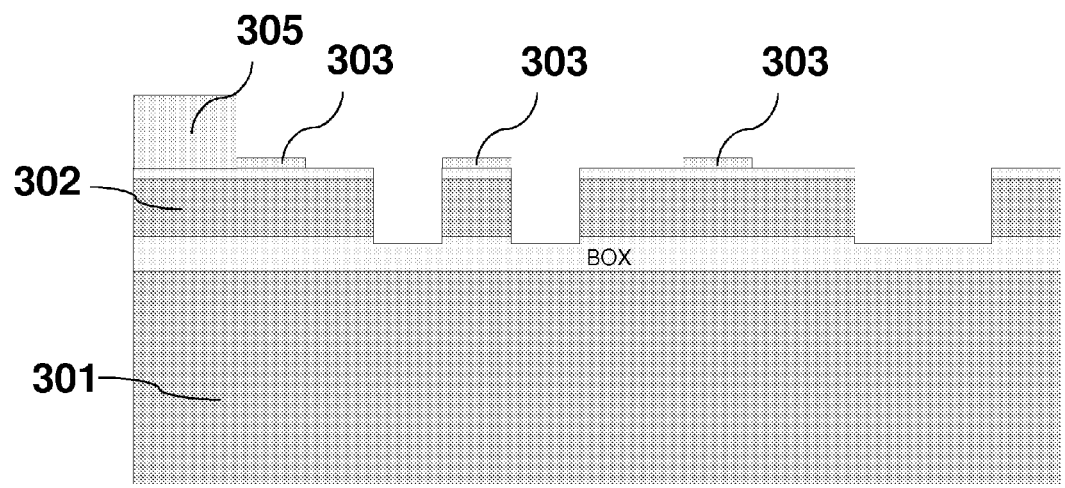
Figure 3E:
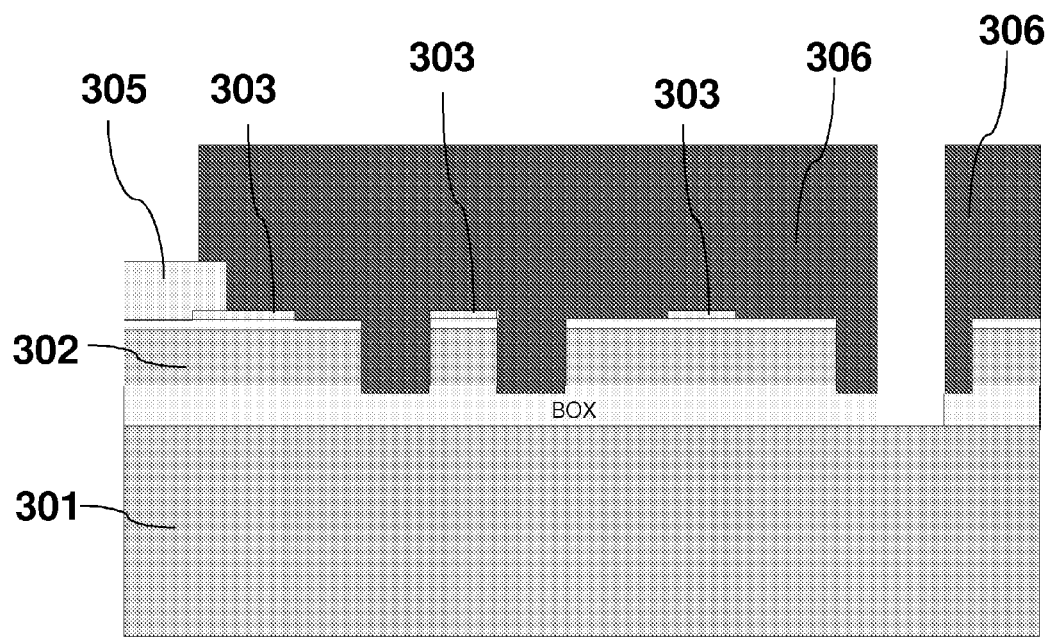
Figure 3F:
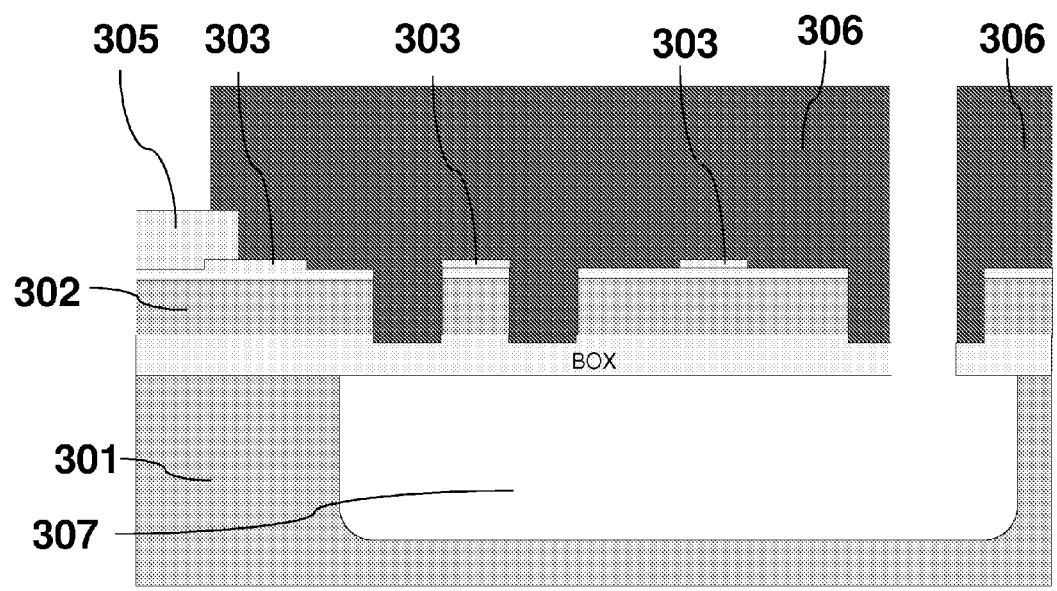
Figure 3G:
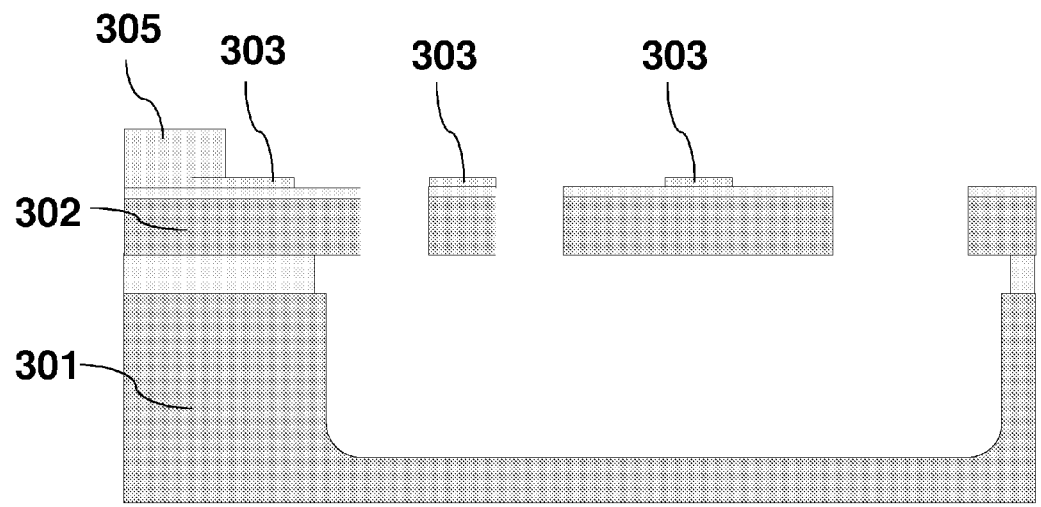
Figure 3H:
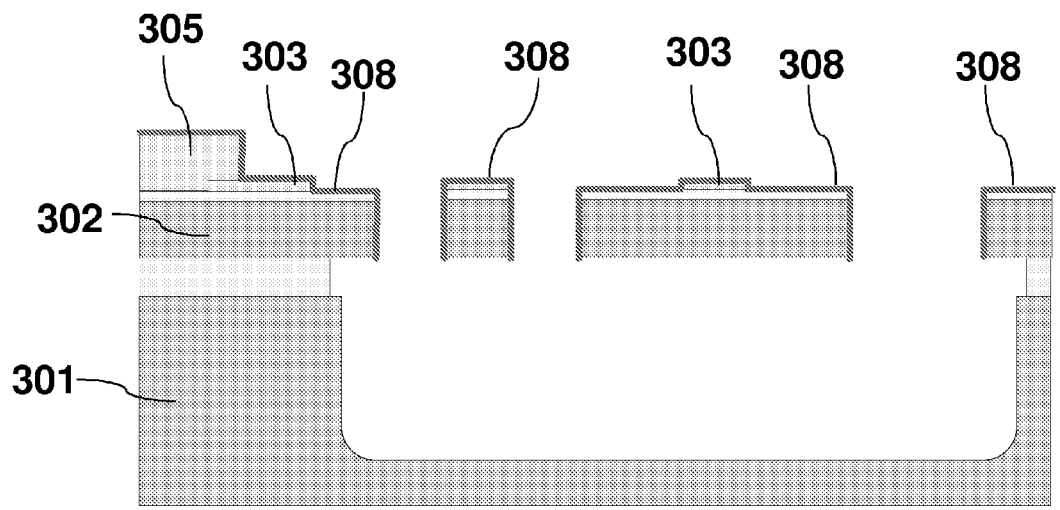
Figure 3I:
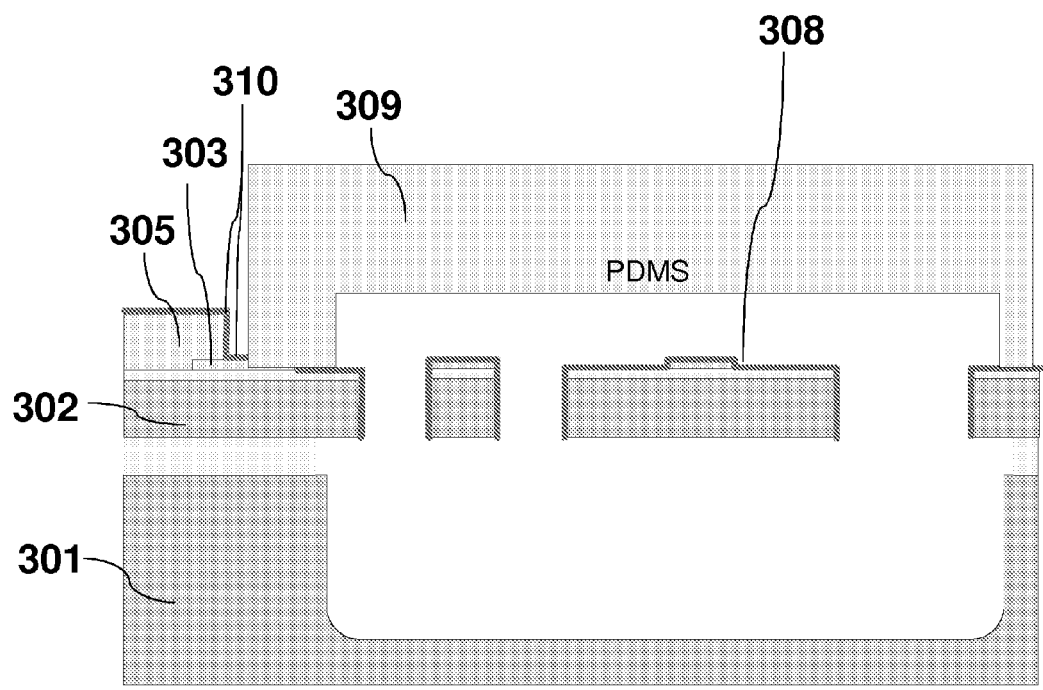
Figure 3J:
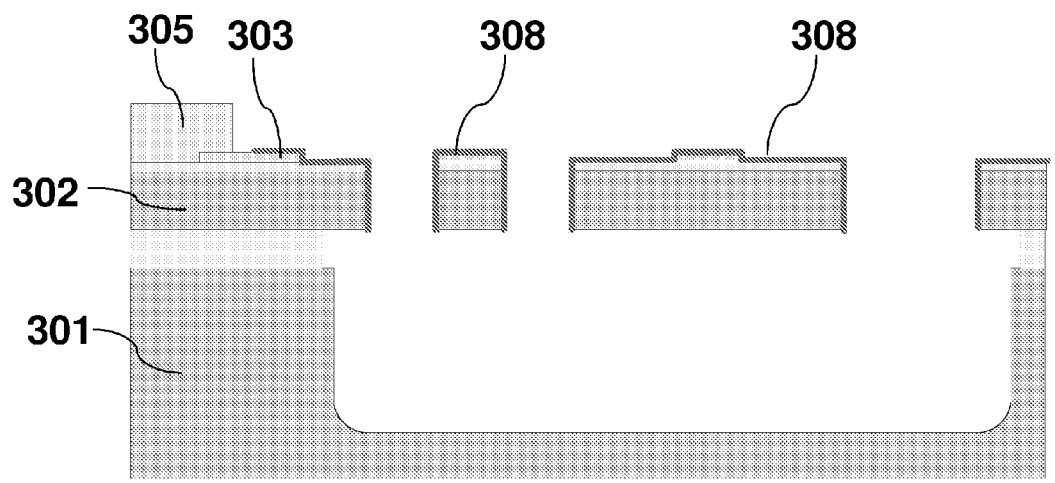

FIG. 2 illustrates an overview an exemplary method for measuring a property of a single adherent cell. First a resonant sensor is provided. Sensors useful for this method include those described herein. Next, an adherent cell is positioned on a measuring surface of the sensor. A resonant vibration of the measuring surface is induced and monitored to determine a frequency of the resonant vibration. Using the resonant frequency, the property of the cell is determined. Optionally, as the property of the cell changes over time, the change in resonant frequency is monitored and the change in the property of the cell is determined using the change in resonant frequency.

FIG. 3 illustrates an overview of an exemplary method for making a resonant mass sensor embodiment. The starting material of this embodiment is a SOI wafer 301 with 2 μm thick device layer 302. The wafer is oxidized (FIG. 3a) and a first metal layer 303 is deposited and patterned with lift-off (FIG. 3b). Following this, a photoresist layer 304 is patterned. The photoresist layer 304 and the first metal layer 303 are utilized as a mask layer in a subsequent reactive ion etching (RIE) process for etching the device layer 302 (FIG. 3c). After RIE, second metal layer 305 is deposited and patterned with lift-off (FIG. 3d). Then a second photoresist 306 is patterned for the release window 307 (FIG. 3e). With the release window 307, the buried oxide (BOX) is etched using RIE and the substrate silicon beneath is etched using $XeF_2$ etchant (FIG. 3f). Then, the photoresist 306 and the remaining BOX are removed (FIG. 3g). After releasing the device, 100 nm silicon dioxide layer 308 is deposited to electrically insulate the metal layers 303 and 305 (FIG. 3h). To open a bonding pad for wire bonding on the second metal layer 305, a PDMS slab 309 with a recess is attached to the device, covering the released structure; the device with the PDMS slab 309 attached is then etched in BHF to etch silicon dioxide 308 on bonding pad site 310 (FIG. 3i). Then, the PDMS slab 308 is removed for subsequent wire-bonding (FIG. 3j).

The invention may be further understood by the following non-limiting examples.

Example 1

MEMS-Based Resonant Sensor with Uniform Mass Sensitivity

MEMS-based resonant mass sensors have been extensively studied as biological and chemical sensors. Most of these sensors have utilized a cantilever structure, and these cantilever resonant mass sensors have a spatially non-uniform mass sensitivity. In this example, a silicon MEMS-based resonant mass sensor with a spatially uniform mass sensitivity is described. The sensor is comprised of a platform for the target attachment and four half-folded springs. The novel structure generates a vertical displacement of the platform, which leads to the uniform mass sensitivity. The extracted mass of a bead on different places shows a standard deviation of 1.4%.

MEMS-based resonant mass sensors have been extensively studied as biological and chemical sensors. These sensors measure a shift in the resonance frequency of the structure before and after the target attachment, where the shift can be used to calculate the mass of the target entity. Most of these sensors have utilized a miniaturized cantilever beam structure. The cantilever beam structure is proper for extreme miniaturization due to its simple geometry, and therefore higher mass sensitivity can be achieved. However, as is commonly known, these cantilever beam resonant mass sensors have a spatially non-uniform mass sensitivity. The mass sensitivity is at its maximum when the added mass is placed at the free end of the cantilever and the sensitivity decreases to zero as the added mass gets to the fixed end of the cantilever. If the target entities are much smaller than the sensor and a large number of the target entities are to be attached, then one can assume a uniform mass distribution and use an average mass sensitivity, which can be easily obtained with an analytical solution. However, if only a few or a single target entity is to be attached to the sensor, one cannot assume the uniform distribution of the target mass and one needs to adjust the extracted mass with the mass distribution from optical images of cantilevers, or limit the attachment site to the end of the cantilever. However, these approaches reduce the actual mass sensitivity and make the mass sensor less practical to use. In this example, a silicon MEMS-based resonant mass sensor with a spatially independent and uniform mass sensitivity and associated fabrication methods are described and characterized.

Device Operation and Design

Device Structure and Fabrication.

Figure 4A:
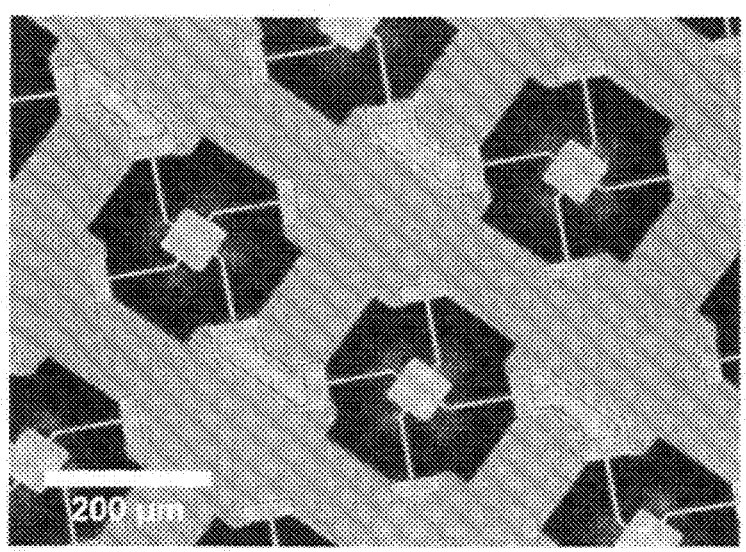
FIG. 4a shows an optical image of a mass sensor and FIG. 4b shows a cross sectional view of a mass sensor.
Figure 4B:
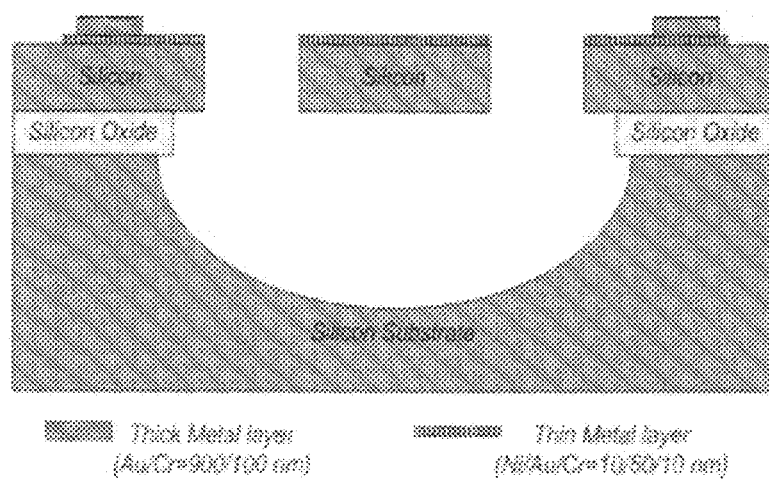

FIG. 4a shows an optical image of the fabricated mass sensors and FIG. 4b shows a cross-sectional view of the device. The sensors are comprised of four half-folded springs and a center platform where the target would be attached. The thickness of the top silicon layer is 2 µm. A thin metal layer is deposited on the springs and the platform regions for magnetic actuation using electric current. The device is released by etching the silicon substrate beneath the spring and cantilever using a $XeF_2$ etcher.

Simulation.

Figure 5:
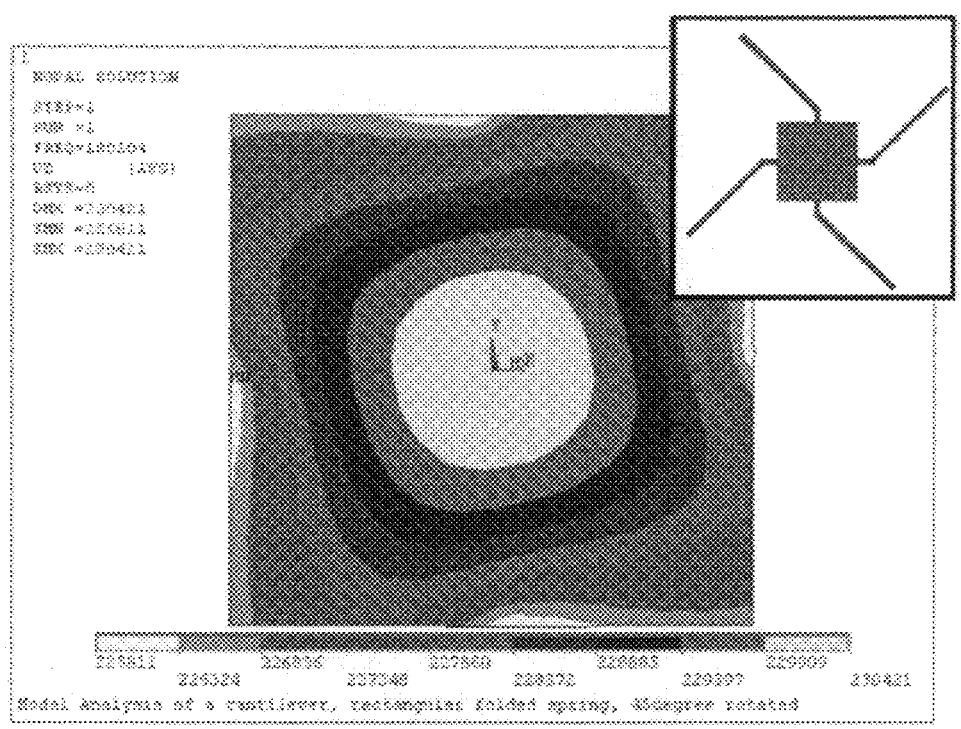
FIG. 5 shows simulated modal shape of a sensor structure in resonance.

FIG. 5 shows simulated modal shape of the sensor structure in resonance. The mass sensitivity of a resonant mass sensor at a specific point is related to the square of the vibration amplitude at the specific point. By keeping the vibration amplitude constant on the target attachment site, a uniform mass sensitivity can be achieved. Due to the unique structure of the sensor, the flexural bending on the beam spring is partly converted into the torsional bending at the folded part of the beam spring, leading to the uniform vibration amplitude of the platform. The difference in the vibration amplitude of the platform is within only 2.0% of the maximum value. This leads to 4.1% difference between the minimum and the maximum value of the mass sensitivity.

Experimental and Results

Measurement Setup.

Figure 6:
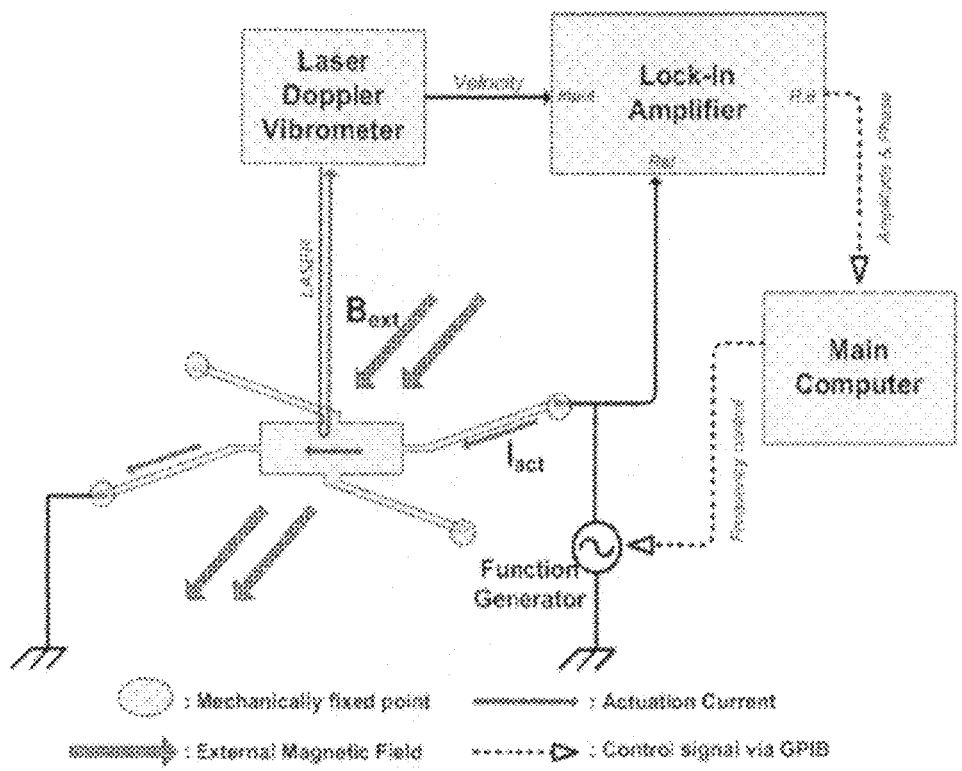
FIG. 6 shows a schematic diagram of a system for measuring the mass of an object.

FIG. 6 shows the schematic diagram of the experimental setup. A static magnetic field is generated by a permanent magnet and then guided into a uniform magnetic field by a C-shaped nickel alloy magnetic core. An actuation current passes through the spring and the platform, generating a Lorentz force for the sensor actuation, which actuates the platform vertically. A Laser Doppler Vibrometer (MSV-301, Polytec) is used to measure the vibration of the platform. The Laser Doppler Vibrometer is mounted on an optical microscope (Axiotech Vario, Zeiss) and detects the velocity of the platform from the interference of a two laser beam, reflected from the sensor surface. A lock-in-amplifier is used to compare the output from LDV with the actuation current to generate relative amplitude and phase of the platform vibration, from which the frequency response of the sensor can be produced.

Displacement Measurement.

Figure 7:
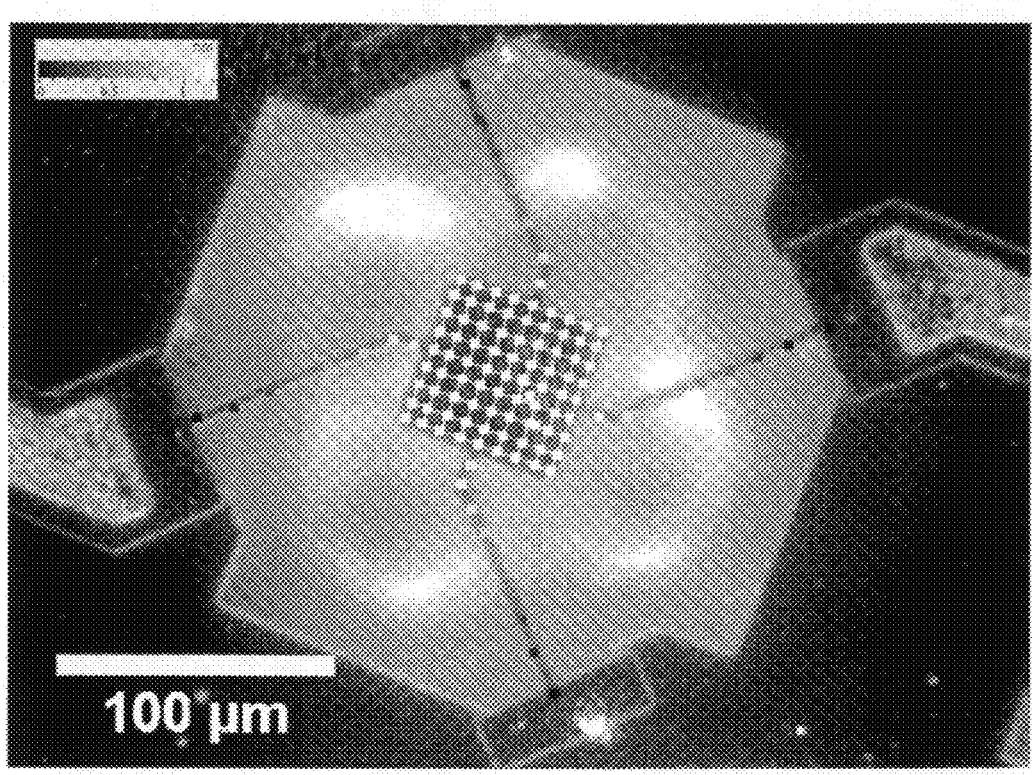
FIG. 7 provides data showing the measured value of a vibration amplitude for various points across the sensor.

FIG. 7 shows the measured value of the vibration amplitude of each point of the sensor in resonance. The gray-scale color of each dot represents the vibration amplitude of the sensor, measured by the LDV. It is clearly shown that the vibration amplitude increases along the four springs and becomes uniform on the platform.

Mass-Sensitivity Measurement.

Figure 8A:
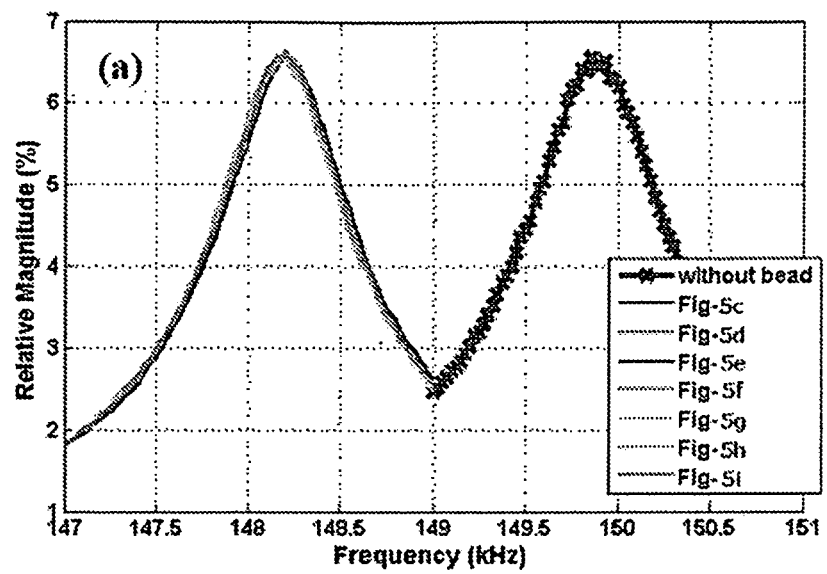
FIGS. 8a and 8b provide data showing resonance frequency shift measured with magnetic actuation.
Figure 8B:
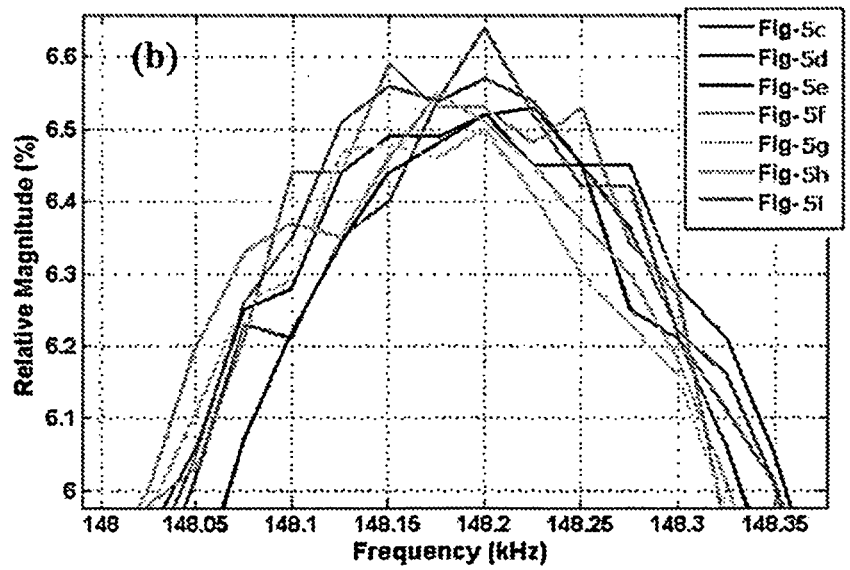
Figures 8C, 8D, 8E, 8F, 8G, 8H, 8I:
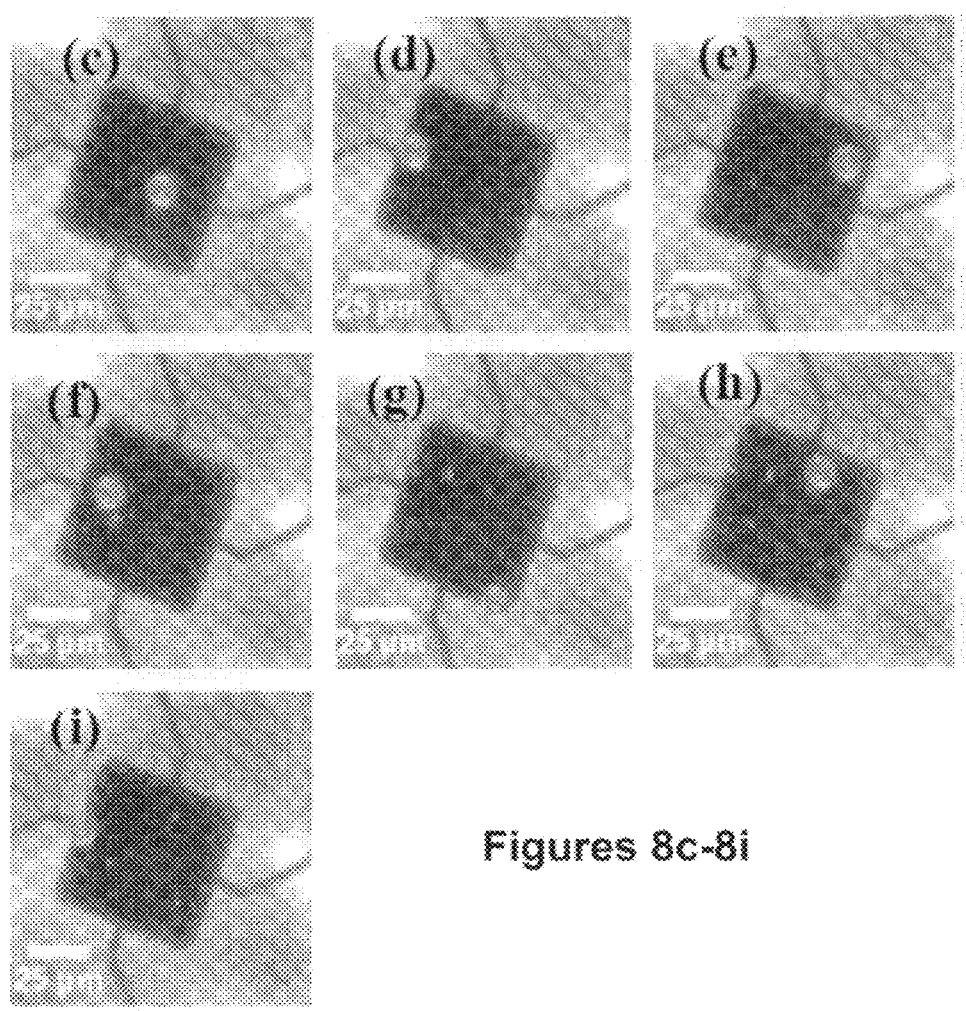
FIGS. 8c-8i show optical images of a bead on a sensor surface.

To measure the mass sensitivity, a 10 µm poly-styrene bead (~0.55 ng) was placed on the platform with a micro-manipulator and the resonance frequency shift was measured while moving the same bead to various locations with the micro-manipulator. FIGS. 8a and 8b show the resonance frequency shift measured with magnetic actuation and FIGS. 8c-8h show the corresponding locations of the bead. The difference between the maximum and the minimum extracted mass is 4.5% of the average mass. The extracted mass has a standard deviation of 1.4% from the average mass.

Conclusion

In conclusion, a resonant mass sensor with a uniform mass sensitivity with a standard deviation of 1.4% was described and its vibration amplitude as well as mass sensitivity measured to demonstrate the position independent mass sensitivity. This mass sensor is also useful for integrating in a microfluidic chamber to measure the growth rate of adherent mammalian cells in real time.

Figure Captions

FIG. 4: (a) A top-view optical image of the fabricated mass sensors. (b) Cross-sectional views of the sensors. The thickness of a silicon device layer is 2 µm and the thickness of the buried oxide layer is 300 nm.

FIG. 5: Modal simulation of the sensor structure. The displacement of the platform is plotted. The maximum vibration amplitude is 230421 at center, where the minimum vibration is 225811 at the edges. Inset: overall shape of the sensor structure used in the simulation.

FIG. 6: Schematic diagram of the experiment setup.

FIG. 7: Measured vibration amplitude of each point on the sensor. Color of each scan point represents the vibration amplitude at the position in resonance. Gray scale bar on upper left represents the scale of 0-1.2 nm.

FIG. 8a: (a) Resonance spectrums of the sensor without a bead and with the same bead at various locations. (b) Zoomed view of the box on the left. (c)-(i) Optical images of the same bead placed on the platform and moved on each point with micro-manipulator.

Example 2

Measurement of Adherent Cell Mass and Growth

The direct dependence of growth rate on cell mass for individual adherent human cells is not understood. This example describes the measured growth rate and adherent mass of human colon adenocarcinoma cells (HT-29) using micro-fabricated resonant mass sensors. Changes in the apparent mass of the cell were measured in the cell's natural state and after increasing cell stiffness through fixation. A simple model was used to determine the Young's modulus of the cell and to obtain the true cell mass. The mass determination is independent of, and in agreement with, density-based mass calculations. The results demonstrate that adherent human HT-29 cells experience a higher growth rate with a higher cell mass and it is found that the growth rate increases linearly with the cell mass at a ratio of 0.0325 (ng/hr)/ng or 3.25%/hr.

Cells undergo multiplication and differentiation within multi-cellular organisms. Understanding how these events are orchestrated by individual cells and cell populations has been of great interest for nearly 50 years. Direct measurements of changes in mammalian cell mass versus growth rate have been among this quest. Such measurements have the potential of elucidating the intrinsic mechanism for coordination between cell cycle and cell growth, and determining whether the growth rate is proportional to the cell size or whether the growth rate is constant over cell size and cell cycle. The linear growth model is based on the assumption that the rate of biosynthesis is limited by the 'gene dosage' or the amount of DNA that can initiate the transcription process. On the other hand, the exponential growth model is based on the assumption that the increase of cell mass depends on the amount of ribosomal machinery and cytoplasm. Therefore, as a cell grows larger (or heavier), it has a greater capacity to produce more mass and increase the growth rate. Theoretically, the linear growth can maintain cell size-homeostasis without a size-dependent mechanism, whereas the exponential growth requires a size-dependent mechanism for size-homeostasis.

Recently, great strides have been made towards this goal by interferometric measurements of dry cell mass, population measurements of buoyant mass (analogous to dry cell mass) of suspended cells, and volume measurements of gently synchronized sub-populations of suspended mammalian cells. However, the long-term dependence of growth rate versus mass for individual adherent mammalian cells is unknown. While cell volume can be measured through optical methods, determining cell mass is more complicated based on irregularities of cell shape. Because density and volume can have a disproportionate variance with cell mass and cell-type, determining the true mass of a cell can be influenced by these variations. Irrespective of the cell property being reported (dry mass, buoyant mass, etc.), the methods used to obtain these measures report on a fraction of the whole cells true mass.

The long-term growth of adherent human cells was measured using a silicon resonant mass sensor. Unlike cantilever based sensors, the new pedestal design described in this example retains uniform mass sensitivity irrespective of cell position on the sensor and also allows simultaneous imaging of the cells. Through measurements of fixed and unfixed cells and bio-physical modeling, whole cell mass is also estimated and it is demonstrated that other physical parameters of the cell (i.e. elasticity) can be extracted, which have implications on understanding cell growth. Most importantly, it is confirmed that for adherent HT29 cells, the growth rate increases with cell mass.

Resolving True Cell Mass Using Resonant Frequency and Elasticity.

Figure 9A:
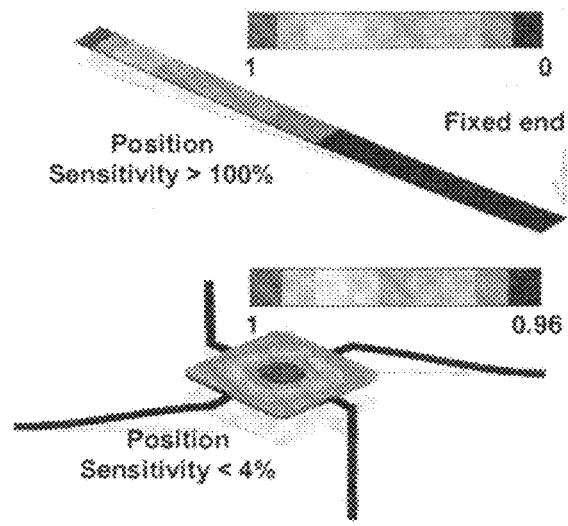
FIG. 9A shows results of modal analysis of a cantilever and a resonant sensor.
Figure 9B:
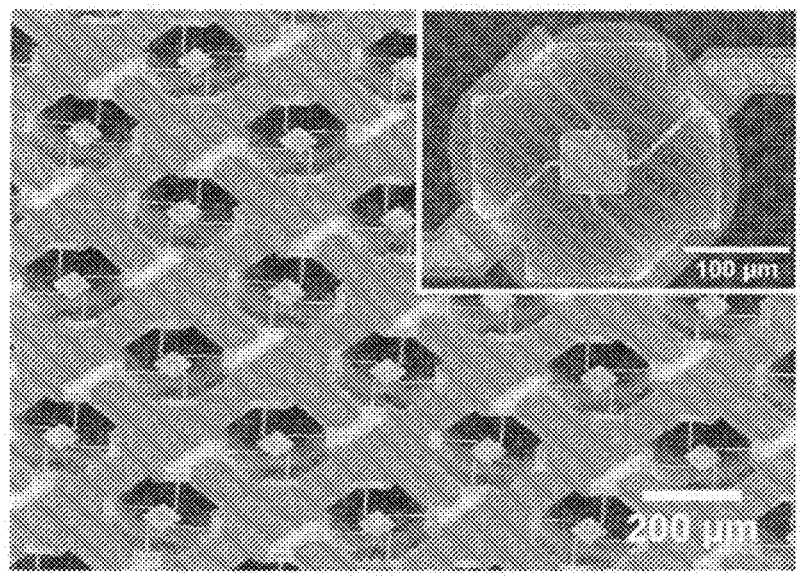
FIG. 9B shows a SEM images of a sensor array and an individual sensor (inset).
Figure 9C:
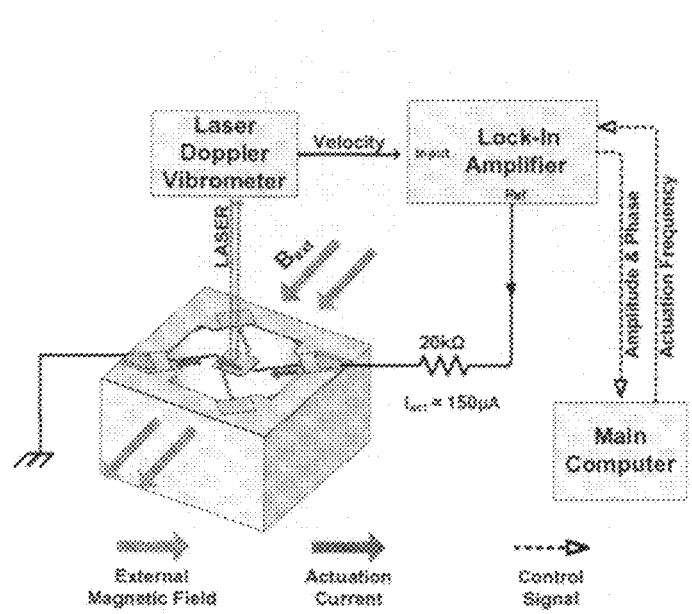
FIG. 9C shows a schematic diagram of a system for automated platform measurement.
Figure 9D:
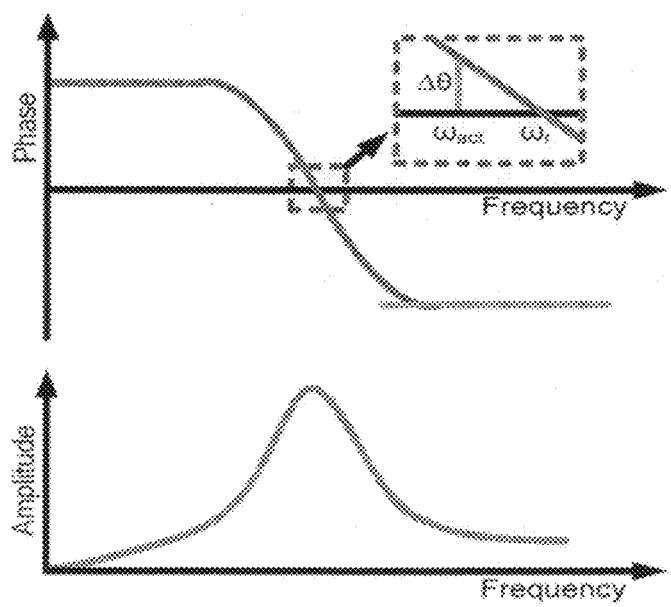
FIG. 9D provides data illustrating measurement accuracy.
Figure 13:
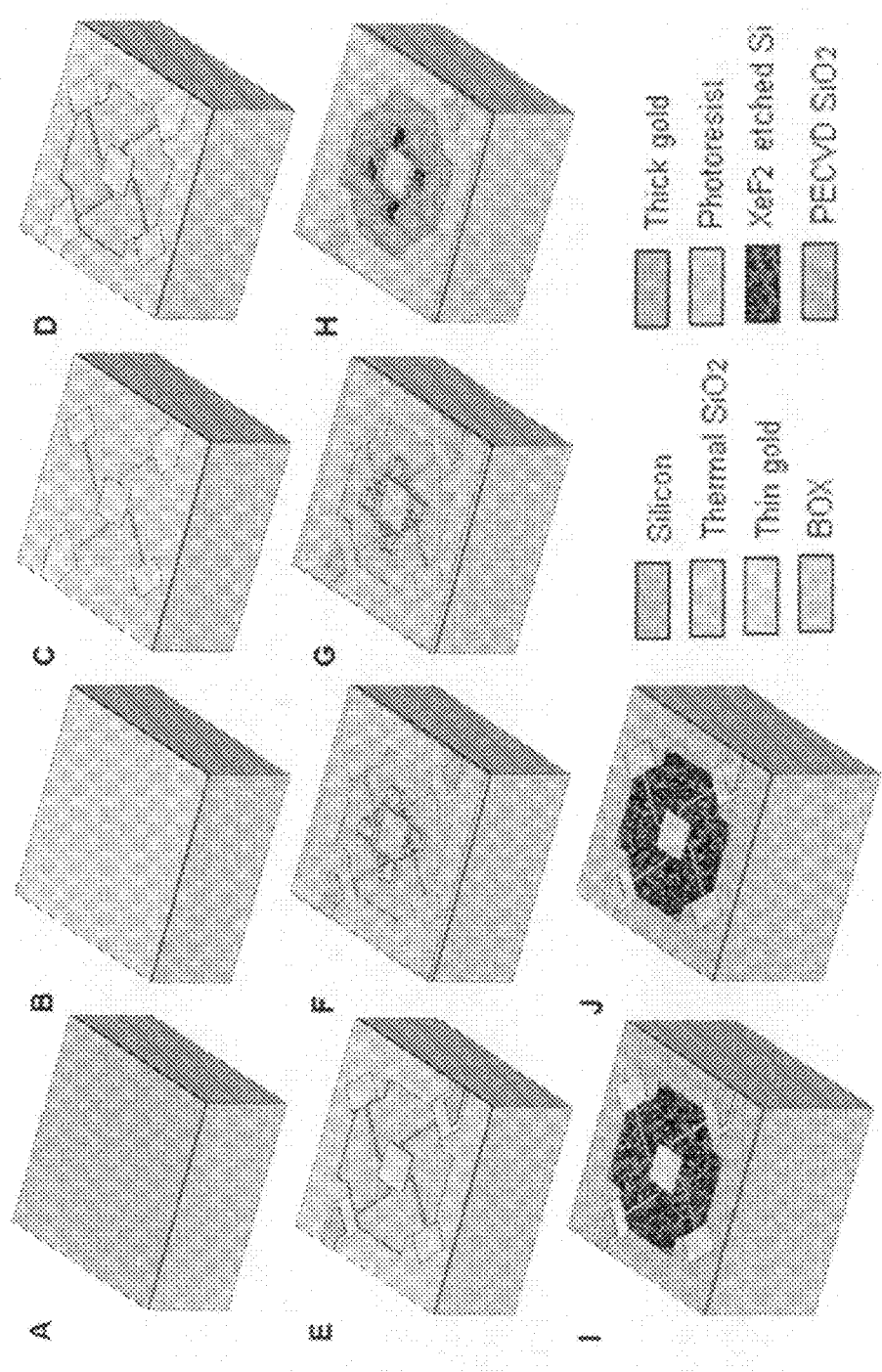
FIGS. 13A-13O provide a summary overview of sensor fabrication and assembly and cell culture chamber configuration.
Figure 14:
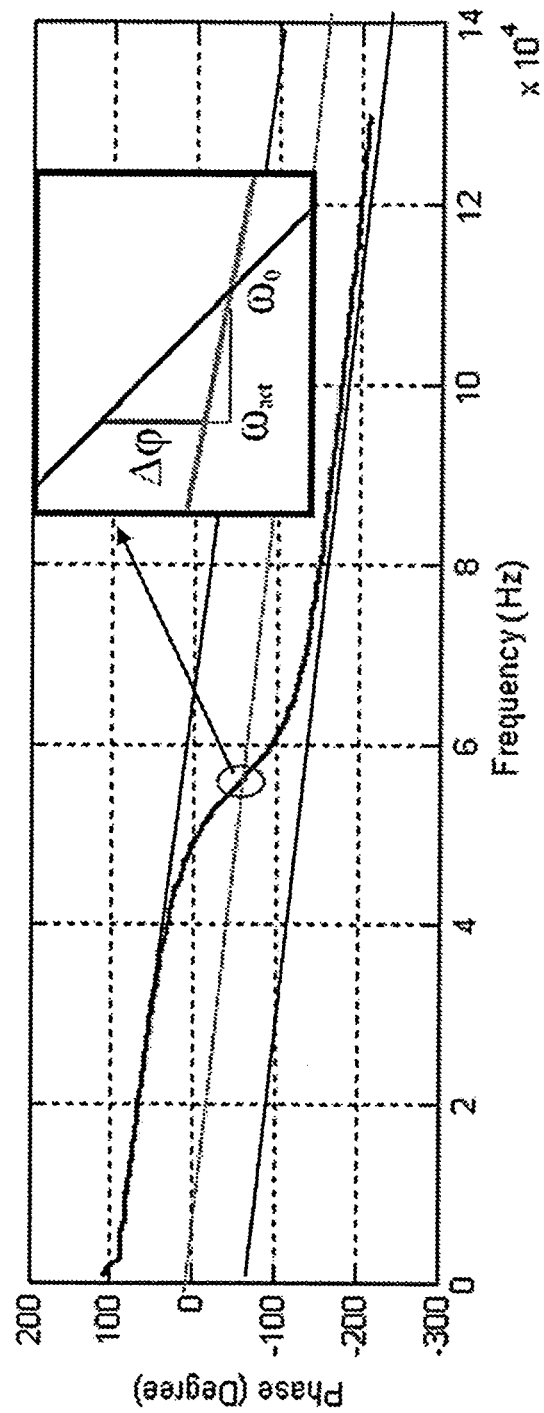
FIG. 14 provides data showing phase vibration velocity (A), phase noise velocity (B) and measured resonant frequency (C).
Figure 14:
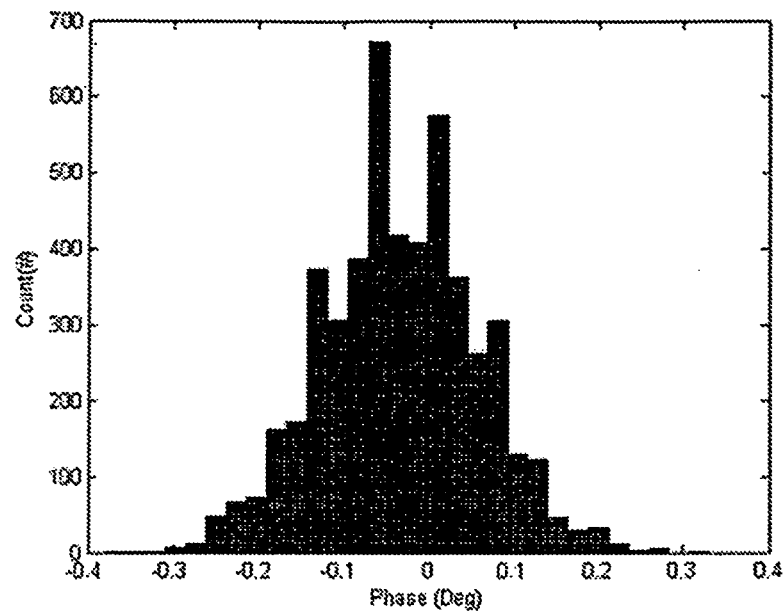
Figure 14:
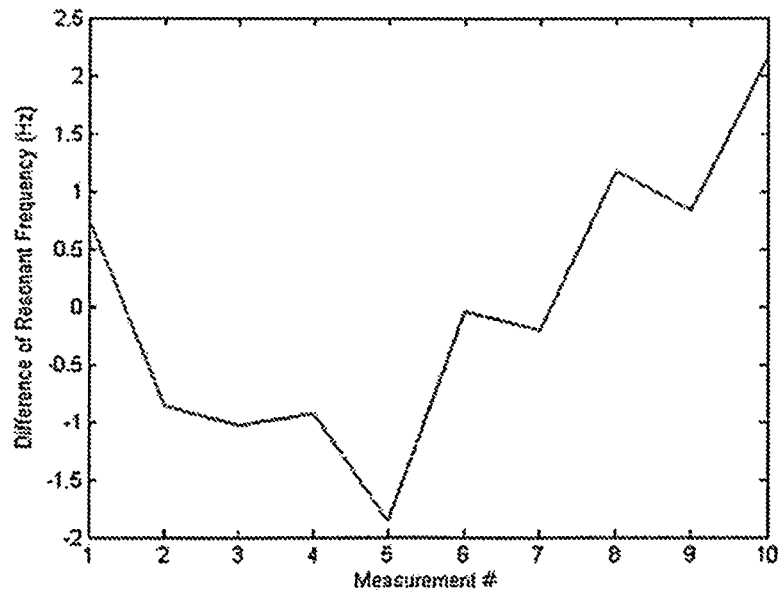

The resonant frequency of a MEMS resonant mass sensor is inversely proportional to the square root of its total mass, including the cell. Hence, by measuring the resonant frequency of the sensor, the mass of the attached cell can be measured through time. However, conventional cantilever sensors (FIG. 9A) exhibit severe non-uniform mass sensitivity, i.e. the location of the cell relative to the free end determines the mass that is measured. Through standard microfabrication processes (FIG. 13), a 9×9 array of MEMS resonant mass sensors was fabricated that achieves spatially uniform mass sensitivity (FIG. 9B). Each sensor within the array comprises a square pedestal (60×60 µm) suspended by four beam springs (l=80 µm, w=4 µm) over a ~50 µm deep pit. Due to its unique structure, the sensor exhibits maximum 4% differences of mass sensitivity on any position on the pedestal. The sensor operates in a first resonance mode, where the platform vibrates vertically at ~160 kHz in air and ~60 kHz in liquid. The sensor shows mass sensitivity of 3 Hz/pg in air and 221 Hz/ng in liquid. A Lorentz force was generated by passing an actuation current through the pedestal and by applying an external static magnetic field to the chip (FIG. 9C). For higher measurement accuracy in liquid, the frequency shift of the vibration is measured rather than the vibration amplitude change (FIG. 9D). The phase of the sensor vibration was repeatedly measured (n=250) to determine the resonant frequency within ±0.94 Hz (95% CI), yielding a mass resolution of 8.5 pg (95% CI) (FIG. 14).

Figure 10A:
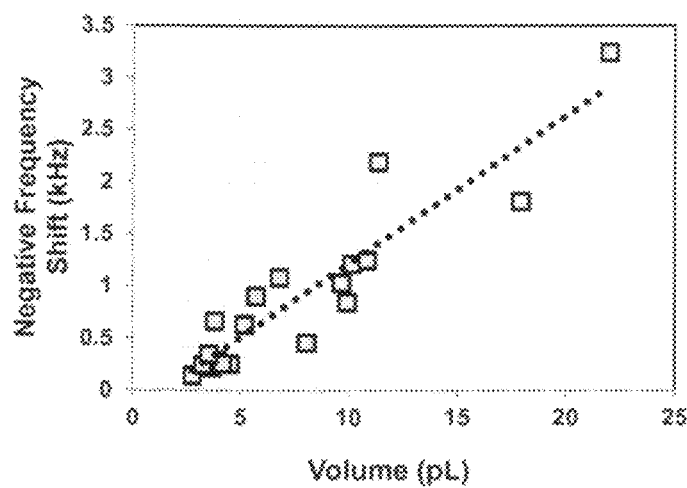
FIG. 10A provides data showing a relationship between cell volume and frequency shift.
Figure 10B:
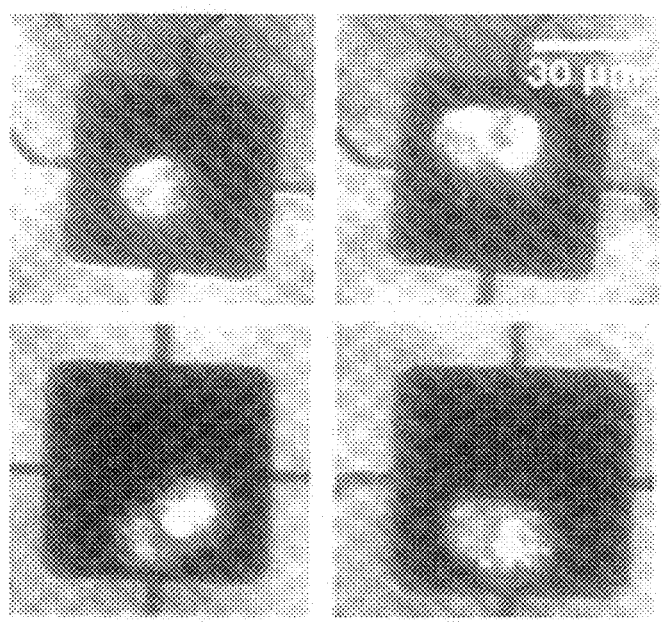
FIG. 10B provides images of cells on a sensor.

To directly measure the frequency shift of the adherent cells on the resonating platform, a PDMS micro-incubation well (100 µL) was attached to the chip—the well was hermetically and reversibly sealed—with a cover slip for extended measurement and culture at 37° C. The frequency decrease due to the mass of HT-29 cells, measured after the cells were cultured for 50-60 hours, shows a linear relationship to the cell volume of the same cells independently measured with confocal microscopy; the data accounts for single cells up to clusters of four or five cells (FIG. 10A). Light microscopy of cells on the pedestals (FIG. 10B) provides a real-time perspective of cell state that is coordinated with the platform frequency measurements for comparing cell behavior with cell mass (FIG. 12). This permits greater insight into cell migration and division in relation to the mass.

Figure 10C:
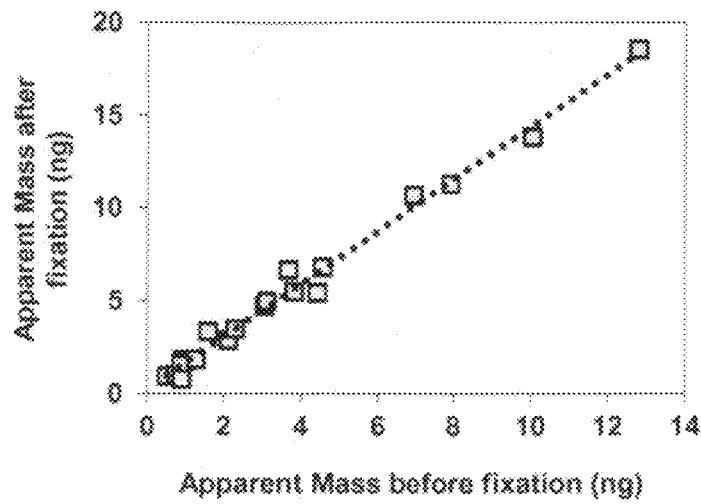
FIG. 10C provides data showing change in apparent mass before and after cell fixation.

The extracted mass of adherent, living cells through this method accounts for a portion of the cell mass derived from the imaging analysis and volume-based measurements with the assumed cell density (1.06 g/cc). The 'missing mass effect' or a reduced mass readings of visco-elastic materials on quartz crystal microbalance sensors have been reported, and the vibration amplitude of cells on a vibrating substrate has also been shown to increase with increasing cell stiffness. Since cells have a considerably lower stiffness than the sensor structure and therefore the effect of the inertial loading is reduced, the mass of fixed cells was also measured and compared the results with the mass before fixation (FIG. 10C). It is well-known that paraformaldehyde (PFA)-fixed tissue samples exhibit increased stiffness as compared to that of fresh, unfixed tissues. The cell stiffness was increased through PFA fixation (30 min) with pre-warmed (37° C.) 4% PFA in PBS and re-measured the cell mass in culture media. The measured mass is 1.41 times greater for PFA-fixed HT-29 than for the corresponding live cell, which demonstrates that indeed the measured apparent mass is a function of the stiffness for adherent cells on resonating sensors. PFA fixation of tissues is also known to cause ~3% shrinkage with variability depending on the tissue type and chemical processes used in sample preparation. The degree of single-cell shrinkage is more difficult to measure and depends on the cell composition and handling. Here, a conservative fixation process was used to minimize any fixation-induced confounds.

Figure 10D:
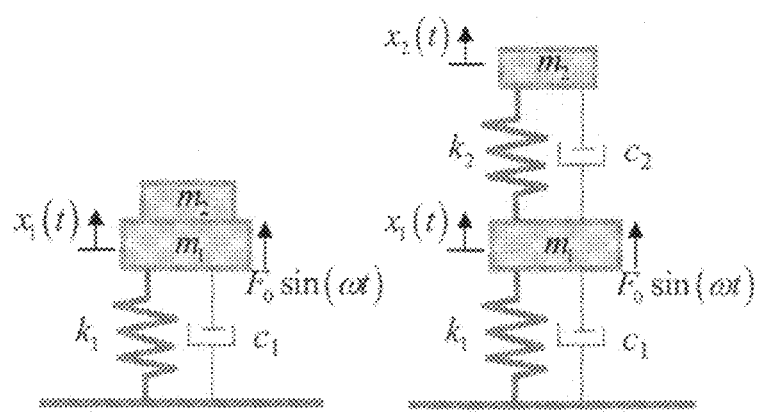
FIG. 10D shows a resonating spring/mass model.
Figure 10E:
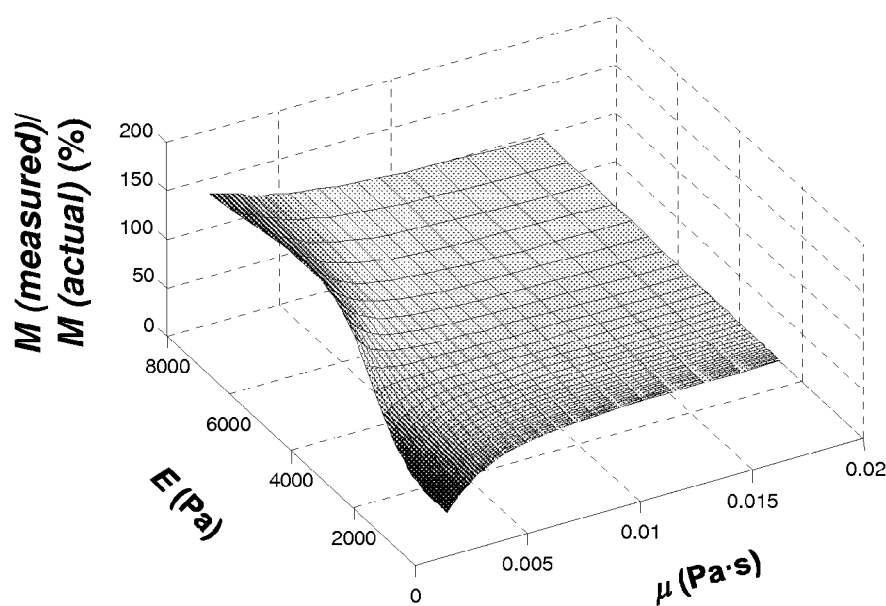
FIG. 10E provides data showing calculated dependence of the apparent cell mass on the stiffness and viscosity of the cell.
Figure 10F:
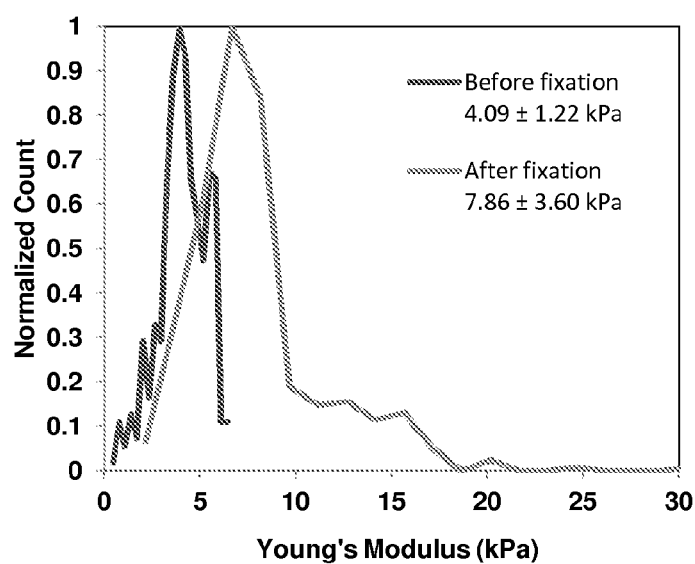
FIG. 10F provides data showing change in cell Young's Modulus before and after cell fixation.

In prior measurements, the underlying assumption has been that the attached target sample vibrates at same amplitude and completely in phase with the resonating sensor, and the cell has been modeled as a point mass, as shown in the conventional model in FIG. 10D (left). The sensor vibrating in liquid is modeled as a mass-spring-damper system, where the sensor mass is m1, the spring constant ($k_1$) and the coefficient of viscous damping ($c_1$). The measured mass under this assumption is referred to in the previous paragraph and hereafter in the following text as the apparent mass. Clearly the mass of the adherent cell (live or fixed) is distributed throughout the volume enclosed by its membrane. The distributed mass will not vibrate in phase and at the same amplitude with resonating sensor. Therefore the measured apparent mass does not reflect the true mass of the cell. To obtain the true mass and derive the mechanical properties of the cell beyond the conventional model, a simple dynamical model was used with a mass $m_2$, a spring constant ($k_2$) and damping coefficient ($c_2$), shown in FIG. 10D (right), as an idealized cell, and calculated the equivalent mass, Young's modulus and viscosity of HT-29 cell. When the sensor is driven by the external sinusoidal force, the frequency ($\omega_0$) at which the sensor velocity is in sync with the external force, is recorded. The frequency ($\omega_0$) can be determined through solving the response of this two-degree-of-freedom system to the external harmonic excitation. Under the harmonic excitation $F(t)=F_0 e^{i\omega t}$, the equations of motion of this damped two-degree-of-freedom system can be solved through mathematical modeling of multiple non-linear equations. This simple two-degree-of-freedom model demonstrates that the measured mass using resonant sensors can be a function of the stiffness and viscous damping of the cell structure (FIG. 10E). It is clear that, only when the stiffness and viscosity of the cell are infinitely large, the true cell mass is equal to the measured cell mass. Assuming that the true cell mass does not change during fixation (i.e., the true cell mass before fixation is equal to that after fixation), the two-degree-of-freedom model can be used to estimate the Young's modulus and viscosity of the cell using the experimentally measured values of cell mass before fixation (FIG. 10F). Under the same assumption, the real mass is 1.4 times the values of mass measured by the sensors. All measured mass values from here on were corrected by 1.4 to account for the finite Young's modulus and viscosity of the cell and it is assumed that this value does not change through the cell growth.

The Dependency of Cell Growth on Mass.

Figure 11A:
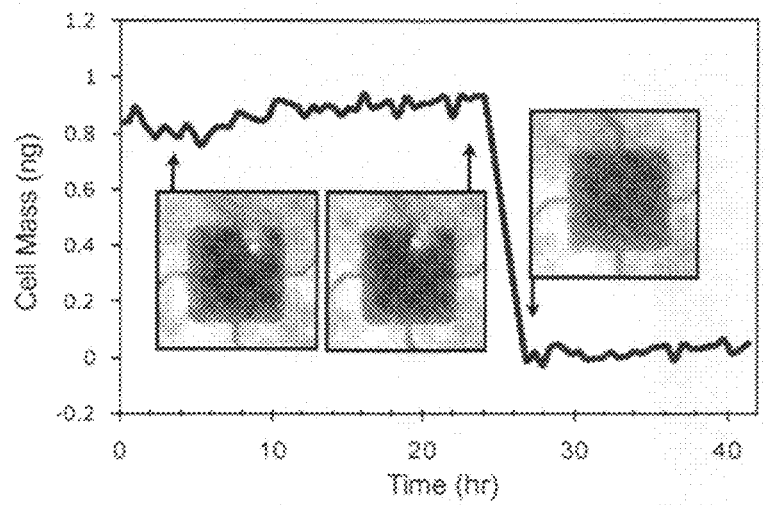
FIGS. 11A-11D provide data showing changes in cell mass as a function of time.
Figure 11B:
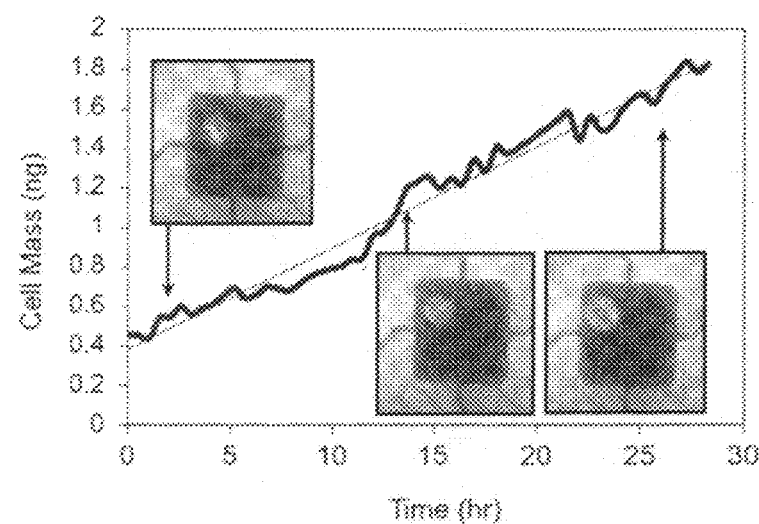
Figure 11C:
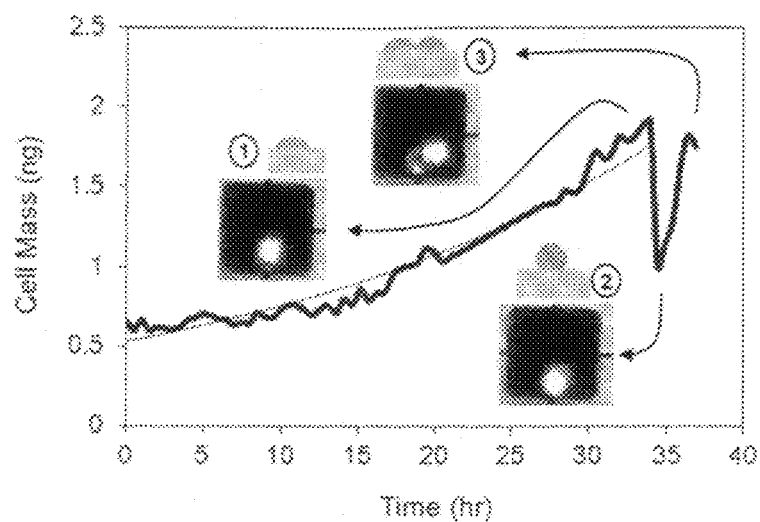
Figure 11D:
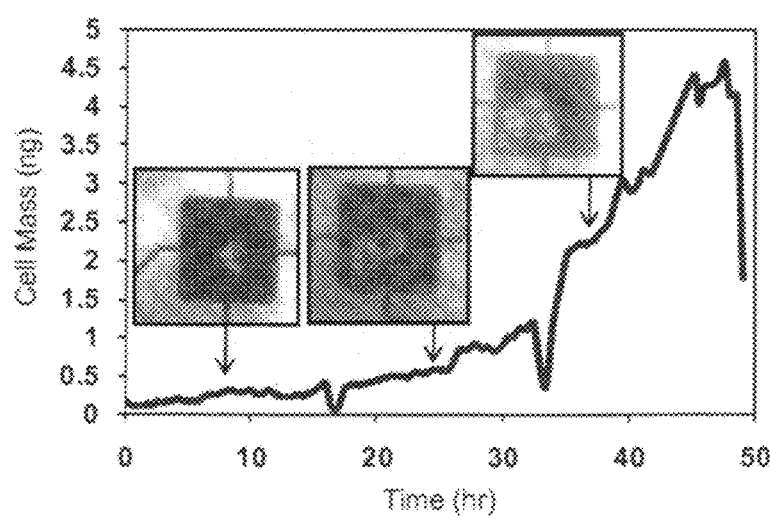

From direct, long-term measurements of HT-29, a loss of mass (−0.85 ng) was observed when a dead cell was removed during the media change after 25 h in culture (FIG. 11A); the empty sensor data demonstrates the background noise less than 0.1 ng for over 10 hrs. When single cells grow on the mass sensors, the mass increase from cell growth and proliferation can be repeatedly measured (FIG. 11B-C) to generate long-term growth profiles of individual cells and daughter cells over 60 hours (FIG. 11D). Individual HT-29 cell data demonstrate an increasing mass versus time where the results could be fitted by linear (FIG. 11B) or exponential curve fits (FIG. 11C). Interestingly, it was also found that individual cell division events can be detected by a sharp decrease in apparent cell mass as cells partially detach from the platform (FIG. 16) and thus exhibit lower effective stiffness during mitosis (FIG. 11C). The sensors can thus be used to sensitively detect the adhesion of single cells to the silicon platform. FIG. 11D shows the growth of a single cell and the mass of dividing daughter cells that are inherently synchronized; division events show characteristic mass decreases at 16.5 hour intervals with the respective number of cells for each of the three growth periods being 1, 2, and 4 cells.

Figure 12A:
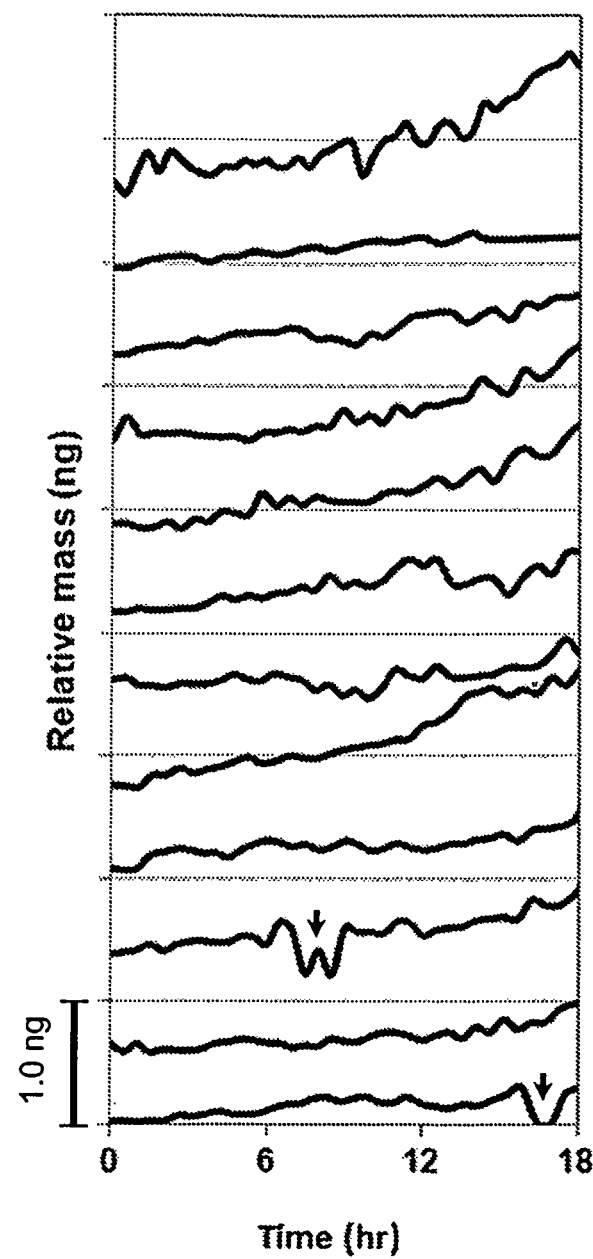
FIGS. 12A-12D provide data showing the analysis of cell growth rate versus cell mass.
Figure 12B:
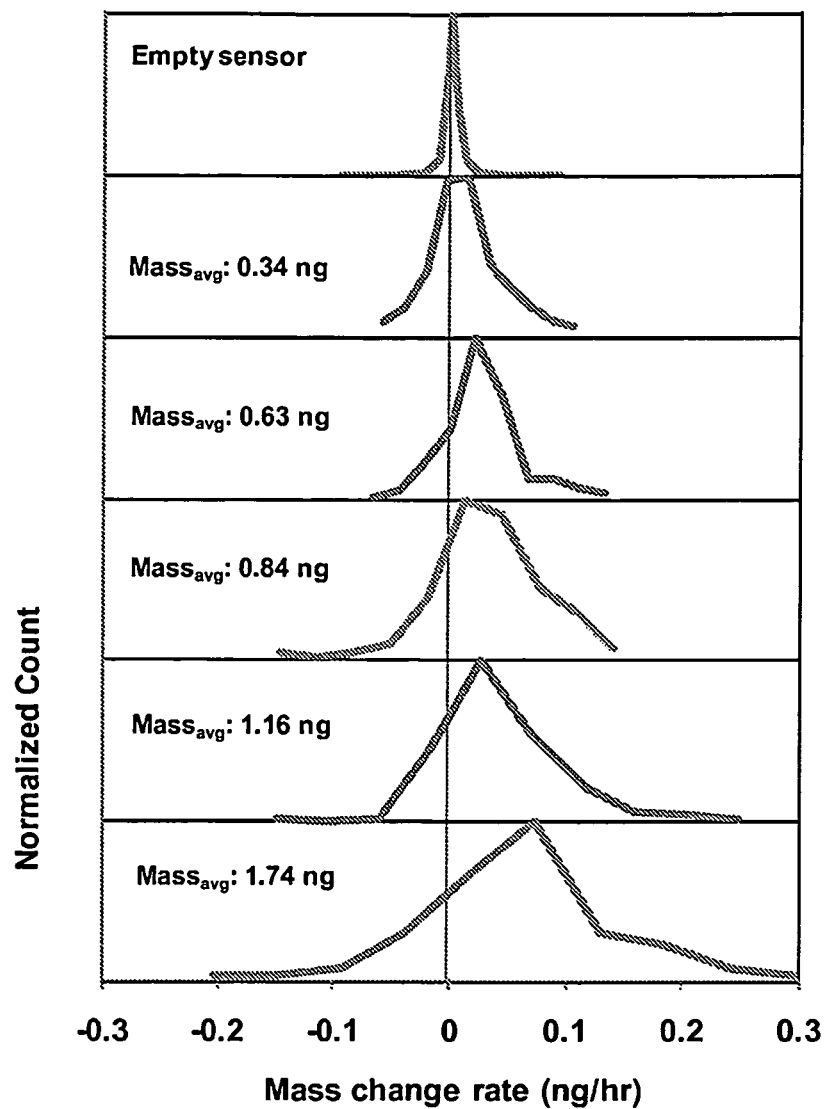
Figure 17:
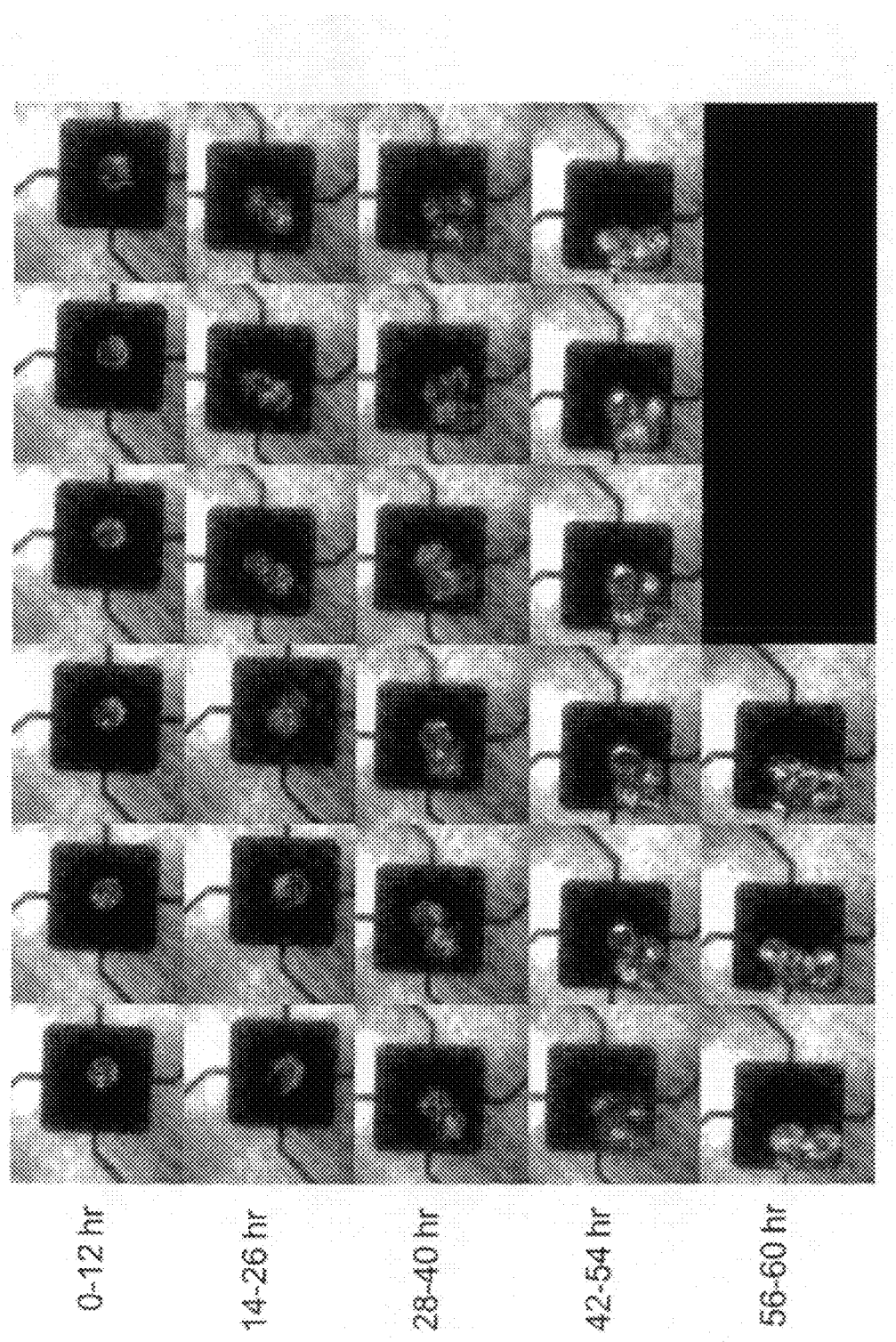
FIGS. 17A-17D provide an image sequence of HT-29 cells cultured on MEMS resonant platforms.
Figure 17:
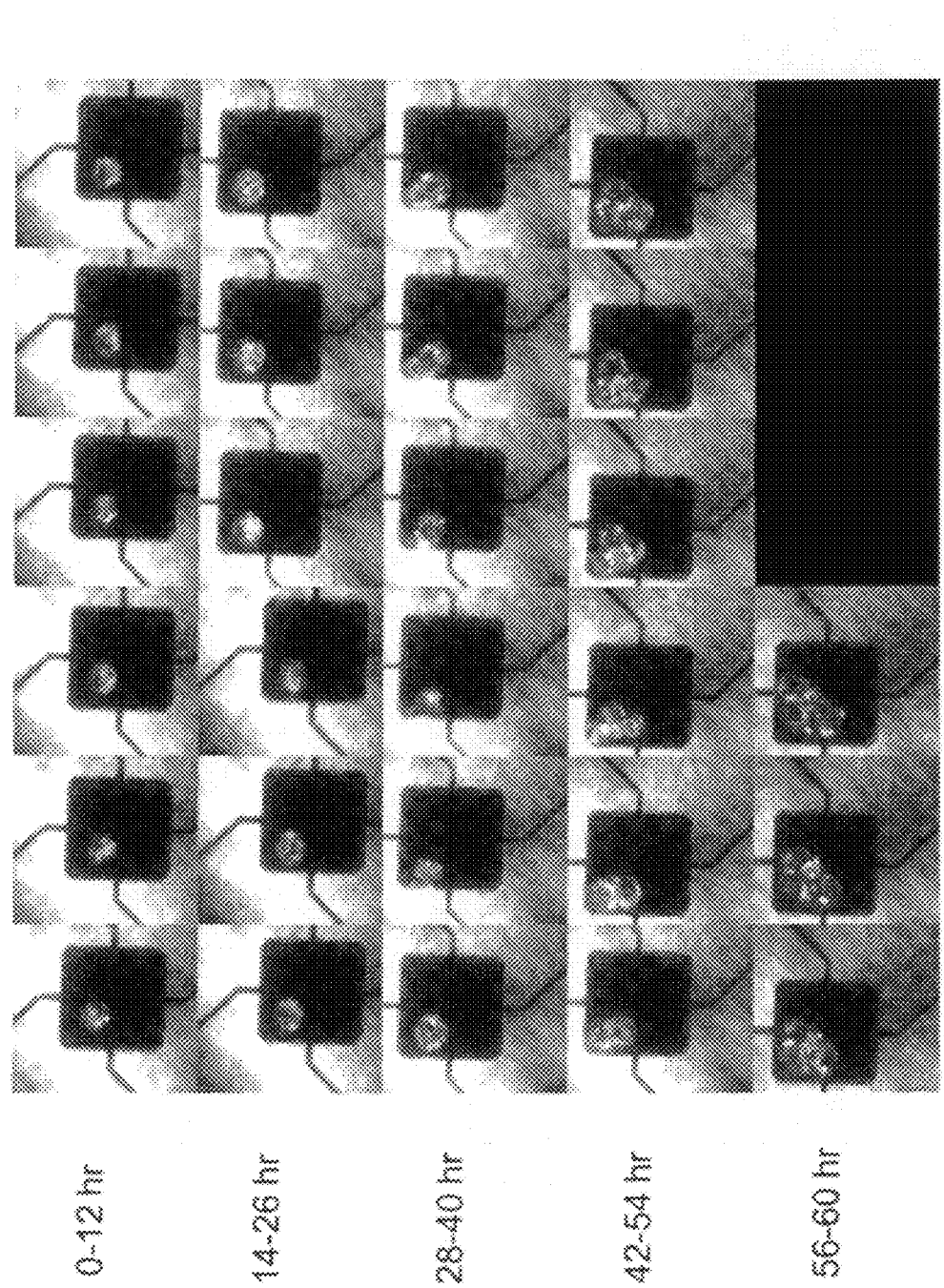
Figure 17:
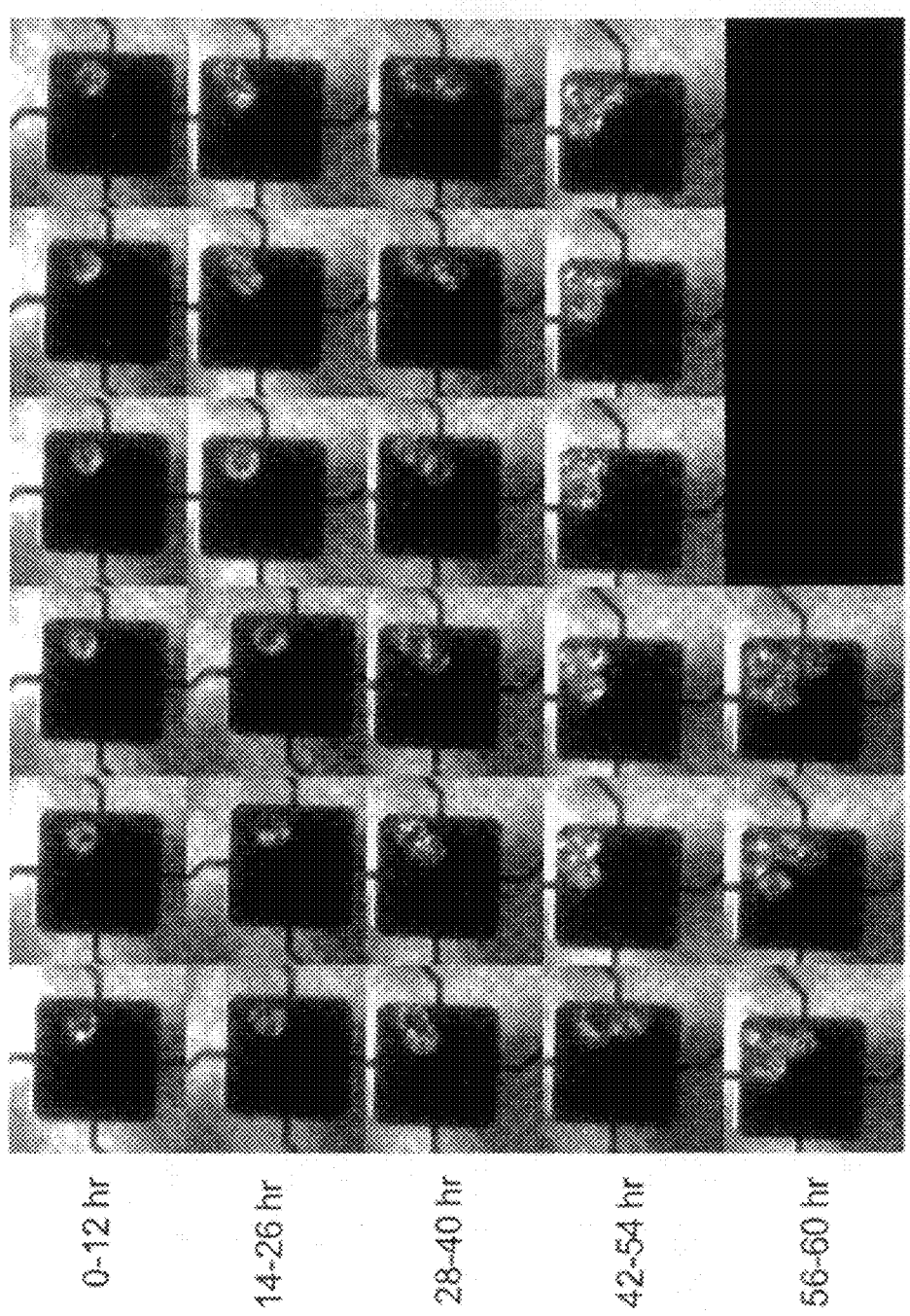
Figure 17:
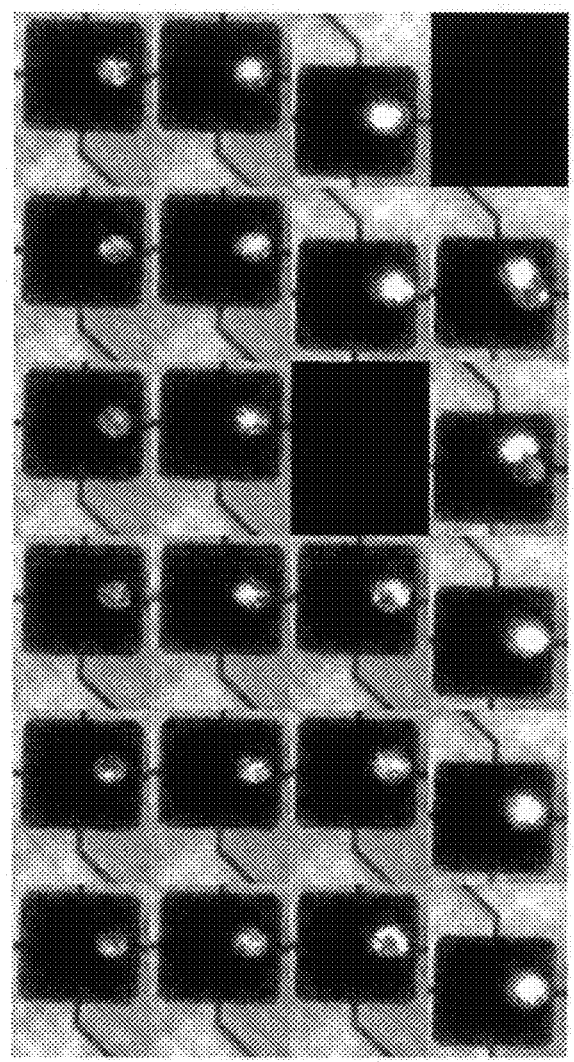
Figure 18:
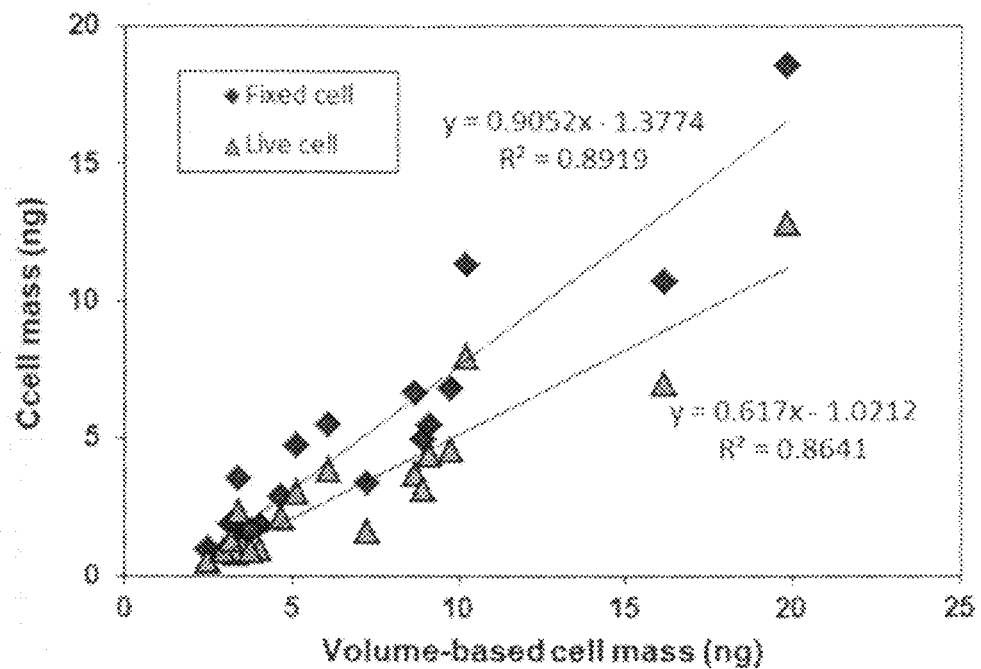
FIGS. 18A-18D provide data showing measured apparent cell mass and volume based cell mass.
Figure 18:
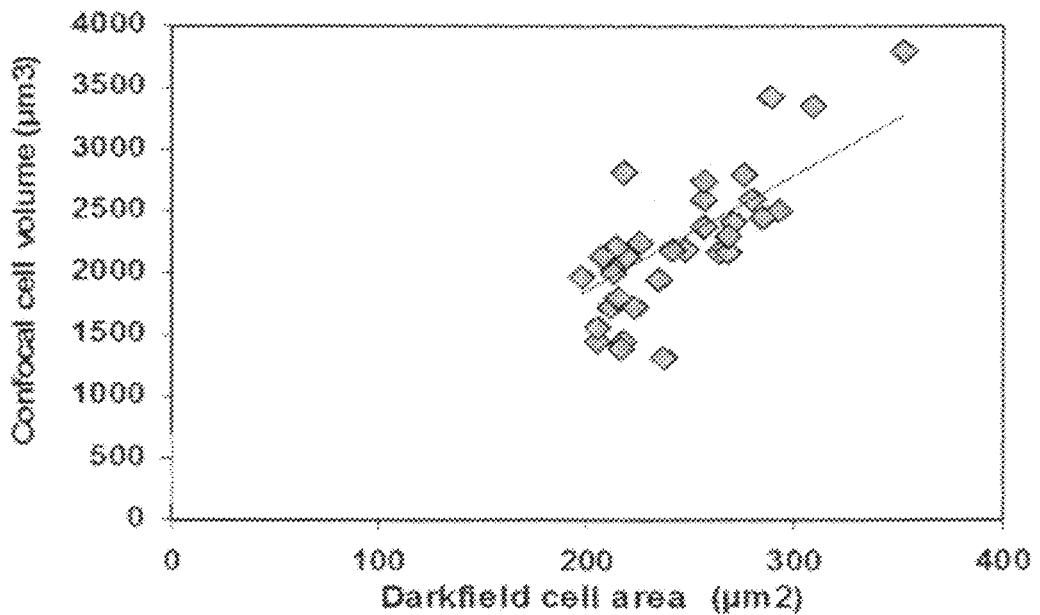
Figure 18:
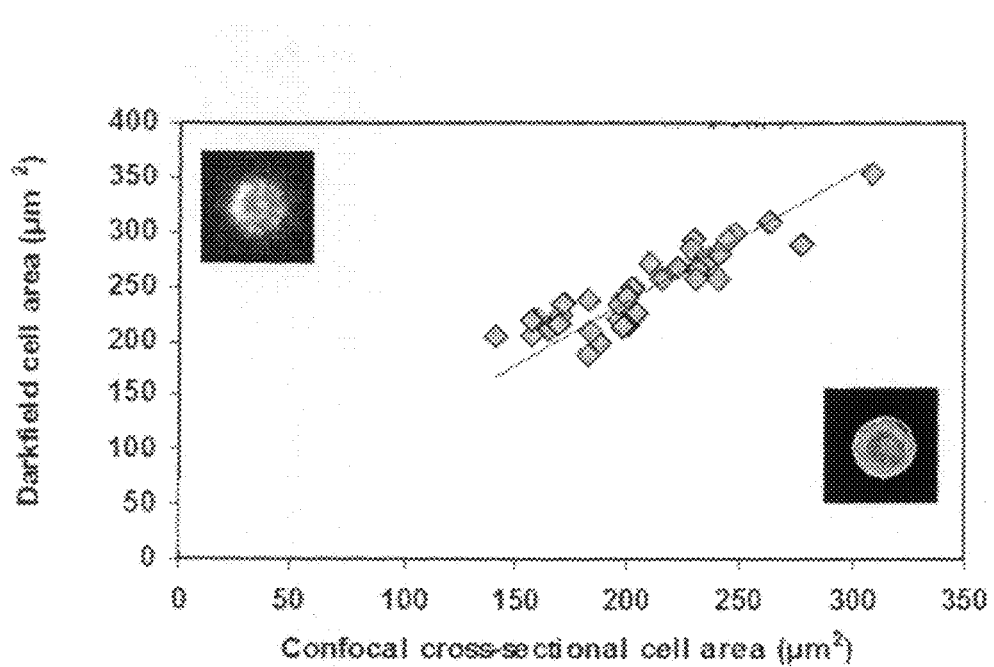
Figure 18:
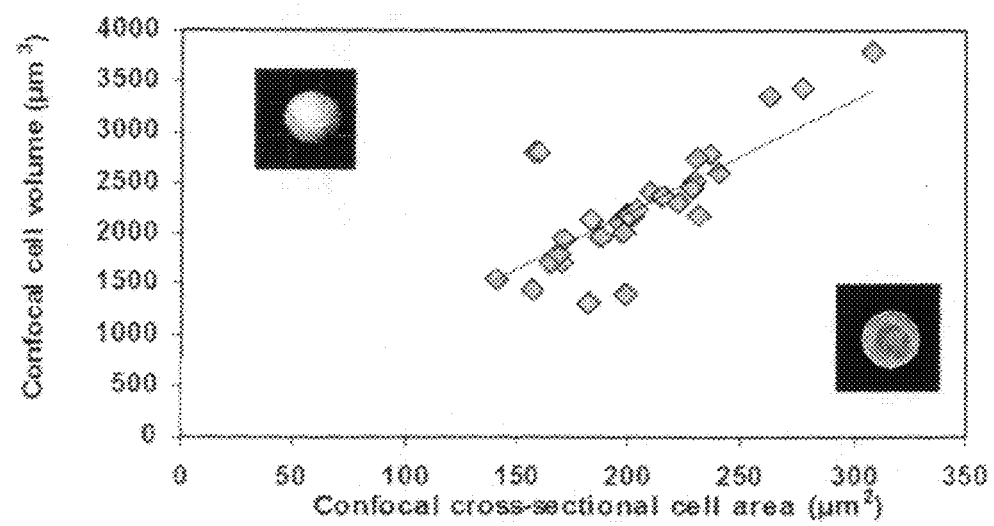

To understand the growth characteristics of the HT-29 population, the mass data from 23 characteristically different single cell profiles was analyzed. FIG. 12A shows some of the individual cell mass profiles. FIG. 12B shows the mass and growth rate data divided into 5 groups according to their mass size; the histogram of each population group demonstrates the symmetrical distribution of the mass accumulation. Negative mass change rates, suggest decrease of mass readings within short time periods, which could arise from oscillations in the cell mass, or could be explained by changes in cell stiffness, viscosity, or the density. It is likely that it is no single effect, but rather a combined effect of more than one; the biological source could be changes in the cytoskeleton, mass accumulation, redistribution or changes in cell contact adhesion. Small fluctuations of these properties are naturally expected and can be detected by our sensors. In spite of these fluctuations, it was found find that over longer periods there is an overall increase in measured cell mass, as also confirmed by optical microscopy (FIGS. 17-18).

Figure 12C:
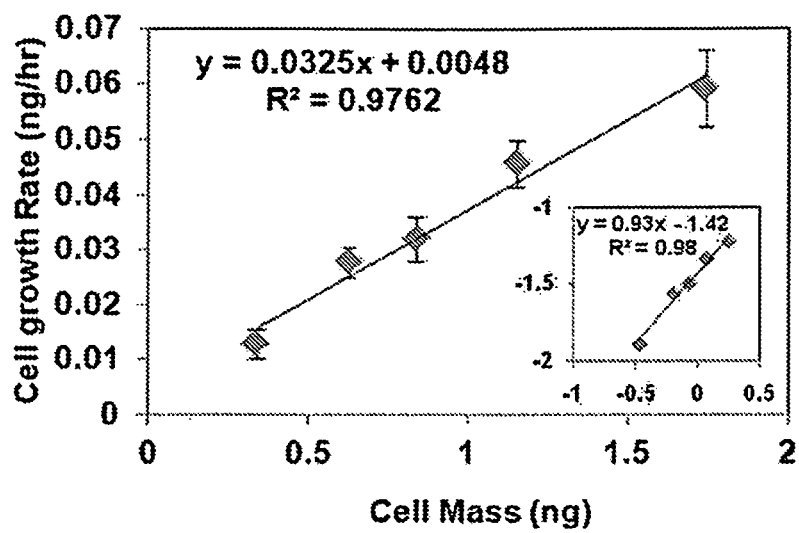
Figure 12D:
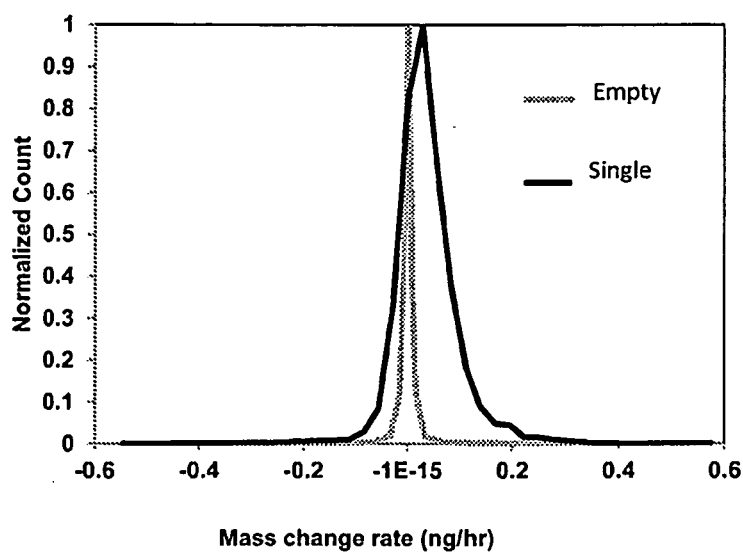

FIG. 12C shows that the distribution of mass changes depicts an increased rate of mass accumulation for heavier cells and that the cell growth rate is linearly increasing with the cell mass. From the analysis of growth rates of single cells (FIG. 19), it is found that the HT-29 cell grow on average 3.25% of its mass every hour, which leads to about 22 (=log 2/log 1.032) hours of mass doubling time. The analysis was extended beyond single adherent cells per pedestal to include those pedestals that captured multiple cells (FIG. 20). From the 60+ hours of cell growth, the mean population growth rate is 3.98% per hour.

Discussion.

The replication of intracellular materials and/or organelles is a highly regulated process during cell growth. As a direct result, this biomass accumulation increases the physical cell size which corresponds to changes in the volume and mass of the cell. While the aggregate data from population studies supports linear or exponential growth regimes, it can depend on the status of the cell, and the cell type, under investigation. Nevertheless, it is reasonable to expect that growth variations exist between individual cells within the same population and between differentiation states. It is recognized that the human cells used here are cancer-derived, yet the system of measurement is able to preserve the growth characteristics of individuals, simultaneously acquired through long-term mass measurement and light microscopy.

With insight into the growth and mass accumulation of single cells through time, greater perspectives are gained into how cells grow individually and as a population. Though the average population growth rate of HT-29 is size dependent and increases as the cell mass increases, cell-to-cell growth characteristics can be strikingly different. In the larger context, it is proposed that linear growths can lead to size homeostatis, whereas the exponential growth requires certain cell-size related checkpoint to maintain cell size homeostasis. While the precise mechanisms of size homeostasis remain elusive, it is likely that size is differentially regulated by many factors, including: cell contact (adherent vs. suspended cells), diffusive and surface bound signaling cues, genetic and epigenetic programs operating in the range of cells (quiescent or dividing) in the various tissues. With the system described here, it is shown that adherent cells grow at an exponential growth rate.

A simple dynamical model has been used to account for the effects of stiffness and damping of the cell on the measurement of cell mass. The results on live and fixed cells indeed indicate that the apparent cell mass measured depends on the stiffness of the cell. Such model can be used to explain the commonly observed "missing mass effect". It should, however, be cautioned that the dynamical model used in this analysis is rather simplistic, and should only be expected to yield approximate trend rather than accurate quantitative results. Nevertheless, considering the elasticity and viscosity of the cell using a dynamical model represents a crucial improvement over existing methods that treat the cell as a point mass perfectly attached to the sensor.

The MEMS sensors described in this example expand understanding on the adherent cell's growth profile in a minimally invasive way. Moreover, the ability to optically monitor the cell while being able to measure their mass can open up a wide set of analysis, combined with a variety of a fluorescent bio-marker, such as cycle reporter (S-phase marker or Fucci), to relate the growth profile with the cell cycle more precisely. With enhanced throughput through smart cell placement and additional capabilities with fluorescent imaging, the measurement system described in this example can make a contribution to understand various cellular processes, such as cell growth, apoptosis and cell proliferation.

List of Figure Captions.

FIG. 9. Sensor schematic and experimental set up. (A) Modal analysis of conventional cantilevers in fluid media via finite element simulations (22) show that they have a spatial non-uniform mass sensitivity for measuring mass of greater than 100% from the free edge of the cantilever to the middle of the cantilever (top simulation image), whereas resonating platform designs demonstrate spatial non-uniformity of mass sensitivity to be less than 3% from the center to the edge of the platform (bottom simulation image). (B) SEM image showing 20 sensors of an 81 sensor array, an individual sensor is shown in the inset. (C) Schematic diagram summarizing the setup for automated platform measurement through Laser Doppler Vibrometry. (D) Measuring the frequency phase of vibrating platform provides greater accuracy over frequency amplitude for resonating platform measurements in liquid.

FIG. 10. Measurement of frequency shift of adherent cells on pedestal sensors for extracting material properties of the cells. (A) The resonating platform frequency shift (decrease) is directly related to cell volume of attached cells, confirming the general trend that an increase in cell volume (and mass) decreases the measured frequency. (B) Dark field images of representative sensor platforms with HT-29 individual and newly divided daughter cells, on which the resonant frequency measurements in A were performed. (C) The apparent mass of HT-29 cells after fixation is 1.4 times greater than the same cells before fixation. (D) Schematics of dynamical models demonstrating the conventional 'mass-spring-damper system' (left), and the 'mass-spring-damper system' used to obtain the Young's modulus, elasticity, and cell mass from experimental data of resonating sensors and confocal microscopy. (E) Calculated dependence of the apparent cell mass on the stiffness and viscosity of the cell. For large stiffness and viscosity, the measurement results in the real mass. (F) Histograms of calculated Young's modulus of HT-29 before and after fixation.

FIG. 11. Mass measurement of adherent cells versus time. (A) A mass decrease is observed when dead cells or debris are removed during media changes, an internal measurement control. (B) The mass increase of a single HT-29 cell (blue line) with a linear curve fitting (black line, y=0.0513x+0.3848). (C) Prior to cell division, an individual HT-29 cell growth data (blue line) conforms to an exponential curve fitting (black line, y=0.5303e0.0353x). Cell division events are marked by sharp mass decreases (inset 1-3). (D) Mass changes versus time of an inherently synchronized HT-29 cell growing and dividing into 2 and 4 cells; three divisions distinguish the growth profiles.

FIG. 12. Analysis of cell growth rate versus cell mass. (A) Relative mass increases from 12 different individual HT-29 cells. For single cell growth analysis, the data was analyzed prior to mitotic events (two divisions are shown, arrow heads). (B) Five histograms account for all cell mass accumulation data of HT-29 cells. Top plot show the background noise of an empty sensor while the bottom four plots show an increasing distribution of mass; data bins are non-overlapping and show average cell mass per bin. (C) Average HT-29 cells acquire an additional 3.25% of its whole cell mass every hour. The log-log relation shows a power law of <1 which is consistent with scaling rules of energy consumption versus size of an organism (30). (D) Background sensor and cell data are from a single cell.

Materials and Methods.

A. MEMS Sensor Fabrication & Setup:

Fabrication.

Silicon on Insulator (SOI) wafers with a 2 μm device layer and a 0.3 μm buried oxide (BOX) layer were used as the starting material [FIG. 13A].

Step 1) A 25 nm silicon dioxide layer was grown by a thermal oxidation, to electrically insulate the device layer from the subsequent metal layers [FIG. 13B]

Step 2) The first lithographic process to define the first metal layer for electrode and sensor platform used S-1508 (AZ Electronic Materials USA Corp., USA) and LOR-3A (Microchem Corp., USA) for subsequent lift-off process.

Step 3) Then chrome (10 nm) and gold (50 nm) layers were deposited by e-beam evaporator and patterned by a lift off process with the previously patterned photoresist (Step 2). [FIG. 13C]

Step 4) The patterned metal layer (Step 3) and the patterned layer of photoresist, AZ-9260 (AZ Electronic Materials USA Corp., USA) from the second photolithographic process was used to define the areas to be etched to define the sensor structure (platform and springs).

Step 5) The exposed device layer was etched completely by ICP RIE to define the springs and the platform. [FIG. 13D]

Step 6) Then, a third photolithographic step with LOR-20B (Microchem Corp., USA) and AZ-9260 was used for the second lift-off process, followed by the deposition of a 100 nm chrome layer and a 900 nm gold layer for wire-bonding pads. [FIG. 13E]

Step 7) After the lift-off, a release window was photolithographically defined by the fourth lithograph process (AZ-9260) [FIG. 13F] and the exposed BOX was etched by RIE leaving the Si substrate exposed. [FIG. 13G]

Step 8) Then, the wafer was diced into individual chips.

Step 9) Through the release window, the exposed Si substrate was etched by vapor phase etching using xenon difluoride ($XeF_2$) to release the sensor structure to form a 'pit' beneath the platform and springs. [FIG. 13H]

Step 10) After $XeF_2$ etching, the photoresist and the BOX were removed by BHF etching and solvent cleaning. [FIG. 13H]

Step 11) The die was cleaned with oxygen plasma and then a 100 nm thick silicon dioxide layer was deposited with plasma enhanced chemical vapor deposition (PECVD) for insulation. [FIG. 13J]

Step 12) The PECVD oxide on the bonding pads was selectively etched for wire-bonding.

Step 13) Then, each die was attached to a custom made printed circuit board (PCB) and wire-bonded. [FIG. 13K]

Step 14) To enable long-term cell culture on the sensory array [FIG. 13L], a PDMS well (6 mm diameter) was attached directly to the chip [FIG. 13M]. To clean the chip and remove bubbles from beneath the mass sensors, the culture well was filled with 70% ethanol and degassed by vacuum exposure. Ethanol was then exchanged for a collagen type I solution (100 μg/mL) for at least 30 min at 37° C. prior to cell culture.

Experiment Setup.

The sensor was placed in the spatially uniform magnetic field generated by the permanent magnet and guided by a magnetic core as shown in FIG. 13M. The sensor was electromagnetically actuated with a reference signal from a lock-in amplifier (Model 7280, Signal recovery, USA). The reference signal (max amplitude: 1V rms) was connected to each row of the sensor array through a data acquisition switch unit (34970A, Agilent, US) for signal routing, and then a 20 kohm resistor to limit the actuation current, down to 150 pA. The velocity of the sensor was measured by the laser doppler vibrometer (MSV-300, Polytec, USA), and the measured velocity was analyzed with the lock-in amplifier to produce the magnitude and the phase information with respect to the lock-in amplifier's reference signal.

The device and magnetic setup were enclosed in a temperature controlled chamber to provide constant physiological condition for cell culture as shown in FIG. 13M. The temperature of the chamber was measured with a thermistor (PS103J2, U.S. Sensor, USA) and a digital multimeter (3478A, Hewlett-Packard, USA). The chamber was heated with two kapton heaters (K-36060-10, Cole-Parmer, USA) and a DC power supply (E3648A, Agilent, USA). The temperature of the chamber was controlled with a PID controller, implemented with Matlab. The temperature was maintained at 37±0.05° C., during the experiment.

The whole setup was mounted on a microscope (Axiotech vario, Zeiss, Germany) with a motorized stage (OptiScan2, Prior, USA) for the automated measurement and imaging. The illumination is a mercury lamp (HBO-100, Zeiss, Germany) with a shutter (Lambda SC IQ-35, Sutter Instrument Company, USA). A UV long-pass filter (NT54-049, Edmund Optics, USA) was installed in the illumination path to avoid any cell-damages from UV exposure. Additionally, the shutter was opened only for 0.5 second while imaging each sensors to minimize UV-illumination. During the measurement, the dark field microcopy allows both the LDV measurement as well as cell imaging with a microscope camera (PCO-1600, PCO, Germany). An optical filter (NT49-820, Edmund Optics, USA) was installed in front of the camera to remove the reflection of the 632 nm HeNe laser from the LDV. The LDV measurement requires two laser beams on the device, one on the moving platform as a signal beam and the other on the stationary substrate as a reference beam. The location of the two laser beam spots with a 4 μm diameter, were carefully selected for each sensors, to prevent cells from being directly exposed to the laser.

B. 3D Finite Element Analysis.

Full three-dimensional (3D) finite element, analysis (ANSYS) is performed to model the interaction of the elastic silicon structure with the fluid medium. The pressure formulated fluid element is used to model transient or harmonic state of the coupled fluid-solid system. The governing equations for the fluid and solid elements take into account the coupling of the pressure and structural motion at the interface.

The resonant frequencies obtained with the 3D finite element analysis are 170±48 kHz in air and 59.6±3.2 kHz in liquid. These results are consistent with the experimental data. The error bars in the simulations account for the uncertainties in the Young's modulus of silicon (150±20 GPa), the thickness of the platform (2.0±0.5 μm) and the density of the liquid (998±99.8 kg/m3).

The mass sensitivity of the resonant sensor at any spatial location is proportional to the square of the vibration amplitude at that location. The mass sensitivity of the conventional cantilever and the resonating platform structure are determined from the amplitudes of the 3D coupled solid-fluid finite element analysis. The amplitudes are normalized with the maximum amplitude to obtain the normalized mass sensitivity. The results are shown in FIG. 9A.

C. Sensor Characterizaton:

Resonant Frequency Estimation.

The sensor can be modeled with a second-order harmonic oscillator, as follows.

$$m\ddot{x}+c\dot{x}+kx=E q . 1$$

The frequency response of the sensor's velocity can be described as follows.

$$|j\omega X(\omega)| = \frac{|F_{ext}(\omega)|}{\sqrt{m^2\omega^2 + \frac{k^2}{\omega^2} - (2km - c^2)}} \quad \text{Eq. 2}$$

$$\angle[j\omega X(\omega)] = \left[\tan^{-1}\frac{k-m\omega^2}{c\omega}\right] + \angle[F_{ext}(\omega)] \quad \text{Eq. 3}$$

From the actual frequency response, the parameter in air and liquid was estimated as follows. In Air: m=17 ng, c=90 nNs/m, and k=19.4 N/m; In Liquid: m=110 ng, c=9.5 μNs/m, and k=19.4 N/m.

In this work, the resonant frequency was defined as the undamped natural frequency of the sensor, where the phase of the sensor velocity is zero with respect to the external actuation force, $F_{ext}$.

$$\angle[j\omega X(\omega)] - \angle[F_{ext}(\omega)] = \tan^{-1}\frac{k-m\omega^2}{c\omega} = 0 \quad \text{Eq. 4}$$

$$\omega = \sqrt{\frac{k}{m}} \quad \text{Eq. 5}$$

The phase of the vibration velocity measured by LDV and lock-in-amplifier was shown in FIG. 14A. The phase was adjusted by about 1.4 Deg/kHz due to the delay from an analog filter used in the LDV. The resonant frequency of the sensor was measured in two distinct steps. First, to find the rough estimate of the resonant frequency, the actuation frequency was continuously increased or decreased proportionally to the velocity phase, so that the absolute value of the velocity phase is minimized. Once the actuation frequency was set to near the resonant frequency, the phase slope with respect to the frequency was measured, near resonance. Then, the phase was measured 250 times with 50 ms intervals to produce a phase average for signal optimization and noise suppression. Then, the resonant frequency of the sensor was determined from the phase average and the measured phase slope. The error of the resonant frequency measurement can be obtained as follows. The phase noise in the velocity signal was measured as shown in FIG. 2B and the standard deviation of the noise sampling was 0.0915 Deg. From following equation, the 95% confidence interval of the measured phase is 0.011 Deg:

$$\text{confidence interval (95\%, } z = 1.96) = \pm z\frac{\sigma}{\sqrt{N}} \quad \text{Eq. 6}$$

With the measured phase slope of 83 Hz/Deg, the 95% confidence interval of the frequency measurement is calculated to be ±0.94 Hz. FIG. 10C shows the resonant frequency measured in about 2 minutes interval, with standard deviation of 1.23 Hz.

D. Cell Culture.

Human colorectal adenocarcinoma cells (HT-29) were maintained in culture using McCoy's 5a media supplemented with 10% fetal bovine serum (FBS) and 1% PenStrep, as defined by American Type Culture Collection (ATCC, Manassas, Va.). Prior to measuring cell mass, cells were released from the T-25 flask by using 2 mL trypsin (0.25%). Cells were separated from the trypsin by centrifuging the suspension with 3 to 5 mL media for 5 min at 1400 rpm. The cells were re-suspended in imaging media, which consisted of Leibovitz A $CO_2$-independent media without phenol red, supplemented with 30% FBS and PenStrep and 2 mM L-glu. Cells were then diluted and plated to optimal plating density of 9000 cells per 6 mm diameter, collagen-coated culture well (i.e. 318 cells/mm2). Cells were left to settle for 15 min, and then the microincubation chamber was sealed with a No. 1 thickness coverslip. The PCB-chip assembly containing sensors and cells was inserted into the pre-warmed (37° C.) temperature control chamber to stabilize for at least 2 hr prior to cell measurement. Media changes were performed every 24-48 hours to refresh media and remove bubbles.

E. Measurement Protocol.

Frequency Measurement of Dry Empty Sensor.

For the highest cell mass measurement accuracy, each sensor was individually calibrated. First, the resonant frequency of each dry, empty sensor was measured to extract the spring constant of each sensor.

$$\omega = 2\pi f = \sqrt{\frac{k}{m}} \quad \text{Eq. 7}$$

$$k_{wet} = k_{dry} = m(2\pi f)^2$$

Frequency Measurement of Wet Empty Sensor.

After dry empty sensor measurement, the well and chip were cleaned and degassed with ethanol and coated with collagen as described above. After collagen coating the culture well was filled with L15 culture media, sealed, and the wet empty reference frequency was acquired as was done for the dry empty sensor frequency measurement.

Frequency Measurement of Sensors with Cells.

After the wet empty reference frequency measurement, cells were loaded into the culture well to allow cell attachment; the sensor array was kept undisturbed for at least 2 hours in the temperature chamber prior to measurement, to ensure the proper temperature stabilization to 37° C. The resonant frequency for each sensor of interest (empty control sensors and sensors with cells) was measured every 30-40 min. The mass was then extracted from the spring constant, the wet empty reference frequency, as well as the resonant frequency of the sensors with cell as defined below.

$$m_{platform} = \frac{k_{wet}}{(2\pi f_{wet\_empty})^2} \quad \text{Eq. 8}$$

$$m_{cell+platform} = \frac{k_{wet}}{(2\pi f_{wet})^2}$$

$$m_{cell} = m_{cell+platform} - m_{platform} = \frac{k_{wet}}{4\pi^2}(f_{wet}^{-2} - f_{wet\_empty}^{-2})$$

During the repeated frequency measurement, the sensor shows an average negative frequency drift of about 100-200 Hz/day, which is independent of the cell growth. The resonant frequency drift of the neighboring sensors without cells was also measured to yield the equivalent mass changes. The average of the equivalent mass changes of the neighboring sensors was subtracted from the extracted cell mass to produce the apparent mass.

Measurement of Fixed Cell Mass.

The measurement of fixed cell mass followed the same frequency measurement and calculations, but the cells were processed with a fixative. For analysis of the physical properties, successive mass measurements of living cell and fixed cell were necessary. First, the culture well was gently rinsed with fresh L15 media and kept at least 2 hours for temperature equilibration. Then, the mass of the living cells were measured. Immediately following the living cell mass measurement, the culture well (110 μL) was gently rinsed by exchanging the volume of the well 5 times (1.0 mL total volume) with 4% paraformaldehyde in PBS. Cells were fixed for 30 min, the well was then gently rinsed with L15 imaging media to remove the fixative; the sensor array was then returned to the measurement stage for temperature equilibration for at least 2 hours prior to resuming the measurement sequence.

F. Data Analysis.

Statistical Data: Moving Average n=5.

Prior to performing growth rate analysis, the resulting apparent mass data and corresponding images were analyzed, point by point, to categorize the number of cells on the platform for each measurement.

To determine single cell growth rate characteristics, 'missing mass' data points from mitotic events were omitted and only data from single cells on platforms was used. Then, the growth rate (i.e. the slope of the cell mass over time) was calculated using a 5 point linear regression. Each moving average data point corresponds to the cell mass and the growth rate at each time point. The data was then divided into 5 equal groups based on their cell mass; these 5 groups were then subdivided further into 10 equal bins. In addition, the average mass and the average growth rate of each 5 group were calculated.

For population growth rate characteristics, all measurement data points were categorized based on the total number of cells on the platform for each measurement. The same procedure for data analysis was then applied to the moving averages categorized by number of cells. The mean as standard error of the mean are plotted in FIG. 12C.

G. Cell Volume Measurements.

To measure cell volume, HT-29 cultures were fixed with 4% paraformaldehyde for at least 30 min, followed by rinsing with PBS. Cells were incubated with 3,3-dihexyloxacarbocyanine iodide (DiOC6(3)) (175 μM) in PBS for 3-5 min to label the cell and the membrane. The labeled cells were then rinsed with PBS and imaged immediately in PBS in a glass-bottomed dish on a laser scanning microscope (Zeiss LSM 710 NLO); 3-D image stacks (212.55 μm×212.55 μm×20.48 μm) were acquired (scaling: 0.21 μm×0.21 μm×0.47 μm) to render accurate cell shape. Cell volume was measured with Imaris (Bitplane, Zurich, Switzerland).

H. Cell Biophysical Analysis.

Modeling of the Two-Degree-of-Freedom System.

The MEMS sensor vibrating in liquid is modeled as a mass-spring-damper system, where the sensor mass is $m_1$ (110 ng), the spring constant $k_1$ (19.4 N/m) and the coefficient of viscous damping, $c_1$ (9.5*10−6 kg/s). The cell deposited on the sensor is simplified as a point mass $m_2$ connected to the sensor by a parallel pair of spring and damper, with spring constant $k_2$ and coefficient of viscous damping $c_2$, respectively. When the sensor is driven by the external sinusoidal force, the frequency $\omega_0$ at which the sensor velocity is in synchrony with the external force is recorded. The frequency $\omega_0$ can be determined through solving the response of this two-degree-of-freedom system to the external harmonic excitation. As seen in FIG. 12C, right, under the harmonic excitation $F(t)=F_0 e^{i\omega t}$, the equations of motion of the damped two-degree-of-freedom system can be written in the matrix form:

$$\begin{bmatrix} m_1 & 0 \\ 0 & m_2 \end{bmatrix} \begin{Bmatrix} \ddot{x}_1 \\ \ddot{x}_2 \end{Bmatrix} + \begin{bmatrix} c_1+c_2 & -c_2 \\ -c_2 & c_2 \end{bmatrix} \begin{Bmatrix} \dot{x}_1 \\ \dot{x}_2 \end{Bmatrix} + \begin{bmatrix} k_1+k_2 & -k_2 \\ -k_2 & k_2 \end{bmatrix} \begin{Bmatrix} x_1 \\ x_2 \end{Bmatrix} = \begin{Bmatrix} F_0 \\ 0 \end{Bmatrix} e^{i\omega t} \quad \text{Eq. 9}$$

Equation 9 can be readily solved and the velocity of the sensor is written as:

$$\dot{x}_1(t) = i\omega[AC+BD+i(BC-AD)] \frac{F_0 e^{i\omega t}}{C^2-D^2} \quad \text{Eq. 10}$$

where the coefficients A, B, C, and D are given as follows:

$A = k_2 - \omega^2 m_2$ $B = \omega c_2$ $C = -\omega^2 c_1 c_2 + k_1 k_2 - \omega^2 k_2 m_1 - \omega^2 k_1 m_2 - \omega^2 k_2 m_2 + \omega^4 m_1 m_2$ $D = \omega c_2 k_1 + \omega c_1 k_2 - \omega^3 c_2 m_1 - \omega^3 c_1 m_2 - \omega^3 c_2 m_2$ For the sensor velocity to be in phase with the external excitation, it requires $$\begin{cases} AC+BD=0 \\ (BC-AD)/(C^2-D^2) < 0 \end{cases} \quad \text{Eq. 11}$$

After dividing both sides of Equation 11 by $k_1^3$, and introducing non-dimensional parameters $\zeta_1 = c_1/2\sqrt{k_1 m_1}$, $\zeta_2 = c_2/2\sqrt{k_1 m_1}$, $x=\omega_0/\omega_1$, $\omega_1 = \sqrt{k_1/m_1}$, $\mu_1 = m_2/m_1$, $\mu_2 = k_2/k_1$, Equation 11 becomes:

$$-\mu_1^2 x^6 + x^4(-4\zeta_2^2 - 4\zeta_2^2 \mu_1 + 2\mu_1 \mu_2 + \mu_1^2 + \mu_1^2 \mu_2) + x^2(4\zeta_2^2 - \mu_2^2 - 2\mu_1 \mu_2 - \mu_1 \mu_2^2) + \mu_2^2 = 0 \quad \text{Eq. 12}$$

The algebraic equation 12 shows the dependence of non-dimensional cross-over frequency $x_0$ on the parameters of $\mu_1$, $\mu_2$, and $\zeta_2$, the dimensional form of which is shown in the FIG. 10e.

Relating the Structure Quantities of the Cell to the Material Quantities.

So far, the cell stiffness $k_2$ and damping coefficient $c_2$ (and their non-dimensional forms $\mu_2$ and $\zeta_2$) are both structure quantities, which include geometric information. In order to get the material quantities of the cell (i.e., Young's modulus E and viscosity $\mu$), the values of $k_2$ and $c_2$ must be derived from the cell's E and $\mu$, which requires the knowledge of the cell shape. Here the shape of the cell on the sensor is assumed to be cylindrical. The cylinder height L is obtained by fitting the cell volume vs. cross-sectional area from confocal image measurement. The cross-sectional area, a, is measured by the cell image taken during the sensor vibration. The total mass of the cell, $m_2$, is assumed to be concentrated in the center of the cylinder. Both the force and displacement of the cell are assumed to be applied on this center.

With the definition of the elastic deformation, the cell stiffness $k_2$ can be expressed by its Young's modulus E:

$$k_2 = \frac{2a}{L} \cdot E = \alpha E \quad \text{Eq. 13}$$

By the analogy to the conventional definition of viscosity by shear deformation, an extensional viscosity $\mu$ is defined, which is related to the damping coefficient $c_2$ by $$c_2 = 6\frac{a}{L} \cdot \mu = \beta \cdot \mu \quad \text{Eq. 14}$$

After substituting Equations 13 and 14 into Equation 12:

$x^4(1-x^2)\cdot\mu_1^2 + (1-x^2)\alpha^2 \cdot E^2 + x^2(-2+2x^2)\alpha\cdot\mu_1 E + x^4 \alpha\cdot\mu_1^2 E - \alpha^2 x^2 \cdot \mu_1 E^2 - 4x^4 \beta^2 \cdot \mu_1 \mu^2 + 4x^2(1-x^2)\beta^2 \cdot \mu^2 = 0 \quad \text{Eq. 15}$ where, $\alpha$ and $\beta$ are geometric factors related to height L and area a.

Strategy to solve $m_2$, E and $\mu$.

To solve for the three unknowns (cell mass (non-dimensional) $\mu_1$, Young's modulus E, and extensional viscosity $\mu$) of Equation 15, the cross-over frequencies x (non-dimensional form of $\omega_0$) of 18 cells was used both before and after fixation. The average HT-29 geometries were obtained through confocal microscopy. It is assumed that each cell mass (non-dimensional) $\mu_1$ stays the same before and after fixation. It is also assumed that, for these 18 cells, the Young's moduli before fixation $E^b$ are the same for all unfixed cells, and the Young's moduli after fixation $E^a$ are the same for all post-fixed cells. The same pre- and post-fixation assumptions are made for the extensional viscosities $\mu^b$ and $\mu^a$.

If 4 cells are randomly picked, cell I, cell II, cell III and cell IV, there will be 8 equations, including both the unfixed and fixed cases. There will also be 8 total unknowns, the mass of the each cell, $\mu_1^I$, $\mu_1^{II}$, $\mu_1^{III}$ and $\mu_1^{IV}$, the Young's moduli $E^b$ and $E^a$, and the extensional viscosities $\mu^b$ and $\mu^a$. Since there are 8 unknowns and 8 equations, the nonlinear algebraic equations can be solved numerically.

1000 groups (4 cells in each group) are randomly selected. Then, in order for the nonlinear algebraic equations to be solved, the proper initial start $x_0 = \{\mu_1^I, \mu_1^{II}, \mu_1^{III}$ and $\mu_1^{IV}, E^b, E^a, \mu^b; \mu^a\}_0$ has to be provided. Equation 15 has multiple solutions because of the nonlinearity. Care must be taken when selecting a good initial guess. It is believed that the true mass is close to the fixed mass. Thus, the initial mass value is chosen to be around the fixed mass. The initial Young's moduli chosen within the range of 1–10 kPa, and the viscosity to be $\sim 10^{-3}$ Pa·s based on the converged solutions after several trials.

There are several constraints on the solutions from the consideration of the real physical problem. All solutions must be positive, and the Young's modulus and viscosity after fixation must be larger than before fixation. As these constraints cannot be imposed on the solution before starting the iteration, the unrealistic solutions that cannot satisfy the two constraints above are eliminated.

The converged solutions for each group are then averaged. The data shows that the calculated mass is close to the fixed mass, as shown in FIG. 15C. The mean Young's moduli before and after fixation are 4.09 kPa (S.D.±1.22) and 7.86 kPa (S.D.±3.60). The average extensional viscosities are 0.004 Pa·s (S.D.±0.002) and 0.010 Pa·s (S.D.±0.006). The histograms of calculated Young's moduli and extensional viscosities before and after fixation are shown in FIG. 20. The results show that the Young's modulus is within the range reported by other groups. However, the extensional viscosities are far below previously reported values of 7 Pa·s and 85 Pa·s, 2000~4000 Pa·s and 0.1~100 Pa·s. The reasons could be: First, the viscosity reported in the literature is by shear deformation. Here an extensional viscosity is defined, which should not be expected to be the same as conventional viscosity. Second, the load applied is under very high frequency ~$10^4$ Hz, whereas the conventional load to measure viscosity is under a low frequency ~10 Hz.

List of Figure Captions. FIG. 13A-13O. Summary of sensor fabrication and assembly, and the culture chamber setup. (A-J) Microfabrication of chips with sensor arrays. (K) SEM image of 28 sensors from the 81-array. (L) Inset shows an SEM image of an individual MEMS resonant mass sensor. (M) The chip with sensor array is fastened to a custom built printed circuit board (PCB), the chip is wire-bonded to the PCB 1302, then a PDMS culture well 1301 is attached to the chip. The PDMS well is hermetically sealed with a custom cut coverslip, which is re-sealable for media changes. (N) Schematic representation of the PCB 1303 containing the sensor array and PDMS micro-culture well positioned in the magnetic coil. (O) Custom built environmental control chamber positioned over the magnetic coil and PCB with sensor array.

FIG. 14. (A) The phase of the vibration velocity measured by LDV and lock-in-amplifier. (B) The phase noise of the velocity signal (S.D.±0.0915 Deg.), the 95% confidence interval of the measured phase is 0.011 Deg. With the measured phase slope of 83 Hz/Deg, the 95% confidence interval of the frequency measurement is calculated to be ±0.94 Hz. (C) The resonant frequency measured in ~2 min intervals (S.D.±1.23 Hz).

Figure 15:
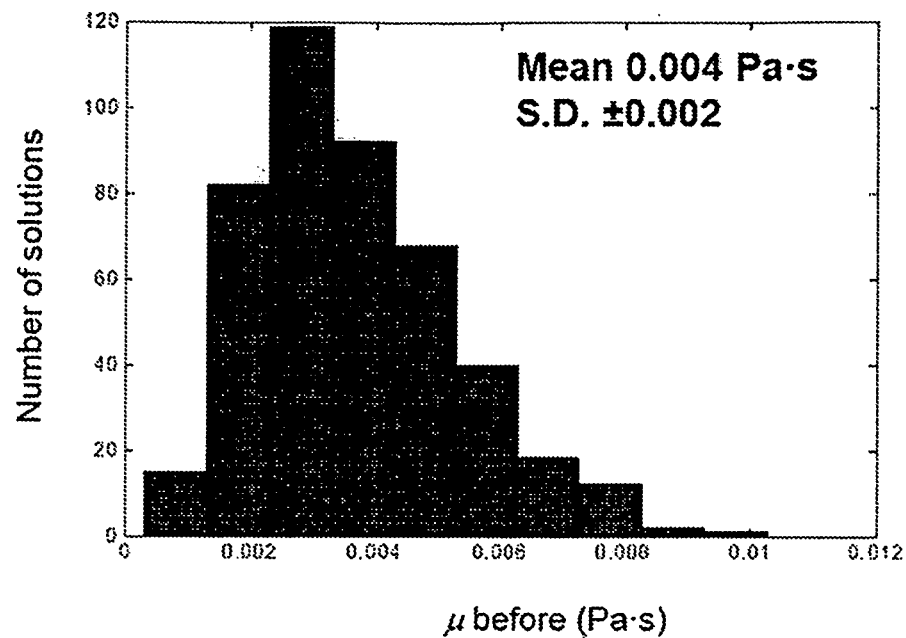
FIG. 15 provides histograms of calculated extensional viscosities of HT-29 (A) before, and (B) after fixation.
Figure 15:
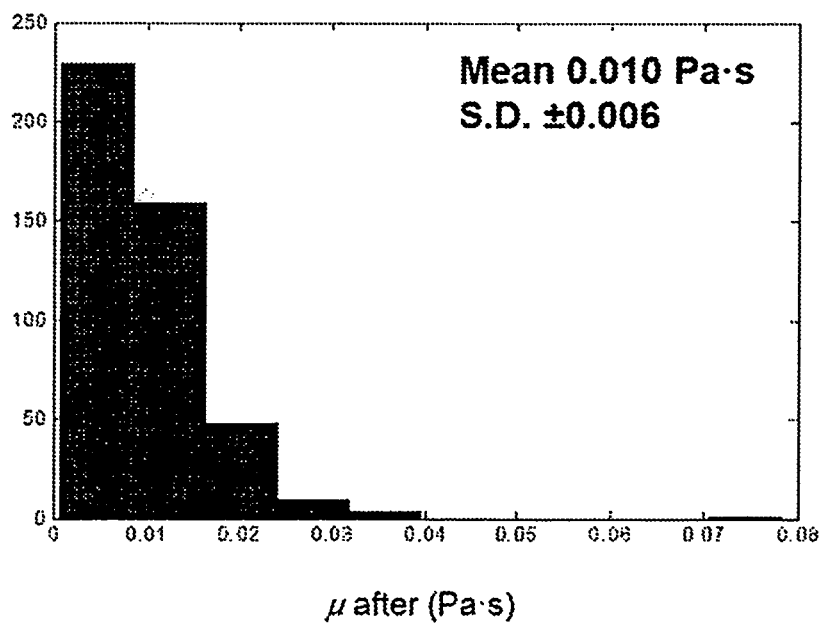
Figure 15:
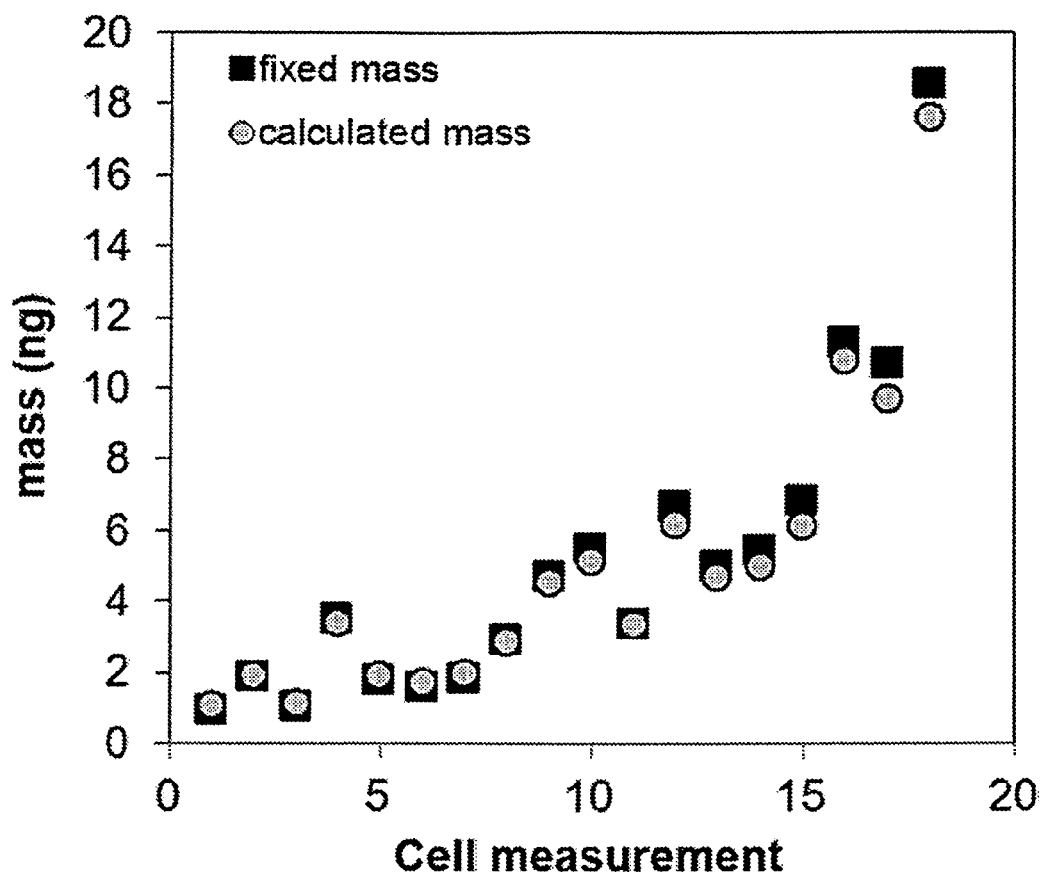

FIG. 15. Histograms of calculated extensional viscosities of HT-29 (A) before, and (B) after fixation. The average extensional viscosities are 0.004 Pa·s (S.D.±0.002) and 0.010 Pa·s (S.D.±0.006). (C) The comparison of calculated non-dimensional mass versus the fixed cell mass measured using the MEMS resonant mass sensors. The data shows that the calculated mass is close to the fixed mass.

Figure 16:
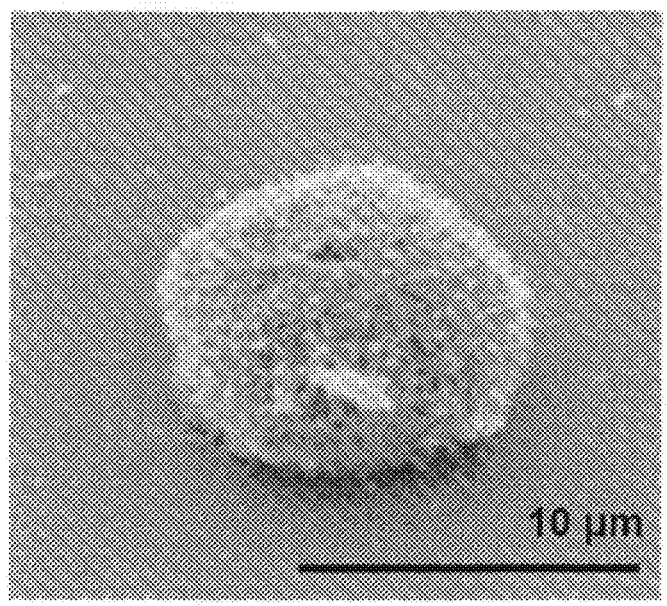
FIGS. 16A-16E provide SEM images of HT-29 cells cultured on MEMS platforms.
Figure 16:
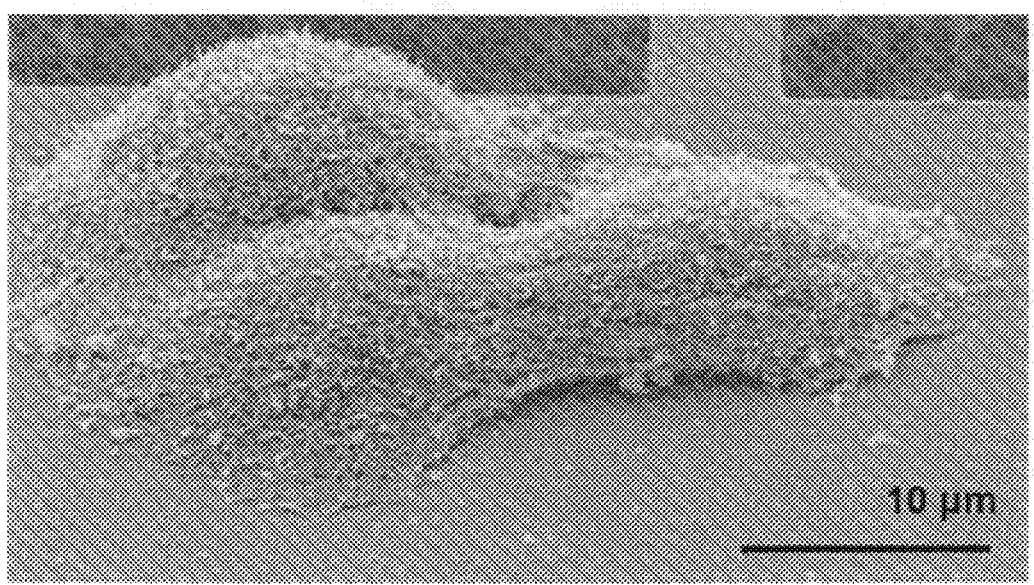
Figure 16:
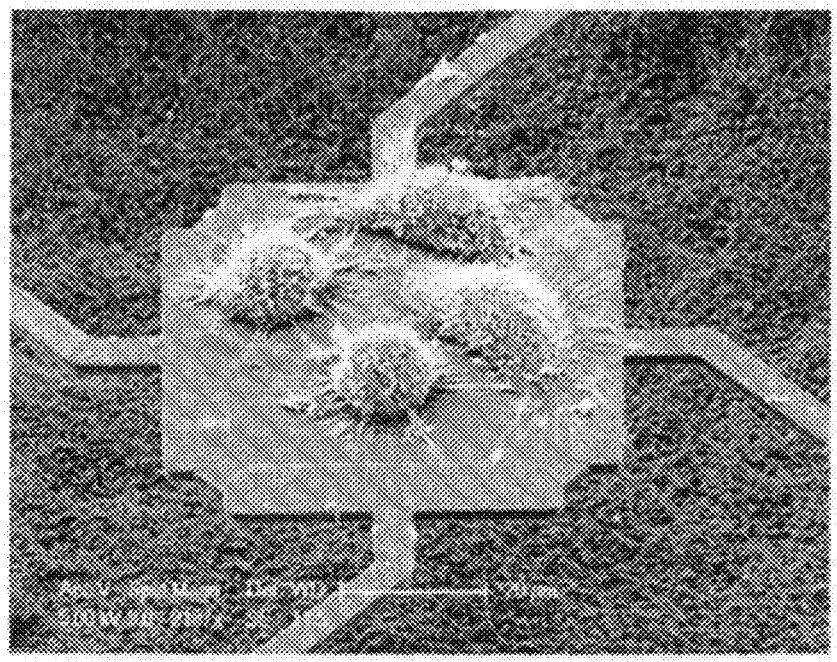
Figure 16:
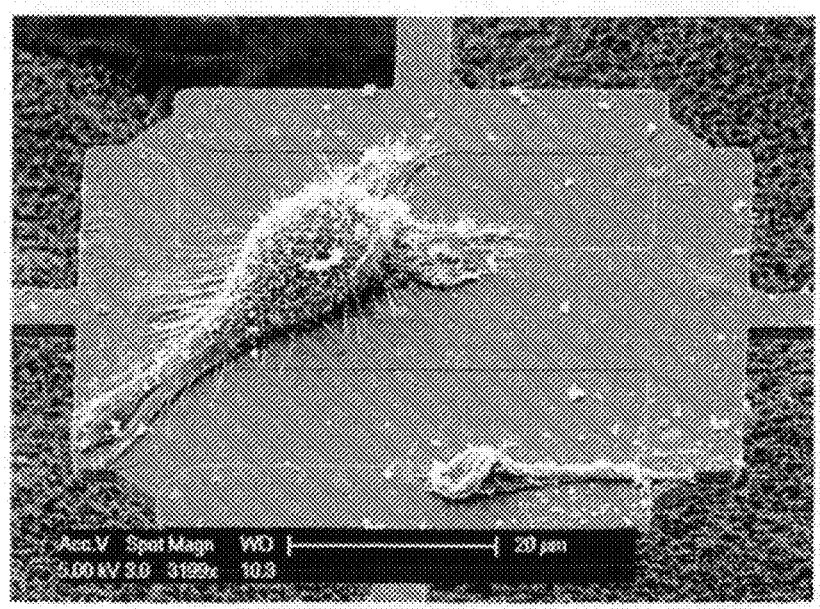
Figure 16:
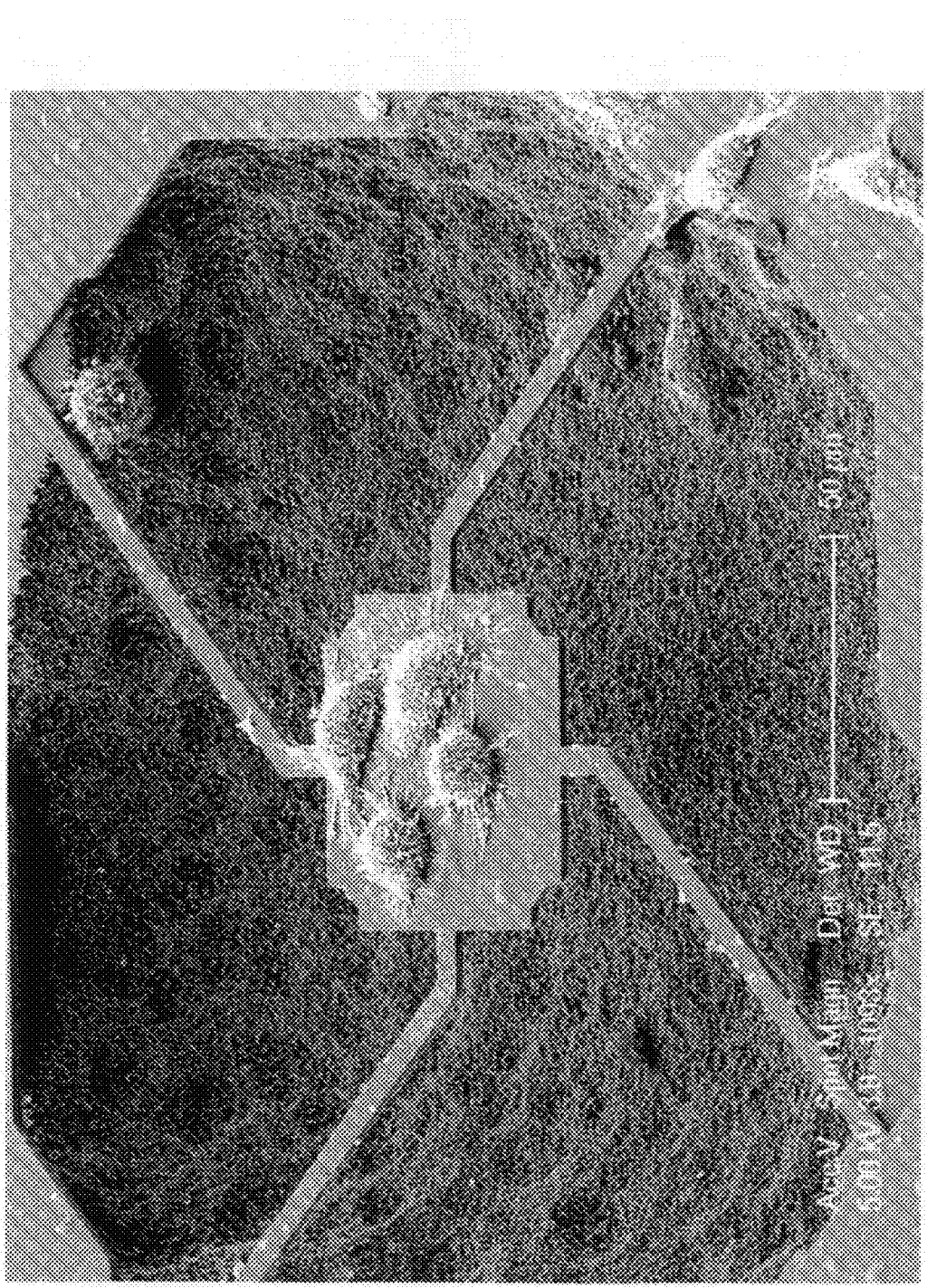

FIG. 16. SEM images of HT-29 cells cultured on MEMS platform. (A) Cells about to divide show decreased attachment, whereas (B) cells before and after cell division show increased attachment. (C-E) HeLa cells growing on the MEMS platforms.

FIG. 17. Image sequence panels of HT-29 cultured on MEMS resonant platforms. (A) An individual HT-29 cell was observed progressing through inherently synchronized cell divisions for 60 hours in culture. (B-C) Single HT-29 cells grow and divide on the pedestals to form cell clusters. (D) The increasing size of an individual cell, growing and dividing, can easily be seen in this image sequence. Inter-image interval is ~2 hrs for panels (A-C), and ~1.5 hrs for panel (D). For image scale, all platforms are 60 μm squares (3,600 μm²), time ranges are rounded to the nearest 0.5 hr.

FIG. 18. Measuring apparent cell mass and volume-based cell mass for biophysical modeling. (A) The live and fixed cell masses of the same HT-29 cells were acquired using the MEMS resonating pedestal sensor arrays; corresponding dark field images were also acquired and used to estimate the volume-based mass of the cell. On average, fixed cells show a 1.46-fold increase in apparent mass over live cells. Live cells are ~62% of the volume-based mass, whereas fixed cells are ~90% of the volume-based cell mass. To achieve this data, the same cells are measured with confocal microscopy and dark field microscopy. (B) The dark field cell area is plotted against the confocal-based cell volume. (C) The cross-sectional cell area from confocal imaging is plotted against the dark field cell area of the corresponding cells. This shows that dark field images are 1.18 times larger than the cross-sectional area of confocal data. (D) Plotting cross-sectional confocal area to confocal cell volume indicates the range of cell height.

Figure 19:
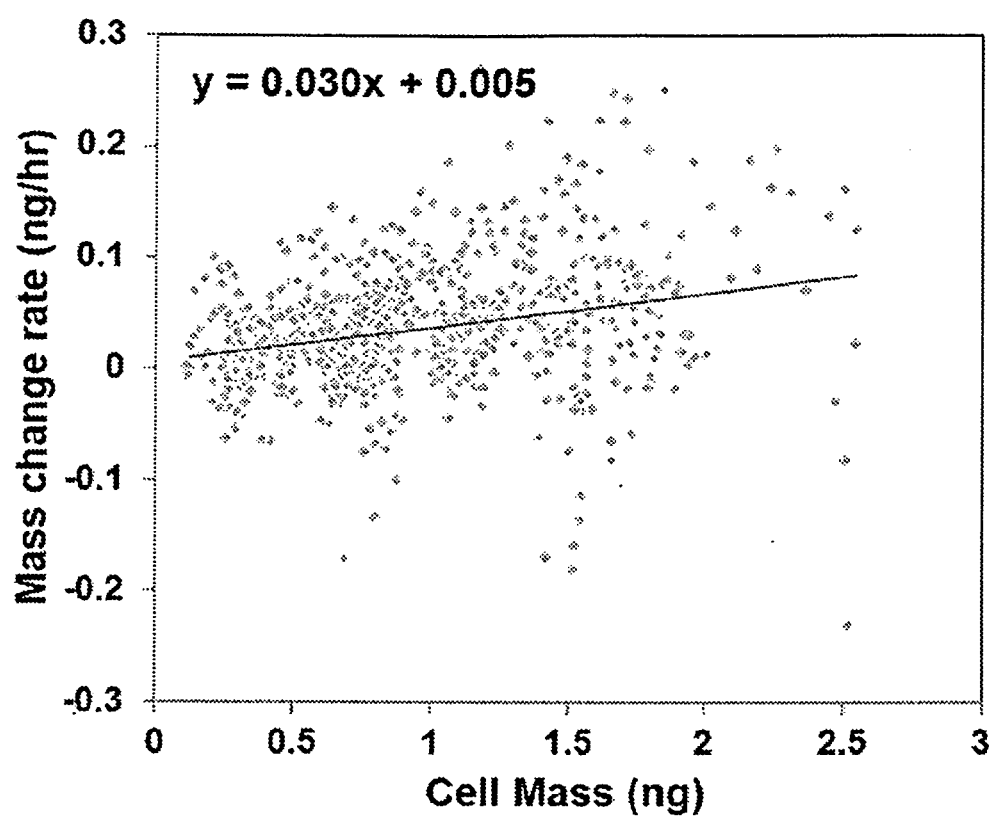
FIG. 19 provides data showing analysis of mass change rate per unit mass of individual cells.
Figure 20:
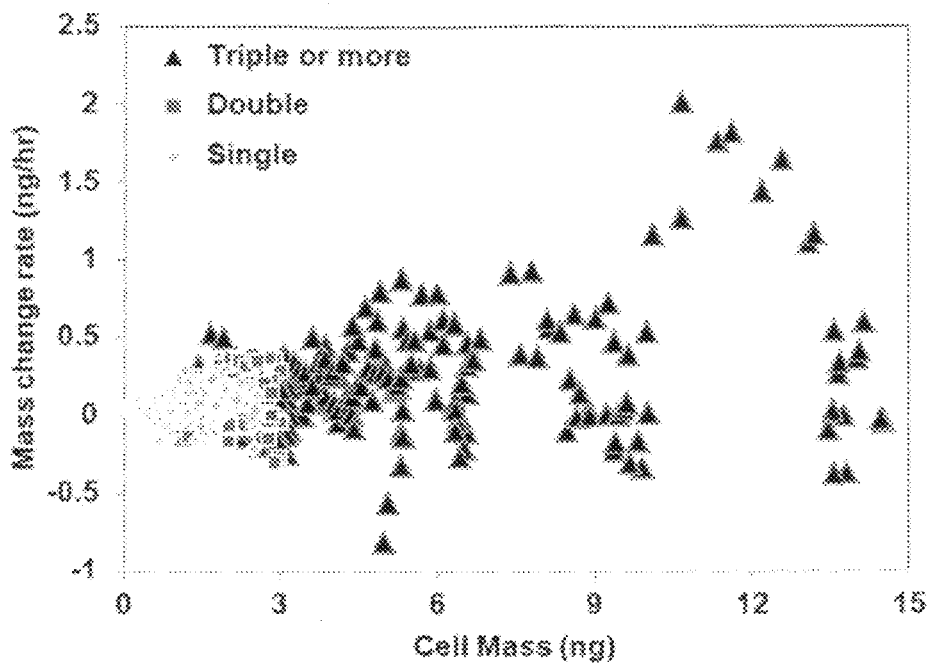
FIGS. 20A-20C provide data showing analysis of mass change rate per unit mass.
Figure 20:
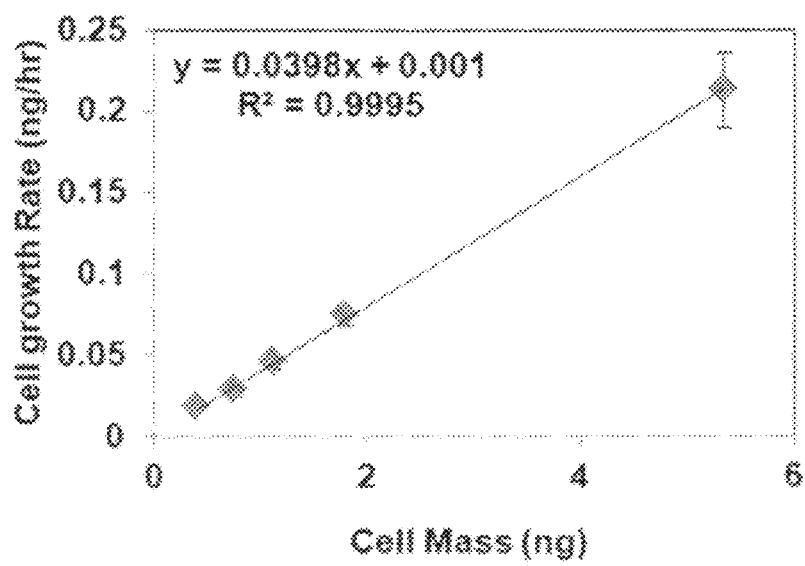
Figure 20:
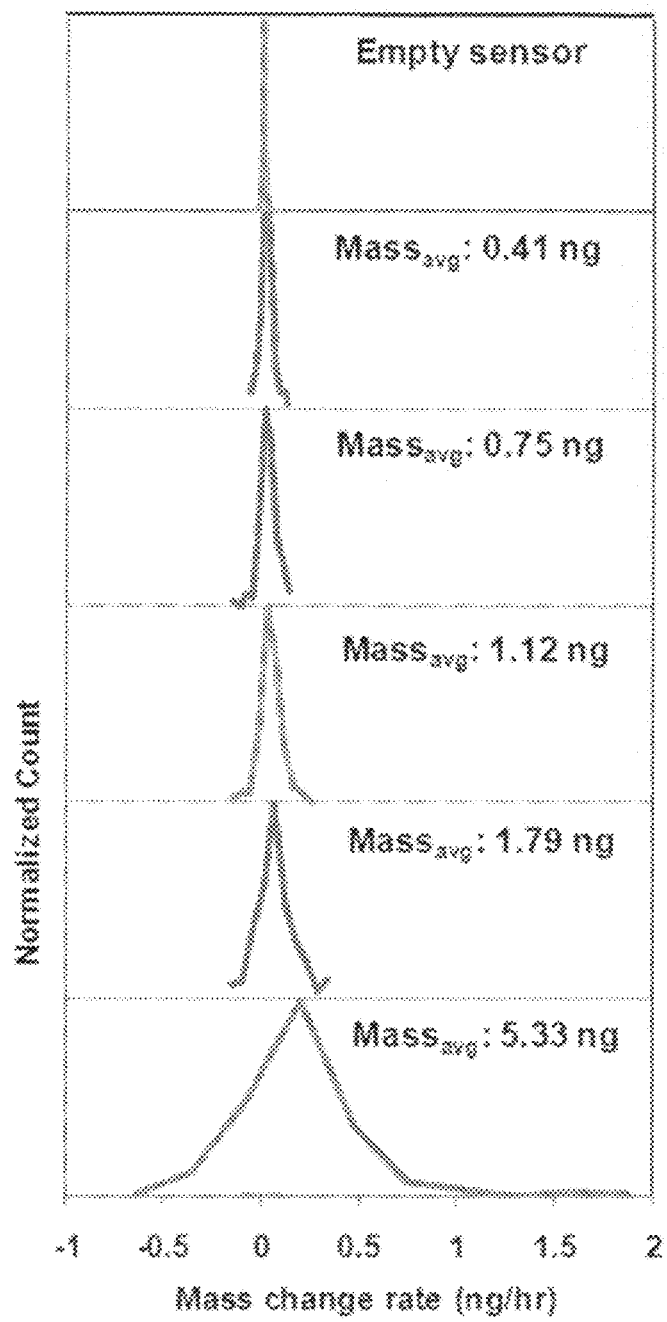

FIG. 19. Analysis of mass change rate per unit mass of individual cells. (A) A 5-point moving average of changes in mass from all culture data points of individual HT-29 cells prior to cell division.

FIG. 20. Analysis of mass change rate per unit mass. (A) Changes in mass from all culture data points from individual HT-29 cells and multiple daughter cells. Cells are categorized according to single cells, two daughter cells, and three or more cells. (B) Histograms of the background noise of an empty sensor (top) while the bottom four plots show an increasing distribution of mass; data bins are non-overlapping and show average cell mass per bin. (A-C) The growth analysis was analyzed as was done for FIG. 4 in the paper, but was extended to include multiple cells also. (C) Five data points account for the growth rate per unit mass from the HT-29 data in (A). The mean population growth rate is 3.98% per hour for the population of cells including single and multiple cells on the pedestals.

Example 3

MEMS Mass Sensors with Uniform Sensitivity for Monitoring Cellular Apoptosis

MEMS-based resonant mass sensors can be sensitive tools to measure the physical properties of cells such as their mass. An array of sensors was developed that have a uniform mass sensitivity for measuring the stiffness and the long-term growth rate of adherent human colon adenocarcinoma cells (HT-29). This example demonstrates that for these adherent single cells, the cell growth rate increases with call mass, i.e. larger cells grows faster. The finding points to the fact that additional cell-size control mechanism might be required for cell size homeostasis over generations and that growth rate is determined by the amount of the ribosomal machinery, which doubles during the cell cycle. This example presents an additional sensor design with further optimization for higher uniformity of the mass sensitivity based on a detailed numerical analysis. This example also demonstrates that these MEMS resonant mass sensors can be used to measure physical changes in apoptotic cells. HT29 were treated with staurosporine, a potent drug that induces cellular apoptosis. Through Laser Doppler Vibrometry (LDV), changes in the cells' apparent mass were measured, and these changes were correlated with optical images using dark field microscopy. Such real-time mass measurements of individual cells coupled with optical imaging can be a powerful tool to understand the physiological processes of cell growth and apoptosis.

Advances in microsystems technology have enabled the manipulation and measurement of individual cells. MEMS resonant mass sensors have been established as powerful tools to precisely describe the physical properties of cell growth and division. These devices could also be applied toward understanding the physical response of the cell to perturbations and stimuli. One goal is to develop and implement new MEMS devices that will permit the direct, long-term measurement of single cells during cell growth, mitosis, and apoptosis.

Highly sensitive NEMS resonant sensors have been demonstrated with zeptogram mass detection in low pressure environments. For biosensing applications involving living cells, however, it is essential to be able to perform measurements and detection in liquid, which reduces the quality factor and hence the sensitivity of detection. In addition, one significant hurdle in deriving cell growth measurements with cantilever-based resonating systems is the non-uniform mass sensitivity due to the position of the object being measured. For sensors with non-uniform mass sensitivity, cell migration can be misinterpreted as increasing or decreasing cell mass and cell growth will not directly correlate to the decrease in the measured resonant frequency.

In the recent past, novel hollow fluidic cantilevers have been used to improve mass sensitivity in fluids and for growth measurements of non-adherent cells. By flowing liquid through the channel on the interior of the cantilever, the changes in resonant frequency can be measured. Because the hollow cantilever is packaged in vacuum, the damping is reduced and the sensitivity is dramatically improved.

The above examples demonstrate that resonating platforms can achieve uniform mass sensitivity to a maximum 4% difference of mass sensitivity across the platform. This approach confers the ability to decipher the biophysical properties of growing adherent cells attached to MEMS resonant mass sensors. Specifically, the cell mass accumulation related to the biological processes of cell growth was derived. The above examples demonstrate that by synergistically combining MEMS resonant mass sensors and live cell imaging, even greater insights into cell growth behaviors are gained.

This example demonstrates through modeling that changes to the structure of our sensor further increase the mass sensitivity and that these MEMS resonant mass sensors are sensitive enough to measure the changing physical properties of dying cells. Programmed cell death, i.e. apoptosis, is an important regulatory component of development in organisms from slime molds to humans. Apoptosis is the means of regulating and removing cells that are no longer needed, eliminating cells that have marked defects and perturbations such as the presence of infectious agents or critically defective genetic programs.

Sensor Simulations

Figure 21A:
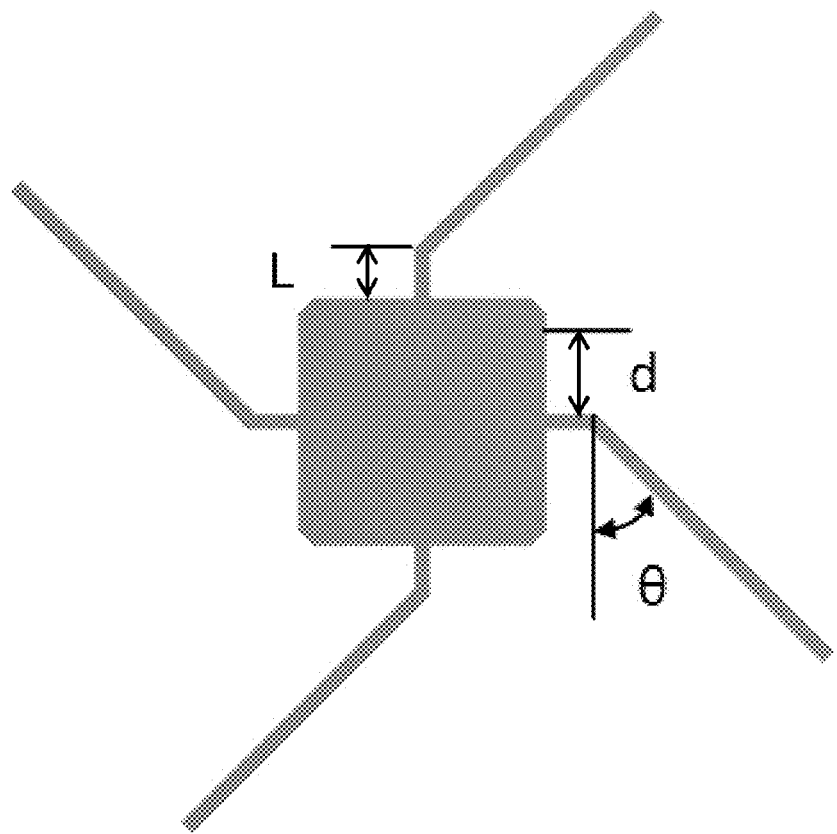
FIGS. 21a-21d provide the design and optimization of the sensor structure for obtaining uniform mass sensitivity data.

To optimize the spatial mass sensitivity of resonating platforms to the greatest extent, numerical analysis (ANSYS) was used to simulate the deflection of different variations of our previous platform design (FIG. 21a). A straightforward strategy for achieving a constant deflection of the cell attachment platform is through a double clamped beam (i.e. spring) structure. In designing sensors for simulation, designs were based upon the criteria that, 1) platforms that are wider and thicker enable greater control of the platform deflection, and 2) by incorporating more than 3 supporting beams, ideal (i.e. 1st order or flexural) resonant frequencies are optimized and confounding (2nd, 3rd or torsional) resonance frequencies are diminished. The elimination of torsional resonance improves the accuracy of cell mass measurements.

Figure 21B:
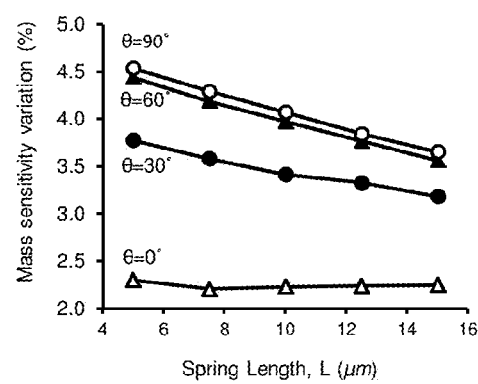
Figure 21C:
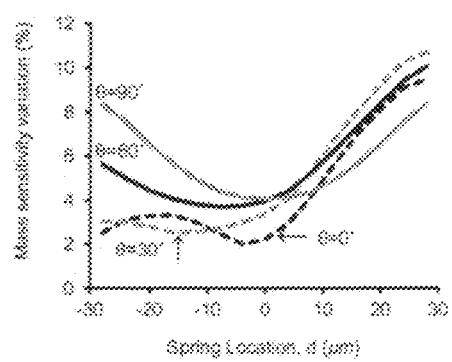

The mass sensitivity of the resonant MEMS mass sensor is proportional to the square of the vibration amplitude at each point in resonance. Hence, by designing the sensor structure with uniform vibration amplitude, the variation of the mass sensitivity can be minimized. The maximum variation of the sensitivity is calculated, as shown in FIGS. 21(b) and 21(c). The optimized structure shows a variation of mass sensitivity of 2.2% with d=−4 µm and θ=0°, whereas the sensor in the above examples shows a 4% variation of the mass sensitivity.

Figure 21D:
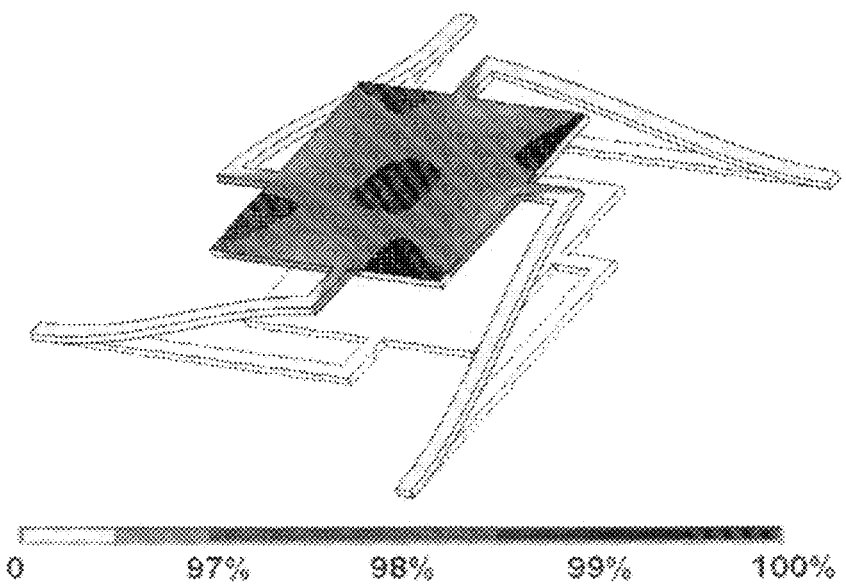

Through simulations, the difference in the range of deflection points is derived (FIG. 21c, max and min). A spring-platform design was simulated (FIG. 21d) that converts flexural bending into torsional force at predefined joints to produce well-distributed local maximum deflection points rather than a centralized global maximum deflection point.

The sensor that is most sensitive to mass is also the most challenging to fabricate. The springs are very close to the platform and may prove to be too challenging to fabricate with the etch-mediated release from the Si-wafer substrate. Because this fabrication limitation has been overcome, retaining a high uniformity of mass sensitivity, the angled beam spring sensors were used (FIG. 21a) to measure the changes in apparent mass of HT-29 cells.

Experimental Results

Sensor Fabrication and Measurement Setup.

Figure 22A:
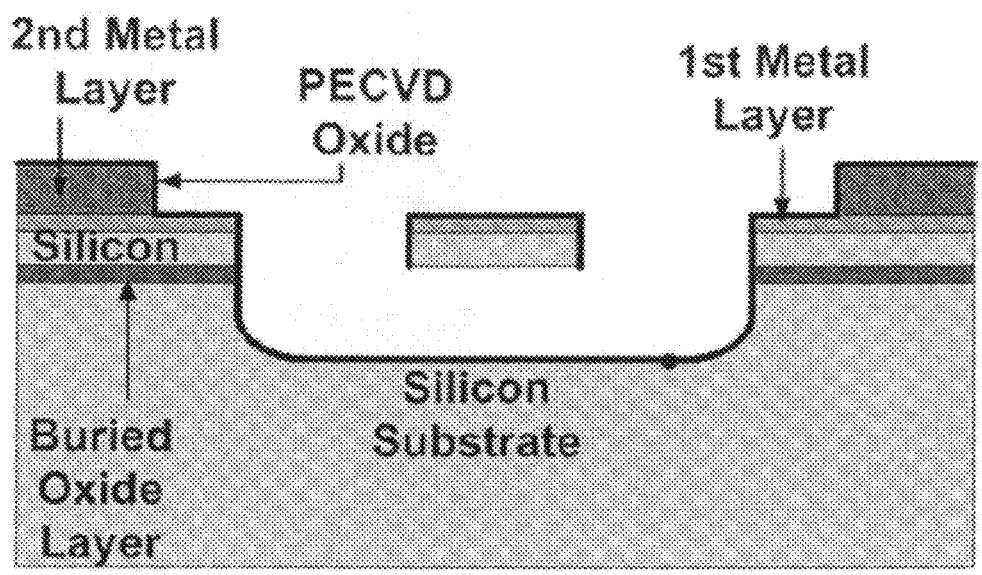
FIGS. 22a-22c provide the design and optimization of the sensor structure and system for obtaining uniform mass sensitivity data.
Figure 22B:
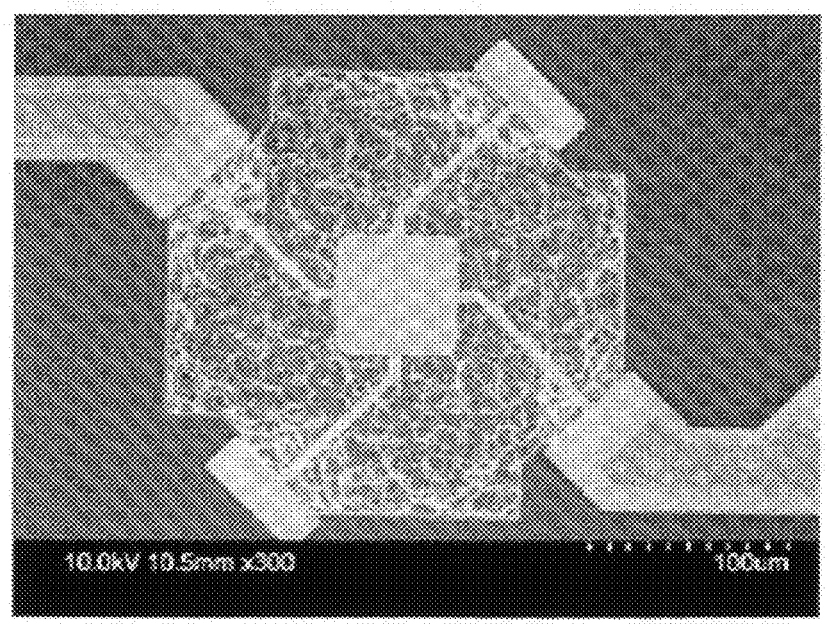
Figure 22C:
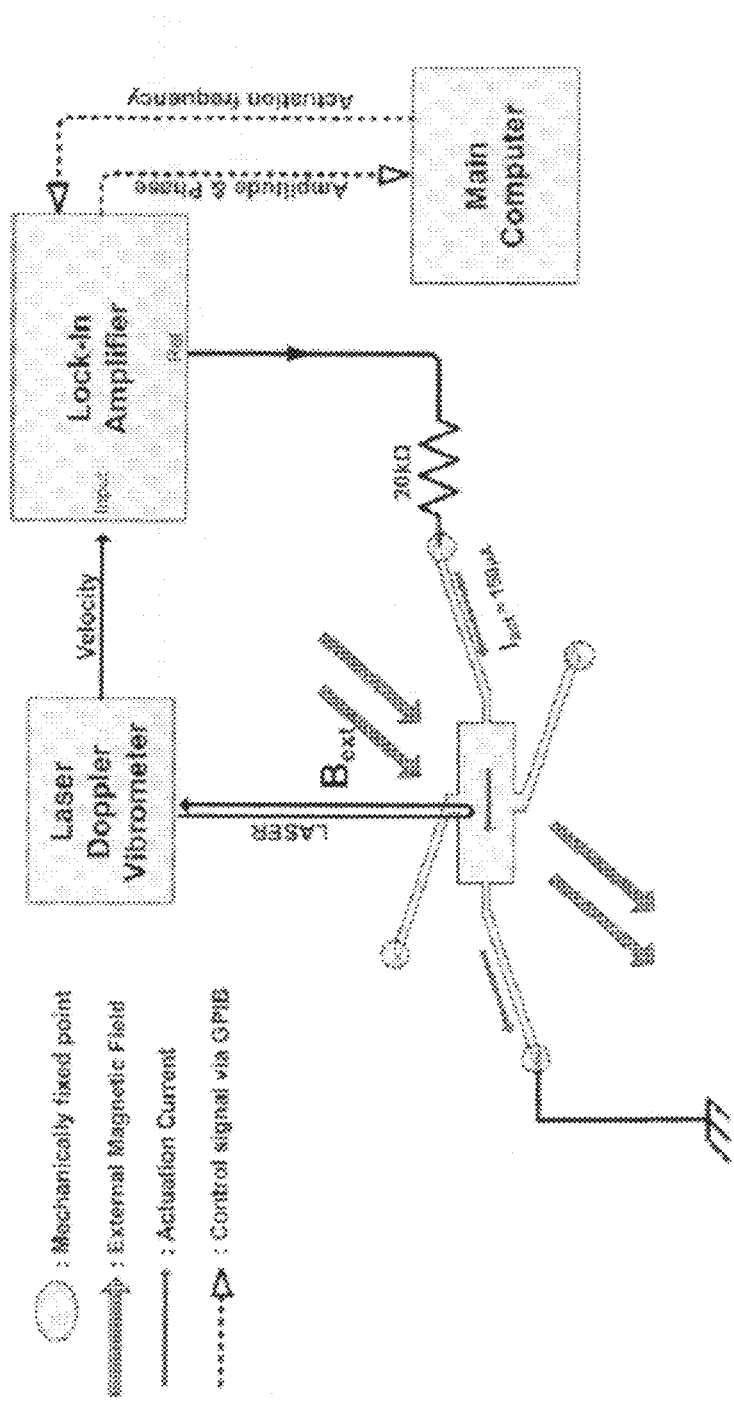

The angled beam spring MEMS resonant mass sensor is fabricated from a silicon-on-insulator wafer and the cross-sectional view is shown in FIG. 22(a). The sensor is composed of a center platform and four half-folded beam springs, as shown in FIG. 22(b). The sensor is actuated with a Lorentz force by applying AC currents through the sensor in a constant magnetic field. The vibration of the sensor is detected by an LDV; the magnitude and the phase of the vibration was measured with a lock-in-amplifier to estimate the precise resonant frequency of the each sensor. The schematic diagram of the experimental setup is shown in FIG. 22(c).

Changes of Apparent Mass During Cellular Apoptosis.

Apoptosis progresses through highly ordered signaling cascades that are initiated intrinsically or extrinsically. Irrespective of the pathway, pro-caspases are key activators of caspases for broad proteolytic cleavage of cellular substrates. For the intrinsic pathway, specific death receptors are bound and activated by their corresponding ligands, which can be applied to cultured cells for inducing apoptosis. A wide range of molecules are known to initiate apoptosis intrinsically. Staurosporine is an alkaloid product of the bacterium *Streptomyces staurosporeus*, and rapidly induces apoptosis in number of different cell types of various origins. Characteristics of apoptotic cells include nuclear degradation and membrane blebbing that gives rise to progressive shrinking and fragmentation of the cell. The main biological activity of staurosporine is the inhibition of protein kinases through the prevention of ATP binding to the kinase.

Figure 23A:
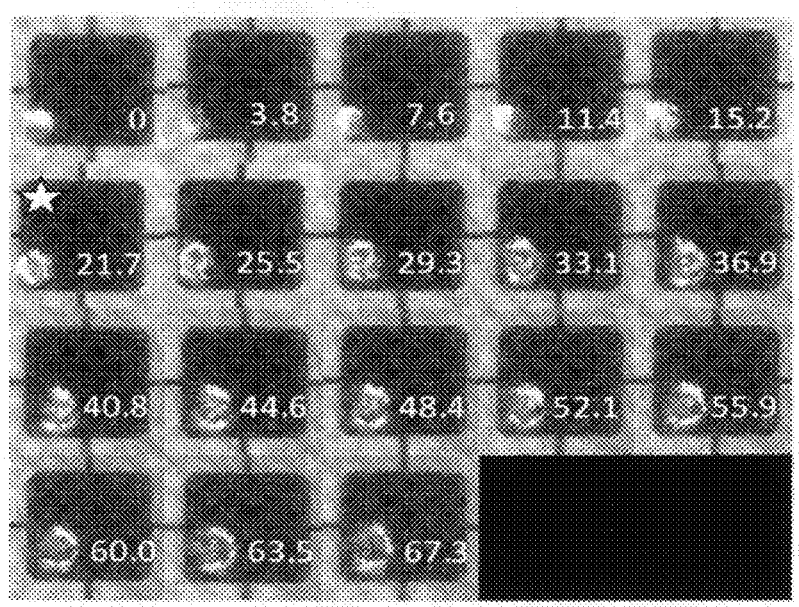
FIGS. 23a-23c provide data and images showing the measured apparent mass of apoptotic HT-29 cells treated with staurosporine.
Figure 23B:
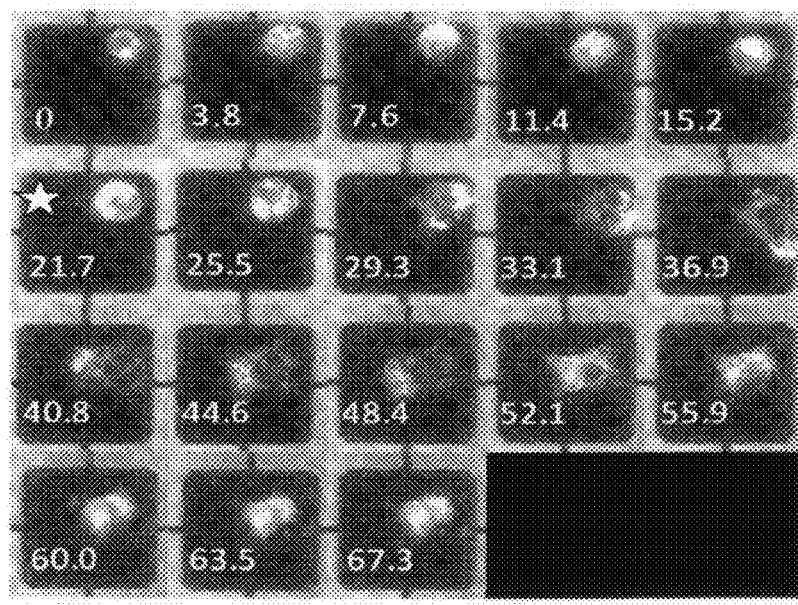

To prepare the sensor array for cell culture, the sensor array was sterilized and functionalized with poly-L-lysine. The HT-29 cells were then attached to and cultured on the mass sensor. To measure the changes in apparent mass associated with staurosporine-induced apoptosis, the apparent cell mass was repeatedly measured for ~70 hours (FIG. 23(a)). The first ~19 hours of measurement shows the initial growth profile on the resonant mass sensors prior to applying the apoptotic agent to the culture well. After introducing staurosporine (1.07 NM) (starred position in FIGS. 23a and 23b), the cells were cultured and measured for an additional 50+ hours.

Figure 23C:
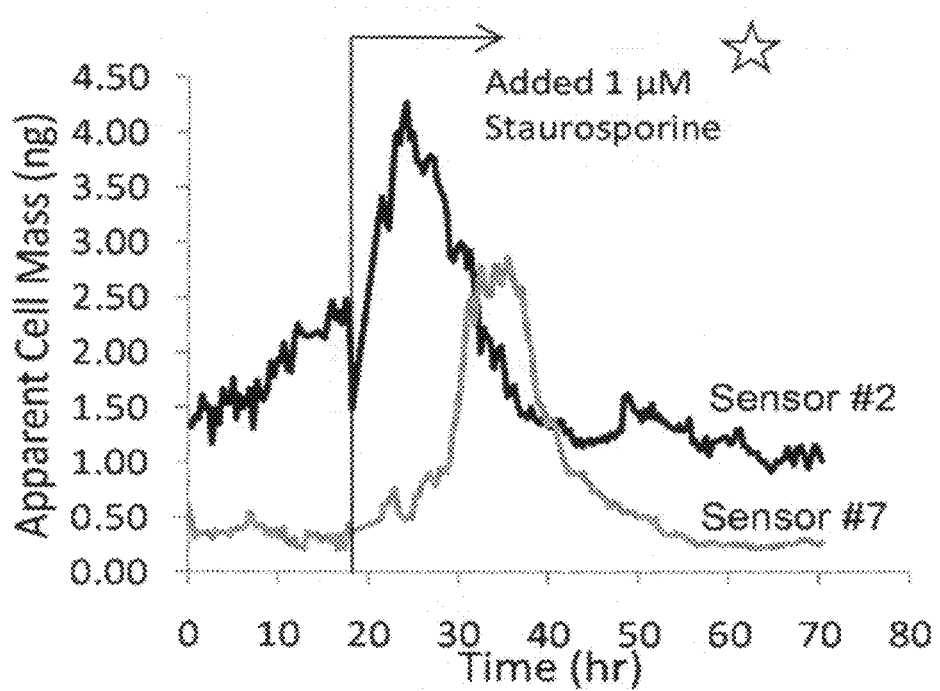

During the experiment, the resonant frequency of the sensor with the cell was recorded repeatedly, to calculate the apparent mass of the cell.

$$m_{apparent} = \frac{k}{4\pi^2}\left(\frac{1}{f_0^2} - \frac{1}{f_n^2}\right)$$

where $m_{apparent}$, k, $f_0$, and $f_n$ are apparent mass, spring constant, resonant frequency without cell, and resonant frequency with cell, respectively. The apparent mass, calculated from the resonant shift, can be affected not only by the cell mass, but also by the geometry and the mechanical properties of the cell. The measured apparent mass and the time-lapsed images are shown in FIGS. 23(a-b). After introducing staurosporine, the apparent mass increases rapidly, as the cell remains on the sensor (FIG. 23(c)). The increase in the apparent mass of the cell could be due to the physical changes in the cyto-skeletal structure and cells becoming stiffer, as the cell stiffening could result in increased mechanical coupling of the cell with the resonating sensor. It is also noted that as the cell appears to flatten out, the measured apparent mass decreases dramatically and rapidly. This decrease in the apparent mass could be likely explained by the water loss coupled with a change in the mechanical property and geometry of the cell as it progresses further towards apoptosis.

A recent report describes the onset of staurosporine-induced apoptosis of HT-29 cells in culture. Through biomolecular analysis, it has been shown that the caspase-3 cascade is initiated at about 4-6 hours after staurosporine application. It was also reported that a significant portion of the HT-29 cells are marked as apoptotic at 8 hours (10% of the population) and 24 hours (~25% of the population). In comparison, our data shows that the peak apparent mass increase occurs between 6 and 17 hours after the staurosporine addition.

In conclusion, MEMS resonant mass sensors are capable of achieving very high uniform mass sensitivities. The aggregate biophysical changes of the cell can be measured with the sensors; deconvolving the rapid changes in the cell stiffness, viscosity, volume, mass and density from the apparent mass measurements is an area of on-going future research studies.

Figure Captions

FIG. 21.
Optimization of the sensor structure for uniform mass sensitivity. (a) Geometric parameters for optimizing mass sensitivity of the resonating platform. (b) The maximum variation of mass sensitivity with varying L. (c) The maximum variation of mass sensitivity with varying d and θ. (d) The distribution of mass sensitivity of the optimized sensor structure. The variation of the mass sensitivity across the platform is only 2.2%.

FIG. 22.
MEMS mass sensor with uniform mass sensitivity. (a) Schematic of a cross-sectional of the completed sensor. (b) An SEM image of the fabricated sensor used to measure apoptosis. (c) Schematic of experimental setup for actuating the sensor and measuring the changes in the sensor resonant frequency.

FIG. 23.
Measured apparent mass of apoptotic HT-29 cells treated with staurosporine. (a) Time-lapse images of HT-29 on sensor #2 cultured for 70 hours. (b) Time-lapse images of HT-29 on sensor #7 cultured for 70 hours. (a-b) Staurosporine application was at 18.2 hours (white star is on the next acquired image); individual image frames are time stamped (hours). (c) Measured apparent mass of sensor #2 and sensor #7. Mass peaks are: (a)=24.0 and (b)=35.3 hours.

Example 4

Resonant Sensors for Trapping Cells

Figure 24:
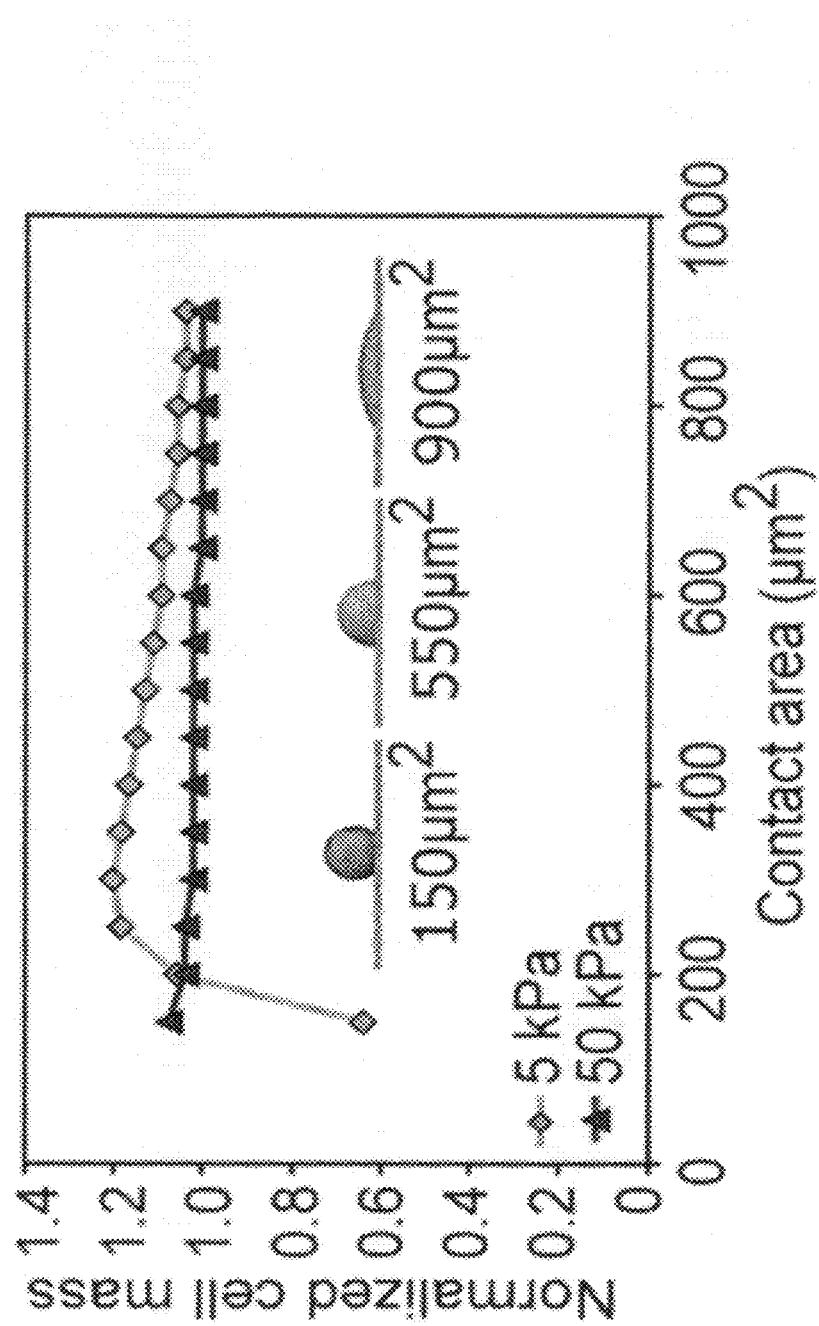
FIG. 24 provides data showing normalized cell mass as a function of contact area for two different pressure conditions.

FIG. 24 provides data showing normalized cell mass as a function of contact area for two different pressure conditions. In general, cells under relatively high pressure conditions tend to exhibit little change in normalized cell mass as the contact area of the cell increases.

Figure 25:
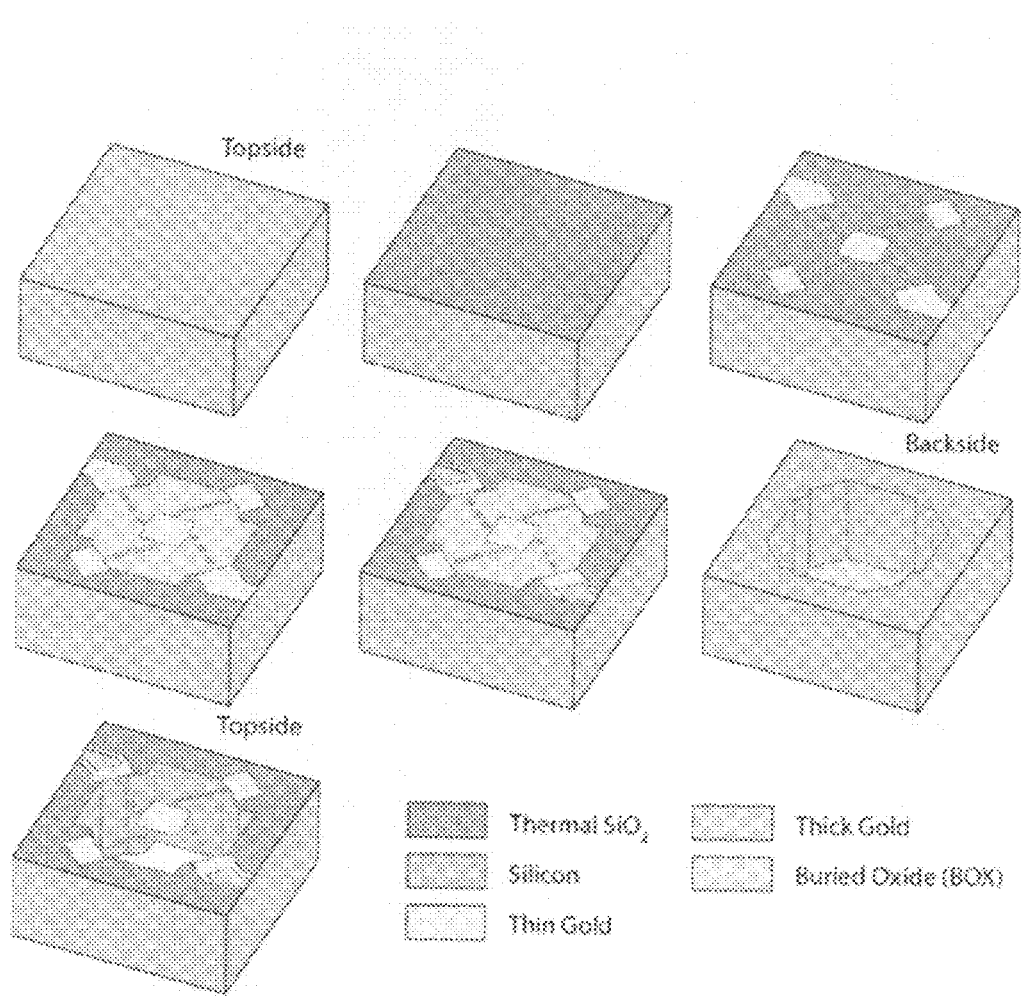
FIG. 25 provides an overview of a method for making a resonant sensor embodiment.

FIG. 25 provides an overview of a method for making a resonant sensor embodiment. First, a thermal oxide is grown on the top surface of a silicon substrate. A relatively thin layer of gold is patterned to define electrode contacts, tethers and the resonant sensor platform. A buried oxide region is established in the portion of the substrate to be removed from beneath the tethers and platform. Relatively thicker gold electrodes are patterned. Finally, the buried oxide region is removed, for example, by an etching method, leaving a platform suspended by tethers. In the embodiment shown in FIG. 25, the region beneath the platform and tethers is removed entirely, through the back side of the substrate.

Figure 26A:
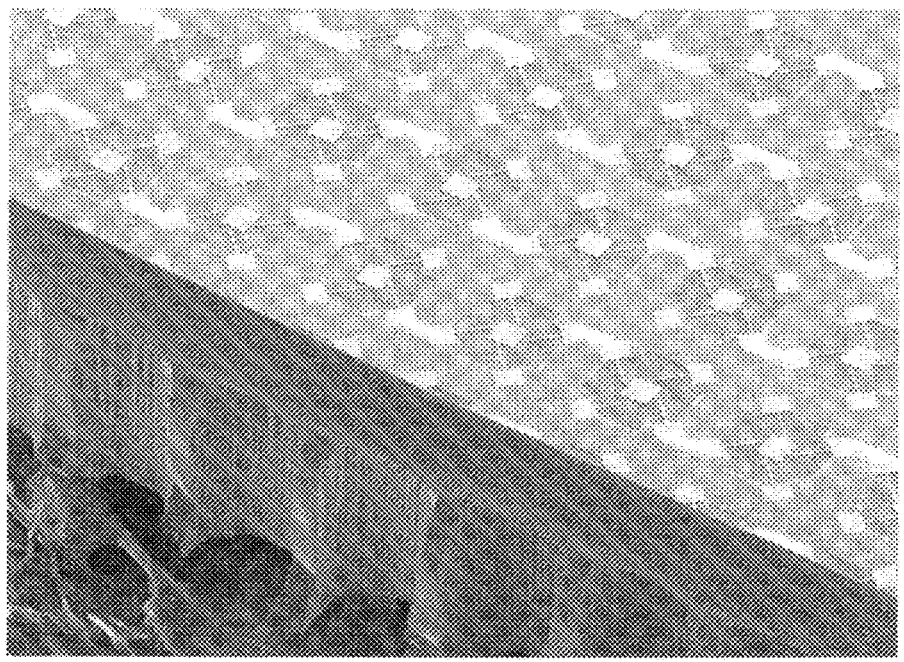
FIGS. 26A and 26B provide electron micrograph images of an array of resonant sensors.
Figure 26B:
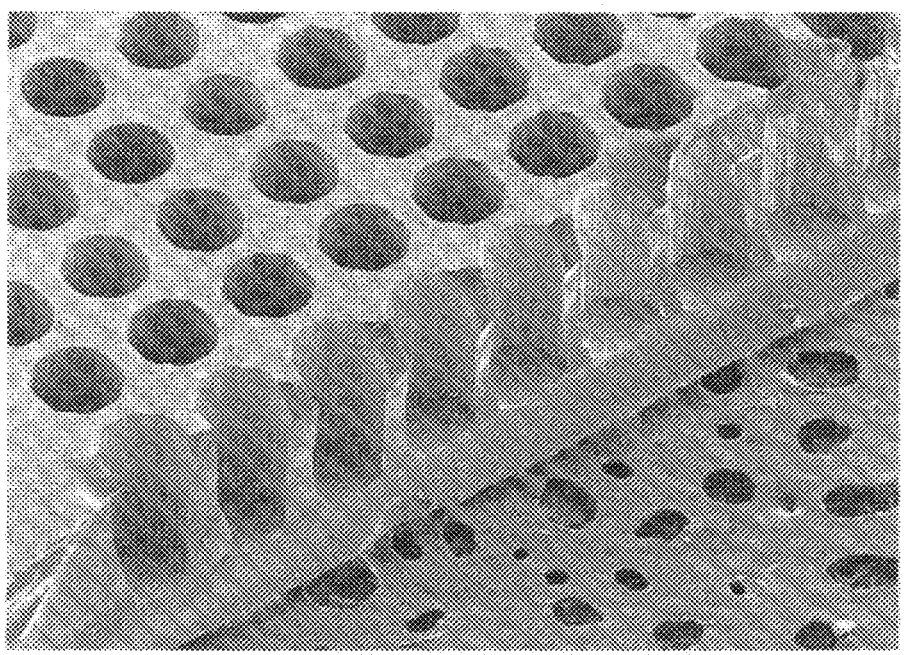

In embodiments, complete removal of the region beneath the tethers is useful, for example, for permitting a path for fluid to flow from the top side of the sensor and platform through to the bottom side of the substrate. FIGS. 26A and 26B provide electron micrograph images of an array of resonant sensors having the regions beneath the platforms and tethers completely removed through the back side of the substrate. FIG. 26A shows a view of the top side of the resonant sensor array. FIG. 26B shows a view of the back side of the resonant sensor array, showing holes etched entirely through the silicon substrate.

In certain embodiments, resonant sensors having the regions beneath the platform and tethers completely removed through the back side of the substrate are further useful, for example, for trapping cells on the platform. As fluid containing cells is flowed through the etched holes, cells can become trapped on the platform.

Figure 27:
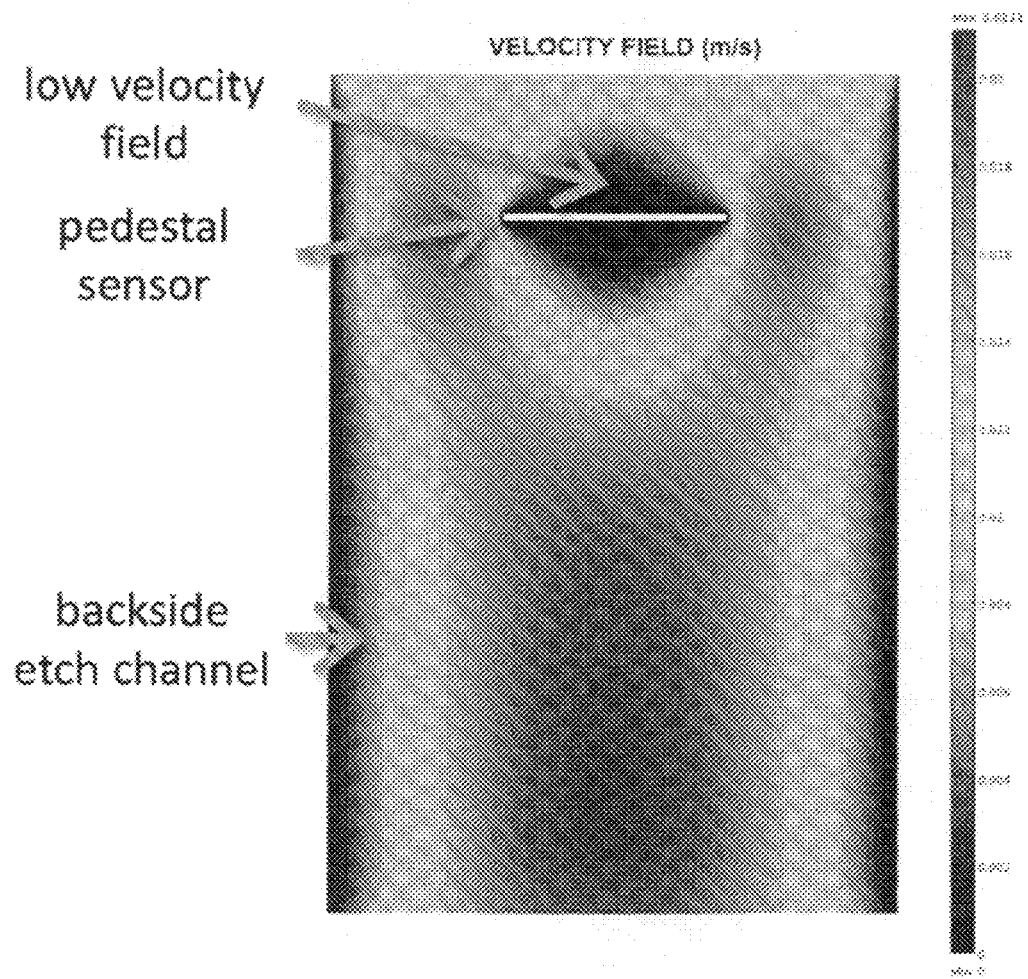
FIG. 27 provides a cross-sectional velocity map image for a fluid flowing through a resonant sensor.

FIG. 27 illustrates a cross-sectional velocity map image for a fluid flowing through a resonant sensor. The velocity map shows regions of low velocity immediately above and below the sensor pedestal/platform and along the walls of the etched channel. Regions of higher velocity appear on opposite sides of the pedestal as well as far below the pedestal. If a cell in a flowing fluid enters the low velocity region above the platform, shown by the arrow in FIG. 27, the cell can become trapped at the platform surface. Accordingly, this provides a useful method for placing cells on the platform surface.

REFERENCES

P. S. Waggoner and H. G. Craighead, "Micro- and nanomechanical sensors for environmental, chemical, and biological detection", Lab Chip, 7, 1238-1255, 2007.

K. Park, J. Jang, D. Irimia, J. Sturgis, J. Lee, J. P. Robinson, M. Toner and R. Bashir, "Living cantilever arrays for characterization of mass of single live cells in fluids", Lab Chip, 8, 1034-1041, 2008.

S. Dohn, R. Sandberg, W. Svendsen and A. Boisen, "Enhanced functionality of cantilever based mass sensors using higher modes", Appl. Phys. Lett., 86, 233501, 2005.

T. Thundat, E. A. Wachter, S. L. Sharp, and R. J. Warmack, "Detection of mercury vapor using resonating microcantilevers", Appl. Phys. Lett. 66, 1695, 1995.

B. Ilic, D. Czaplewski, M. Zalalutdinov, H. G. Craighead, P. Neuzil, C. Campagnolo, and C. Batt, "Single cell detection with micromechanical oscillators", J. Vac. Sci. Technol. B, 19, 2825, 2001.

S. Dohn, W. Svendsen, A. Boisen, and O. Hansen, "Mass and position determination of attached particles on cantilever based mass sensors", Rev. Sci. Instrum., 78, 103303, 2007.

S. Cooper, Theor. Biol. Med. Model. 3, 47 (2006).

Killander. D, Zetterberg. A, Exp. Cell Res. 38, 272 (1965).

J. M. Mitchison, Int. Rev. Cyto. 226, 165 (2003).
J. M. Mitchison, Theor. Biol. Med. Model. 2, 4 (2005).
Zetterberg. A, Killander. D, Exp. Cell Res. 39, 22 (1965).
R. F. Brooks, R. Shields, Exp. Cell Res. 156, 1 (1985).
P. Jorgensen, M. Tyers, Curr. Biol. 14, R1014 (2004).
W. A. Wells, J. Cell Biol. 158, 1156 (2002).
E. C. Anderson, G. I. Bell, D. F. Petersen, R. A. Tobey, Biophys J. 9, 246 (1969).
S. G. Elliott, C. S. Mclaughlin, Proc. Nat. Acad. Sci. U.S.A. 75, 4384 (1978).
I. Conlon, M. Raff, J. Biol. 2, 7 (2003).
I. J. Conlon, G. A. Dunn, A. W. Mudge, M. C. Raff, Nat. Cell Biol. 3, 918 (2001).
P. Echave, I. J. Conlon, A. C. Lloyd, Cell Cycle 6, 218 (2007).
H. E. Kubitsch, J. of Theor. Biol. 28, 15 (1970).
G. Popescu et al., Am J Physiol Cell Physiol 295, C538 (August, 2008).
A. K. Bryan, A. Goranov, A. Amon, S. R. Manalis, Proc. Nat. Acad. Sci. U.S.A. 107, 999 (2010).
M. Godin, F. F. Delgado, S. Son, W. H. Grover, A. K. Bryan, A. Tzur, P. Jorgensen, K. Payer, A. D. Grossman, M. W. Kirschner, S. R. Manalis. "Using buoyant mass to measure the growth of single cells", Nat. Methods. 2010 May; 7(5): 387-90. Epub 2010 Apr. 11. doi:10.1038/nmeth.1452 (2010).
K. Park and R. Bashir, "MEMS-based resonant sensor with uniform mass sensitivity", Digest Tech. Papers, Transducers '09 Conference, Denver, Colo., Jun. 21-25, 2009 pp. 1956-1958).
M. V. Voinova, M. Jonson, B. Kasemo, Biosens. Bioelectron. 17, 835 (2002).
S. G. Shroff, D. R. Saner, R. Lal, Am. J. Physiol. Cell Physiol. 38, C286 (1995).
C. H. Fox, F. B. Johnson, J. Whiting, P. P. Roller, J. Histochem. Cytochem. 33, 845 (1985).
O. Chaput, J. F. Carrias, Arch. Hydrobiol. 155, 517 (2002).
M. De Caterina et al., Platelets 13, 207 (2002).
R. M. Lee, R. E. Garfield, J. B. Forrest, E. E. Daniel, Scan. Electron Microsc. 3, 439 (1979).
C. Hou et al., Science 322, 736 (2008).
Albrecht, D. R., R. L. Sah, et al. (2004). "Geometric and material determinants of patterning efficiency by dielectrophoresis." Biophysical Journal 87(4): 2131-2147.
Anderson, E. C., D. F. Petersen, et al. (1970). "Density invariance of cultured Chinese hamster cells with stage of the mitotic cycle." Biophys J 10(7): 630-45.
Antonik, M. D., N. P. Dcosta, et al. (1997). "A biosensor based on micromechanical interrogation of living cells." Ieee Engineering in Medicine and Biology Magazine 16(2): 66-72.
R. Bertrand, E. Solary, P. O'Connor, K. W. Kohn, Y. Pommier. "Induction of a common pathway of apoptosis by staurosporine", Exp. Cell Res. 211(2), pp. 314-21, 1994.
Bilbo, S. D. and J. M. Schwarz (2009). "Early-life programming of later-life brain and behavior: a critical role for the immune system." Front Behav Neurosci 3: 14.
Blatt, N. B. and G. D. Glick (2001). "Signaling pathways and effector mechanisms pre-programmed cell death." Bioorg Med Chem 9(6): 1371-84.
Braun, T., V. Barwich, et al. (2005). "Micromechanical mass sensors for biomolecular detection in a physiological environment." Physical Review E 72(3).
Burg, T. P., M. Godin, et al. (2007). "Weighing of biomolecules, single cells and single nanoparticles in fluid." Nature 446 (7139): 1066-1069.
Burg, T. P. and S. R. Manalis (2003). "Suspended microchannel resonators for biomolecular detection." Applied Physics Letters 83(13): 2698-2700.
Burg, T. P., A. R. Mirza, et al. (2006). "Vacuum-packaged suspended microchannel resonant mass sensor for biomolecular detection." Journal of Microelectromechanical Systems 15(6): 1466-1476.
Burg, T. P., J. E. Sader, et al. (2009). "Nonmonotonic energy dissipation in microfluidic resonators." Phys Rev Lett 102 (22): 228103.
M. L. Circu, S. Stringer, C. A. Rhoads, M. P. Moyer, T. Y. Aw, "The role of GSH efflux in staurosporine-induced apoptosis in colonic epithelial cells", Biochem. Pharmacol., 77(1), pp. 76-85, 2009.
Crooke, C. E., A. Pozzi, et al. (2009). "PLC-gammal regulates fibronectin assembly and cell aggregation." Exp Cell Res 315(13): 2207-14.
Das, M., C. A. Gregory, et al. (2006). "A defined system to allow skeletal muscle differentiation and subsequent integration with silicon microstructures." Biomaterials 27(24): 4374-4380.
Das, M., K. Wilson, et al. (2007). "Differentiation of skeletal muscle and integration of myotubes with silicon microstructures using serum-free medium and a synthetic silane substrate." Nat Protoc 2(7): 1795-801.
Davila, A. P., J. Jang, et al. (2007). "Microresonator mass sensors for detection of *Bacillus anthracis* Sterne spores in air and water." Biosens. Bioelectron. 22(12): 3028-3035.
Ekinci, K. L., Y. T. Yang, et al. (2004). "Ultimate limits to inertial mass sensing based upon nanoelectromechanical systems." Journal of Applied Physics 95(5): 2682-2689.
Fischer, U., R. U. Janicke, et al. (2003). "Many cuts to ruin: a comprehensive update of caspase substrates." Cell Death Differ 10(1): 76-100.
Gfeller, K. Y., N. Nugaeva, et al. (2005). "Micromechanical oscillators as rapid biosensor for the detection of active growth of *Escherichia coli*." Biosens. Bioelectron. 21(3): 528-533.
Gomez, N., Y. Lu, et al. (2007). "Immobilized nerve growth factor and microtopography have distinct effects on polarization versus axon elongation in hippocampal cells in culture." Biomaterials 28(2): 271-84.
Groisman, A., C. Lobo, et al. (2005). "A microfluidic chemostat for experiments with bacterial and yeast cells." Nature Methods 2(9): 685-689.
Gupta, A., D. Akin, et al. (2004). "Detection of bacterial cells and antibodies using surface micromachined thin silicon cantilever resonators." Journal of Vacuum Science & Technology B 22(6): 2785-2791.
Gupta, A., J. P. Denton, et al. (2003). "Novel fabrication method for surface micromachined thin single-crystal silicon cantilever beams." Journal of Microelectromechanical Systems 12(2): 185-192.
Gupta, A. K., D. Akin, et al. (2004). "Single virus particle mass detection using microresonators with nanoscale thickness." Applied Physics Letters 84(11): 1976-1978.
Gupta, A. K., P. R. Nair, et al. (2006). "Anomalous resonance in a nanomechanical biosensor." Proceedings of the National Academy of Sciences of the United States of America 103(36): 13362-13367.
Hu, Y., S. E. Guimond, et al. (2009). "Novel mechanisms of fibroblast growth factor receptor 1 regulation by extracellular matrix protein anosmin-1." J Biol. Chem.
Iborra, F. J. and V. Buckle (2008). "Wide confocal cytometry: a new approach to study proteomic and structural changes in the cell nucleus during the cell cycle." Histochem Cell Biol 129(1): 45-53.

Ilic, B. and H. G. Craighead (2000). "Topographical patterning of chemically sensitive biological materials using a polymer-based dry lift off." Biomed. Microdevices. 2: 317-322.

Johnson, L., A. T. K. Gupta, et al. (2006). "Characterization of vaccinia virus particles using microscale silicon cantilever resonators and atomic force microscopy." Sensors and Actuators B-Chemical 115(1): 189-197.

Kane, B. J., M. J. Zinner, et al. (2006). "Liver-specific functional studies in a microfluidic array of primary mammalian hepatocytes." Analytical Chemistry 78(13): 4291-4298.

Khademhosseini, A., J. Yeh, et al. (2005). "Cell docking inside microwells within reversibly sealed microfluidic channels for fabricating multiphenotype cell arrays." Lab on a Chip 5(12): 1380-1386.

Kikuchi, K., S. Okano, et al. (1992). "Effects of chronic administration of noradrenaline and glucagon on in vitro brown adipose tissue thermogenesis." Jpn J Physiol 42(1): 165-70.

Kim, H., R. E. Cohen, et al. (2006). "Live lymphocyte arrays for biosensing." Advanced Functional Materials 16(10): 1313-1323.

Kim, L., M. D. Vahey, et al. (2006). "Microfluidic arrays for logarithmically perfused embryonic stem cell culture." Lab on a Chip 6(3): 394-406.

King, K. R., S. Wang, et al. (2006). "A high-throughput microfluidic real-time gene expression living cell array." submitted.

Lee, P. J., P. J. Hung, et al. (2006). "Nanoliter scale microbioreactor array for quantitative cell biology." Biotechnology and Bioengineering 94(1): 5-14.

Li, M., H. X. Tang, et al. (2007). "Ultra-sensitive NEMS-based cantilevers for sensing, scanned probe and very high-frequency applications." Nat Nanotechnol 2(2): 114-20.

Lodish, H. F. (2003). Molecular cell biology. New York, W.H. Freeman and Company.

Loken, M. R. and H. E. Kubitschek (1984). "Constancy of cell buoyant density for cultured murine cells." J Cell Physiol 118(1): 22-6.

Luthi, A. U. and S. J. Martin (2007). "The CASBAH: a searchable database of caspase substrates." Cell Death Differ 14(4): 641-50.

Nie, F. Q., M. Yamada, et al. (2007). "On-chip cell migration assay using microfluidic channels." Biomaterials 28(27): 4017-22.

Nugaeva, N., K. Y. Gfeller, et al. (2005). "Micromechanical cantilever array sensors for selective fungal immobilization and fast growth detection." Biosensors & Bioelectronics 21(6): 849-856.

Olie, R. A., F. Durrieu, et al. (1998). "Apparent caspase independence of programmed cell death in Dictyostelium." Curr Biol 8(17): 955-8.

Omura, S., Iwai Y, Hirano A, Nakagawa A, Awaya J, Tsuchya H, Takahashi Y, Masuma R. "A new alkaloid AM-22820F Streptomyces origin. Taxonomy, fermentation, isolation and preliminary characterization", J. Antibiot., 30(4), pp. 275-82, 1977.

Park, K., D. Akin, et al. (2007). "Electrical capture and lysis of vaccinia virus particles using silicon nano-scale probe array." Biomed Microdevices 9(6): 877-83.

Park, K. and R. Bashir (2009). MEMS-based resonant sensor with uniform mass sensitivity. The 15th International Conference on Solid-State Sensors, Actuators and Microsystems. Denver, Colo., Jun. 21-25, 2009.

Peterson, Q. P., D. R. Goode, et al. (2009). "PAC-1 activates procaspase-3 in vitro through relief of zinc-mediated inhibition." J Mol Biol 388(1): 144-58.

Prescesky, S., M. Parameswaran, et al. (1992). "Silicon Micromachining Technology for Subnanogram Discrete Mass Resonant Biosensors." Canadian Journal of Physics 70(10-11): 1178-1183.

Sader, J. E. (1998). "Frequency response of cantilever beams immersed in viscous fluids with applications to the atomic force microscope." Journal of Applied Physics 84(1): 64-76.

Scherer, S. S., G. Pietramaggiori, et al. (2009). "Poly-N-acetyl glucosamine nanofibers: a new bioactive material to enhance diabetic wound healing by cell migration and angiogenesis." Ann Surg 250(2): 322-30.

Taff, B. M. and J. Voldman (2005). "A scalable addressable positive-dielectrophoretic cell-sorting array." Analytical Chemistry 77(24): 7976-7983.

Thompson, D. M., K. R. King, et al. (2004). "Dynamic gene expression profiling using a microfabricated living cell array." Analytical Chemistry 76(14): 4098-4103.

Timmer, J. C. and G. S. Salvesen (2007). "Caspase substrates." Cell Death Differ 14(1): 66-72.

Tsuda, Y., T. Shimizu, et al. (2007). "Cellular control of tissue architectures using a three-dimensional tissue fabrication technique." Biomaterials 28(33): 4939-46.

Tzur, A., R. Kafri, et al. (2009). "Cell Growth and Size Homeostasis in Proliferating Animal Cells." Science 325 (5937): 167-171.

Wilson, K., P. Molnar, et al. (2007). "Integration of functional myotubes with a Bio-MEMS device for non-invasive interrogation." Lab Chip 7(7): 920-922.

Wolff, D. A. and H. Pertoft (1972). "Changes in Density of Hela-Cells during Various Phases of Growth Cycle." In Vitro-Journal of the Tissue Culture Association 7(4): 268-&.

Yang, Y. T., C. Callegari, et al. (2006). "Zeptogram-scale nanomechanical mass sensing." Nano Letters 6(4): 583-586.

Zhang, D. W., J. Shao, et al. (2009). "RIP3, an energy metabolism regulator that switches TNF-induced cell death from apoptosis to necrosis." Science 325(5938): 332-6.

L. Meirovitch, Fundamentals of vibrations (McGraw-Hill, Boston, ed. Second Printing, 2003), pp. xviii.

J. M. Gere, S. Timoshenko, Mechanics of materials (PWS Pub Co., Boston, ed. 4th, 1997), pp. xvi.

Y. A. Malkin, Rheology. Fundamentals (ChemTec, Toronto, Ontario, Canada, 1994), pp. 315.

A. H. B. de Vries, B. E. Krenn, R. van Driel, V. Subramaniam, J. S. Kanger, Nano Letters 7, 1424 (May, 2007).

S. Leporatti et al., Nanotechnology 20 (Feb. 4, 2009).

W. D. Merryman, P. D. Bieniek, F. Guilak, M. S. Sacks, Journal of Biomechanical Engineering-Transactions of the Asme 131 (April, 2009).

Y. A. Shi, D. D. Y. Ryu, R. Ballica, Biotechnology and Bioengineering 41, 745 (Mar. 25, 1993).

Bhattacharya et al., 'PCR-based detection in a micro-fabricated platform', Lab Chip, 8, 1130-1136, 2008.

K. Park, L. J. Millet, N. Kim, H. Li, X. Jin, G. Popescu, N. R. Aluru, K. J. Hsia and R. Bashir, "Measurement of adherent cell mass and growth", Proc. Natl. Acad. Sci. USA., 107 (48), pp. 20691-6, 2010.

U.S. Pat. No. 6,805,009.

U.S. Patent Application Publications US 2009/0199639 and US 2009/0139340.

International Patent Application Publications WO 2005/031300, WO 2008/060713 and WO 2010/022285.

STATEMENTS REGARDING INCORPORATION BY REFERENCE AND VARIATIONS

All references throughout this application, for example, patent documents including issued or granted patents or equivalents, patent application publications, and non-patent literature documents or other source material are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example, "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A resonant mass sensor comprising a microfabricated suspended platform having a measuring surface congruent with the suspended platform and comprising at least four sides, wherein each side opposibly faces another side,
   wherein the suspended platform is supported by at least four tethers, wherein each side is connected to at least one of the at least four tethers that is not connected to another side to accommodate vertical displacement of the suspended platform,
   each tether having a folded geometry comprising a flexural portion and a torsional portion,
   and wherein a resonant oscillation of the suspended platform exhibits a uniform vibration amplitude that varies by less than 3% across the entire measuring surface.

2. The sensor of claim 1, wherein the suspended platform has a stiffness greater than a stiffness of the tethers.

3. The sensor of claim 2, wherein the suspended platform has a stiffness selected over the range of 5 N/m to 1000 N/m and each of the tethers has a stiffness selected over the range of 0.5 N/m to 10 N/m.

4. The sensor of claim 1, wherein at least one tether has a spring constant selected over the range of 0.5 N/m to 10 N/m.

5. The sensor of claim 1, wherein a vibration amplitude of the suspended platform exhibits variations of less than 2% across the measuring surface of the suspended platform.

6. The sensor of claim 1, wherein the sensor is configured to have a mass sensitivity which varies between 0% and 5% across the measuring surface of the suspended platform.

7. The sensor of claim 1, wherein the sensor is configured to have a mass sensitivity which varies less than 4.1% across the measuring surface of the suspended platform.

8. The sensor of claim 1, wherein the sensor is configured to have a mass resolution selected over the range of 1 pg to 100 pg.

9. The sensor of claim 1, wherein the sensor further comprises one or more magnets positioned such that a magnetic field is oriented parallel to the measuring surface.

10. The sensor of claim 9, wherein the one or more magnets are permanent magnets.

11. The sensor of claim 1, wherein the suspended platform comprises a magnetic or ferromagnetic material.

12. The sensor of claim 11, wherein the suspended platform is induced to oscillate by applying a time varying magnetic field to the suspended platform.

13. The sensor of claim 1, wherein the suspended platform is induced to oscillate by applying a time varying electric potential between the suspended platform and a substrate or electrode positioned in electrostatic communication with the suspended platform.

14. The sensor of claim 1, wherein one or more of the tethers comprise a piezoelectric material.

15. The sensor of claim 14, wherein the suspended platform is induced to oscillate by applying a time varying voltage to the piezoelectric material.

16. The sensor of claim 1, further comprising a piezoelectric actuator positioned in mechanical communication with the suspended platform and/or tethers.

17. The sensor of claim 16, wherein the suspended platform is induced to oscillate by applying a time varying voltage to the piezoelectric actuator.

18. The sensor of claim 1, wherein the sensor is configured to have a resonant frequency selected over the range of 10 to 500 kHz.

19. The sensor of claim 18, wherein the sensor is configured to have a resonant frequency in water selected over the range of 10 to 300 kHz.

20. The sensor of claim 18, wherein the sensor is configured to have a resonant frequency in air selected over the range of 50 to 500 kHz.

21. The sensor of claim 1, wherein a vibration, a velocity or both a vibration and a velocity of the suspended platform is detected using an optical sensing method; or wherein a vibration of the suspended platform is detected using piezoelectric sensing and wherein one or more of the tethers comprises a piezoelectric material and vibration of the suspended platform is detected by monitoring a potential difference across the piezoelectric material; or wherein a vibration of the suspended platform is detected using piezoresistive sensing and wherein one or more of the tethers comprises a piezoresistive material and vibration of the suspended platform is detected by monitoring a change in the resistance of the piezoresistive material; or wherein a vibration of the suspended platform is detected using electrical sensing and wherein vibration of the suspended platform is detected by monitoring a capacitance between the suspended platform and a substrate or electrode positioned in electrostatic communication with the suspended platform.

22. A system for measuring a mass of an object, the system comprising:
a resonant mass sensor comprising:
a microfabricated suspended platform having a measuring surface congruent with the suspended platform and comprising at least four sides, wherein each side opposibly faces another side,
wherein the suspended platform is supported by at least four tethers, wherein each side is connected to one of the at least four tethers that is not connected to another side to accommodate vertical displacement of the suspended platform;
each tether having a folded geometry comprising a flexural portion and a torsional portion,
and a metal layer deposited over at least a portion of the suspended platform and tethers;
wherein a resonant oscillation of the suspended platform exhibits a uniform vibration amplitude that varies by less than 3% across the entire measuring surface;
one or more permanent magnets positioned such that a magnetic field passes parallel to the measuring surface;
a current source in electrical communication with the metal layer; and
an optical source and sensor located for sensing a vibration of the suspended platform.

23. A system for measuring a mass of an object, the system comprising:
a resonant mass sensor of claim 22;
one or more permanent magnets positioned such that a magnetic field passes through the suspended platform in a direction perpendicular to the measuring surface;
a current source in electrical communication with the metal layer; and
an optical source and sensor for sensing a vibration of the suspended platform.

24. A mass sensor array comprising a plurality of mass sensors, each mass sensor comprising a resonant mass sensor of claim 1.

25. The sensor of claim 1, wherein the suspended platform is four sided.

26. The sensor of claim 25, wherein the suspended platform has a shape that is rectangular or square.

27. The sensor of claim 25, wherein the suspended platform has corner regions between adjacent suspended platform sides that comprise additional sides that join the adjacent suspended platform sides.

28. The sensor of claim 1, wherein the suspended platform comprises six sides.

29. The sensor of claim 1, further comprising a supporting platform having four supporting tethers to form a spring-platform,
wherein the supporting platform and supporting tethers have a size and a shape that corresponds to a size and shape of the suspended platform and tethers;
wherein each tether connected to the suspended platform has a free end that is not connected to the suspended platform;
wherein each supporting tether of the supporting platform has a free end that is not connected the supporting platform;
wherein a free end of each tether is connected to a free end of each supporting tether to from a joint that during use converts a flexural bending into a torsional force.

30. The sensor of claim 1, wherein the flexural portion of the tethers are configured to constrain platform vibration in a vertical direction.

31. The sensor of claim 1, having four tethers.

* * * * *